United States Patent
Tomioka et al.

(10) Patent No.: US 6,830,709 B2
(45) Date of Patent: Dec. 14, 2004

(54) METHOD OF MEASURING LIQUID COMPOSITION, LIQUID COMPOSITION, INK SET, METHOD FOR FORMING COLORED PORTION ON RECORDING MEDIUM, AND INK-JET RECORDING APPARATUS

(75) Inventors: Hiroshi Tomioka, Tokyo (JP); Masao Kato, Tochigi (JP); Makiko Endo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 09/968,435

(22) Filed: Oct. 2, 2001

(65) Prior Publication Data

US 2002/0062762 A1 May 30, 2002

(30) Foreign Application Priority Data

Oct. 6, 2000 (JP) .................................... 2000/307910

(51) Int. Cl.$^7$ .............................. C09D 11/02; B41J 2/01
(52) U.S. Cl. .................... 252/506; 252/500; 106/31.27; 106/31.28; 106/31.37; 106/31.65; 106/31.9; 347/100; 347/101; 347/111; 347/171; 347/10; 423/235.7
(58) Field of Search .............................. 252/506, 500; 106/31.27, 31.28, 31.37, 31.65, 31.9; 347/100, 101, 111, 171, 10; 423/235.7

(56) References Cited

U.S. PATENT DOCUMENTS

| | | | |
|---|---|---|---|
| 4,202,870 A | | 5/1980 | Weber et al. ................ 423/630 |
| 4,242,271 A | | 12/1980 | Weber et al. ......... 260/448 AD |
| 4,694,302 A | | 9/1987 | Hackleman et al. ......... 346/1.1 |
| 5,618,338 A | * | 4/1997 | Kurabayashi et al. .... 106/31.37 |
| 5,635,291 A | * | 6/1997 | Yoshino et al. .......... 428/32.37 |
| 5,640,187 A | * | 6/1997 | Kashiwazaki et al. ...... 347/101 |
| 6,342,289 B1 | * | 1/2002 | Eguchi et al. .............. 428/32.1 |
| 6,719,420 B2 | * | 4/2004 | Tomioka et al. ............ 347/100 |
| 2003/0070581 A1 | * | 4/2003 | Tomioka et al. ......... 106/31.33 |
| 2003/0079643 A1 | * | 5/2003 | Tomioka et al. ......... 106/31.27 |

FOREIGN PATENT DOCUMENTS

| | | |
|---|---|---|
| EP | 1 099 731 A2 | 5/2001 |
| EP | 1 099 733 A1 | 5/2001 |

(List continued on next page.)

OTHER PUBLICATIONS

Barrett et al, "The Determination of Pore Volume Area Distributions in Porous Substances–I Computation from Nitrogen Isotherms," J. Am. Chem Soc. 19512, 73, 373–380.*

(List continued on next page.)

Primary Examiner—Yogendra N. Gupta
Assistant Examiner—Kallambella Vijayakumar
(74) Attorney, Agent, or Firm—Fitzpatrick, Cella, Harper & Scinto

(57) ABSTRACT

The invention relates to a liquid composition measurement method. One embodiment of the method comprises the steps of: i) subjecting a liquid composition containing fine particles and a solvent to the following pretreatment steps (a) to (c) to form an agglomerate of fine particles: (a) evaporating the solvent of the liquid composition at 120° C. for 10 hours in an ambient atmosphere, and drying the liquid composition; (b) burning the dried liquid composition resulting from the pretreatment step (a) at 700° C. after raising the temperature from 120° C. to 700° C. over one hour; (c) cooling a burned product obtained in the pretreatment step (b) to room temperature, powdering the burned product to obtain agglomerates of the fine particles; and ii) vacuum degassing the agglomerates at 120° C. for 8 hours, and measuring physical properties of pores of the agglomerates by a nitrogen adsorption and desorption method.

46 Claims, 18 Drawing Sheets

FOREIGN PATENT DOCUMENTS

| | | |
|---|---|---|
| EP | 1 106 658 A2 | 6/2001 |
| JP | 55-65269 | 5/1980 |
| JP | 55-66976 | 5/1980 |
| JP | 55-150396 | 11/1980 |
| JP | 61-59911 B2 | 12/1986 |
| JP | 61-59912 B2 | 12/1986 |
| JP | 61-59914 B2 | 12/1986 |
| JP | 63-22681 | 1/1988 |
| JP | 63-60783 | 3/1988 |
| JP | 63-299971 | 12/1988 |
| JP | 64-9279 | 1/1989 |
| JP | 64-63185 | 3/1989 |
| JP | 5-16015 B2 | 3/1993 |
| JP | 6-92010 | 4/1994 |
| JP | 8-72393 | 3/1996 |
| JP | 8-224955 | 9/1996 |
| JP | 08-230342 * | 9/1996 ............ B41M/7/00 |
| JP | 2000-34432 | 2/2000 |

OTHER PUBLICATIONS

Rockek et al, "Porous Structure of Aluminum Hydroxide and its content of psuedoboehmite," Applied Catalysis, 1991, 74, 29–36.*

Tamaru et al–Editor, "Surface Science", Gakkai Syuppan Center, 1985, pp 326–327.*

Goyne et al, "Surface Charge of Variable Porosity Al2O3(s) and siO2(s) Adsorbents", J. Porous Materials, 2003, 9, 243–256.*

NYACOL Colloidal Alumina—Technical Data, 2–pages, Mar. 1999.*

HiQ 84 and HiQ B180 Boehmite Aluminas–ALCOA Product Data, 2–sheets. No date.*

Patent Abstracts of Japan vol. 2000. No. 5 (Sep. 14, 2000) with respect to JP 2000–034432 of Feb. 2, 2000.

* cited by examiner

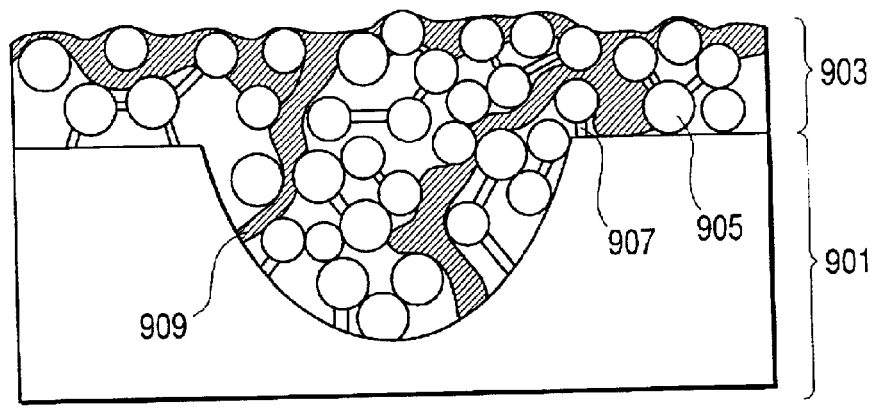
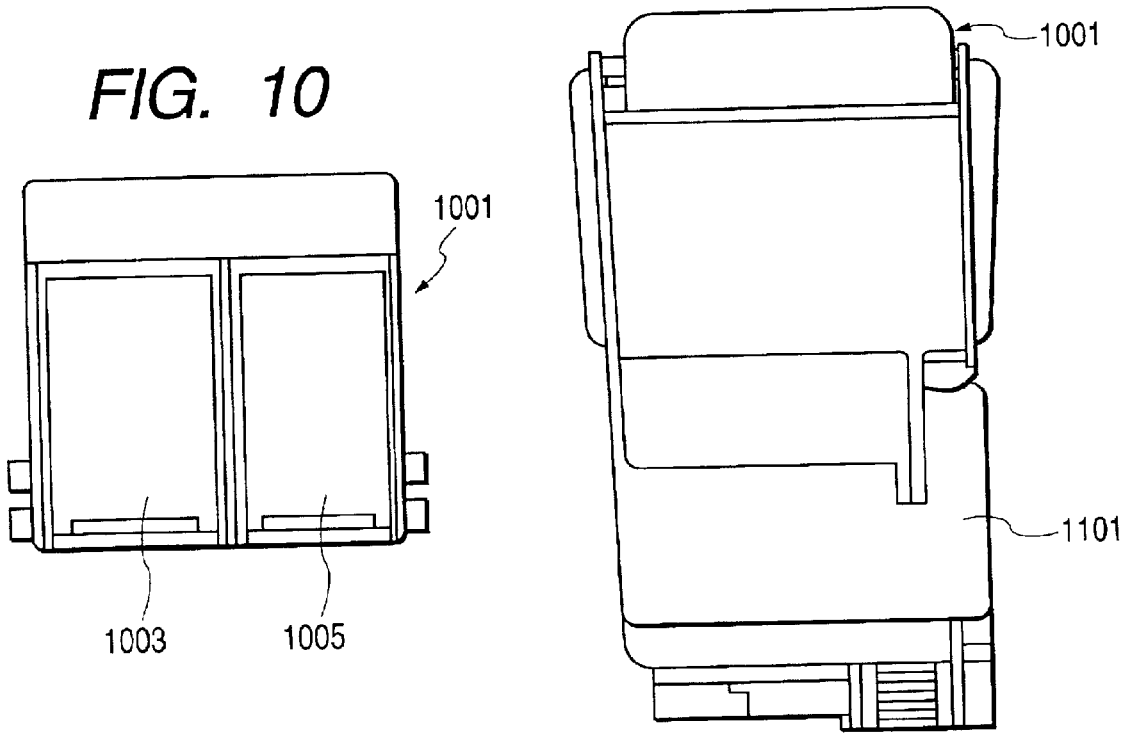

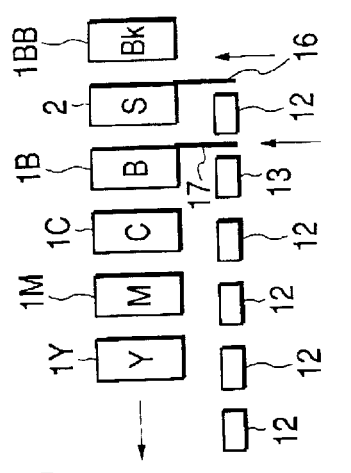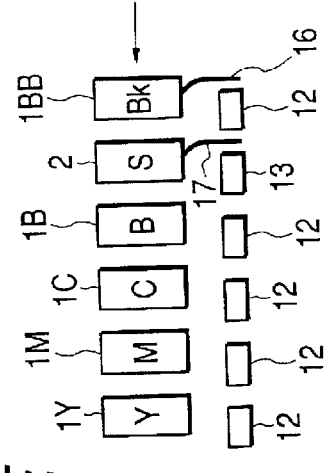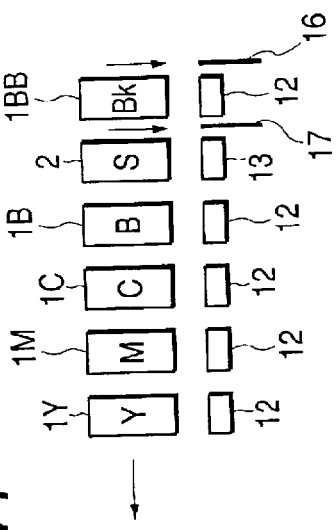
FIG. 17D  FIG. 17E  FIG. 17F
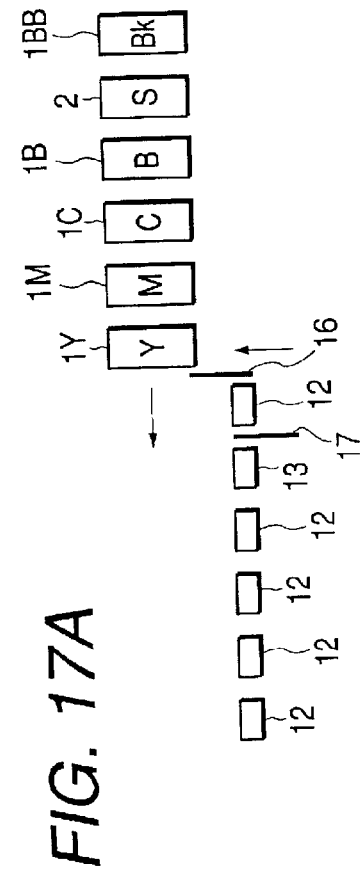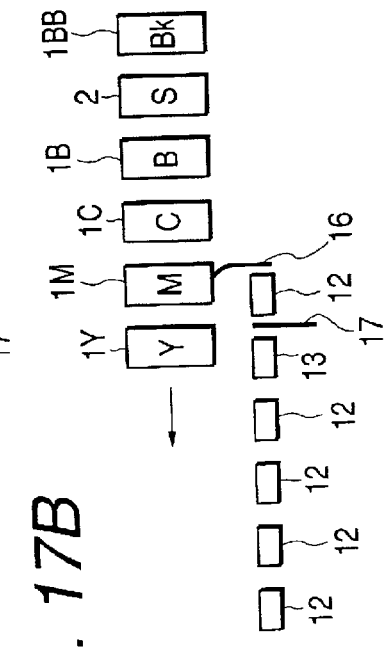
FIG. 17A  FIG. 17B  FIG. 17C

METHOD OF MEASURING LIQUID COMPOSITION, LIQUID COMPOSITION, INK SET, METHOD FOR FORMING COLORED PORTION ON RECORDING MEDIUM, AND INK-JET RECORDING APPARATUS

BACKGROUND OF THE INVENTION

1. Field of the Invention

The present invention relates to a technique to obtain a color image excellent in color and color evenness, more particularly to a method of determining a liquid composition most suitable for the ink-jet recording technique, such a liquid composition, and an ink set using such a liquid composition, a method and ink-jet recording apparatus for forming a colored portion on a recording medium.

2. Related Background Art

The ink-jet recording method conducts recording by ejecting ink to apply the ink onto a recording medium such as paper. It is easy to produce a head, and to form images of high-resolution and high-quality at high speed by using an ink jet recording method where an ink droplet is ejected by the action of a bubble formed in the ink by applying thermal energy to the ink by using an electrothermal converter as an ejection-energy supply means as disclosed in, for example, Japanese Patent Publication Nos. 61-59911, 61-59912 and 61-59914.

In general, conventional inks for ink-jet recording contain water as a principal component, and in addition, a water-soluble solvent having a high boiling point such as glycol to prevent drying and clogging at orifices. When such an ink is used for recording on a recording medium, sometimes there arise problems such as insufficient fixation, and uneven image presumably due to the uneven distribution of a filler and/or a size on the surface of the recording medium such as paper.

Besides, image quality as high as the silver salt photograph has recently become required for ink-jet recording, leading to intense technical demands for high image density, wide color reproduction range and enhanced color evenness on ink-jet recording.

Under such circumstances, various proposals have heretofore been made to stabilize the ink-jet recording process and to enhance the quality of articles recorded by the ink-jet recording process. One of the proposals on the recording medium is to coat the surface of a base paper of the recording medium with a filler and/or a size. For example, there has been disclosed a technique to form an ink receiving layer on the base paper by applying porous fine particles that adsorb a coloring material on the base paper as a filler. Recording media produced by using these techniques are now on the market as ink-jet coated papers, etc.

The following are some of the representative proposals on the ink-jet inks in the prior art.

Prior Art (1): Addition of a Volatile Solvent or a Penetrating Solvent to the Ink;

As means for quickening the fixing property of the ink onto a recording medium, Japanese Patent Application Laid-Open No. 55-65269 discloses addition of a compound such as a surfactant to increase the penetrability of the ink. Also, Japanese Patent Application Laid-Open No. 55-66976 disclosed the use of an ink containing mainly a volatile solvent.

Prior Art (2): Mixing of an Ink and a Liquid Composition Reactive with the Ink on a Recording Medium.

In order to improve the image density, the water-fastness, and bleeding as well, there has been proposed a method where a liquid composition capable of improving the image quality is applied to a recording medium before or after the ink is applied to the recording medium to form an image.

More specifically, Japanese Patent Application Laid-Open No. 63-60783 discloses a method in which a liquid composition containing a basic polymer is applied to a recording medium, and an ink containing an anionic dye is then applied thereto, thereby conducting recording. Japanese Patent Application Laid-Open No. 63-22681 discloses a recording method in which a first liquid composition containing a reactive chemical substance and a second liquid composition containing a compound reactive with the chemical substance are mixed on the recording medium. Further, Japanese Patent Application Laid-Open No. 63-299971 discloses a method in which a liquid composition containing an organic compound having two or more cationic groups per molecule is applied to the recording medium, and then recording is conducted with an ink containing an anionic dye. Japanese Patent Application Laid-Open No. 64-9279 discloses a method in which an acidic liquid composition containing succinic acid or the like is applied to a recording medium, and recording is then conducted with an ink containing an anionic dye.

Further, Japanese Patent Application Laid-Open No. 64-63185 discloses a method in which a liquid composition that can insolubilize dyestuff is applied to the recording medium prior to application of an ink. Further, Japanese Patent Application Laid-Open No. 8-224955 discloses a method in which a liquid composition containing two kinds of cationic substances having respective molecular weight distribution is used with an ink containing an anionic compound. Japanese Patent Application Laid-Open No. 8-72393 discloses a method in which a liquid composition containing a cationic substance and finely ground cellulose is used together with an ink. In both publications, it is shown that the obtained image is excellent in image density, character quality, water fastness, color reproducibility and lack of bleeding problem. Further, Japanese Patent Application Laid-Open No. 55-150396 discloses a method in which recording is conducted with a dye ink on a recording medium, and a water-fastness enhancing agent that forms a color lake with the dye is then applied to provide water-fastness to the recorded image.

Prior Art (3): Mixing of an Ink and a Liquid Composition Containing Fine Particles on a Recording Medium;

Japanese Patent Application Laid-Open No. 4-259590 discloses a method where first a colorless liquid containing colorless fine inorganic particles is applied to a recording medium and then a non-aqueous recording liquid is applied. Japanese Patent Application Laid-Open No. 6-92010 discloses a method where first a solution containing fine particles or fine particles and a binder polymer is applied to a recording medium, and then applied is an ink containing a pigment, a water-soluble resin, a water-soluble solvent and water. Further, Japanese Patent Application Laid-Open No. 2000-34432 discloses a recording material comprised of an ink and a liquid composition comprised of water-insoluble fine particles. It is said that images with excellent printing quality and coloring properties are obtained regardless of the types of the paper sheets.

SUMMARY OF THE INVENTION

Inventors of the present invention have studied various ink-jet recording techniques as described above and found that these prior arts can solve respective technical problems effectively, but sometimes at the sacrifice of other ink-jet recording properties. For example, it is well known that the above-described recording medium obtained by coating the surface of the base paper of the recording medium with a filler and/or a size (hereinafter referred to as coated paper) enables formation of high-quality images.

In general, in order to obtain an image of high saturation, it is known that the coloring material should be maintained in a monomolecular film state without agglomeration on the surface of the recording medium. The porous fine particles on the coated paper have such function. However, in order to obtain images of both high density and high saturation with a given ink containing a coloring material, it is indispensable to form an ink-receiving layer as thick as the paper substrate is covered with a large amount of the porous fine particles, thus leading to the loss of the texture of the base paper. The present inventors considered that such a thick ink-receiving layer is required because the coloring matter is not effectively adsorbed on the porous fine particles.

The following explanation is made with respect to a coated paper having one ink-receiving layer. FIG. 9 schematically illustrates a section of a coated paper in the vicinity of the surface thereof. In FIG. 9, reference numerals 901 and 903 indicate a base paper and an ink-receiving layer, respectively. The ink-receiving layer 903 comprises porous fine particles 905 and an adhesive (binder) 907 for immobilizing the particles. When an ink is applied to the ink-receiving layer 903, the ink penetrates into the voids between the porous fine particles 905 by capillarity to form ink-penetrated portions 909. As illustrated in FIG. 9, since the density of the porous fine particles in the ink-receiving layer varies locally, the mode of ink penetration by capillary phenomenon varies locally. Therefore, the coloring material cannot evenly contact the surfaces of the porous fine particles in the course of ink penetration, so that the coloring material is not efficiently adsorbed by the porous fine particles.

Further, penetration of the ink is partially inhibited by the adhesive 907, and thus the ink-receiving layer 903 has portions into which the ink could not penetrate and which cannot contribute to coloring. For these reasons, the adsorption of coloring material in a monomolecular state by the fine particles is not efficient compared with the particle amount in the conventional coated paper. As a result, a great amount of the porous fine particles are required to provide a high-quality image, impairing the texture of the base paper.

Further, the inventors have found that although the above Prior art (1) can improve the fixation properties of the ink onto a recording medium, sometimes it may cause reduction of image density or reduction of color reproduction range, which is an important factor in recording on plain paper and color image recording. Further, the inventors have found that the above described Prior art (2) can provide a recorded matter of a high image density as the coloring material in the ink is held on the surface of a recording medium, but sometimes sufficient color reproduction range and chroma cannot be obtained, supposedly due to the agglomeration of the coloring material on the surface of the recording medium. Also, by means of the above described Prior art (3), the surface conditions of the recording medium are improved by applying a solution containing the fine particles, but images of the same preciseness and fine color as that formed on coated paper can not be obtained. Finally, especially regarding a non-aqueous recording liquid, there are limitations on the selectivity of the coloring materials and on the methods for recording. Thus, it has a problem in degree of freedom of choice.

As mentioned above, every conventional method still has a certain problem to solve. Thus, the present inventors recognized the necessity of developing new ink-jet recording techniques in order to obtain an ink-jet recorded matter of a higher quality level than that demanded today. The present invention has been made on the basis of such recognition.

Based on the above described knowledge, the present inventors found out that when an ink containing a coloring material and a liquid dispersion of fine particles that can adsorb the coloring material are used both in a liquid state for effective adsorption of the coloring material onto the particles, both the density and color saturation of the resulting image are enhanced, which resulted in the present invention.

Accordingly, this invention aims to provide a method for measuring a liquid composition capable of providing a high quality ink-jet recorded matter that is especially excellent in its coloring property. Also, the invention aims to provide a liquid composition to be employed for obtaining a high quality ink-jet recorded matter having wider color reproduction range and excellent color evenness.

Further, this invention aims to provide a method of forming a colored portion on a recording medium, capable of forming even on a plain paper an excellent ink-jet recorded matter having wider color reproduction range, excellent color evenness, less stripe-like irregularity in solid parts and good abrasion resistance.

Still further, this invention aims to provide a liquid composition, an ink set combined with the liquid composition, and an ink-jet recording apparatus, which are capable of forming an excellent ink-jet recorded matter having wider color reproduction range, excellent color evenness, well-suppressed stripe-like irregularity in solid parts and good abrasion resistance.

Still further, this invention aims to provide a liquid composition excellent in storage stability and ink-jet recording properties such as ejection stability from an ink-jet recording head.

According to one aspect of the present invention, there is provided a process for measuring a liquid composition comprising the steps of:

i) subjecting a liquid composition containing fine particles and a solvent to the following pretreatment steps (a) to (c):
  (a) evaporating the solvent of the liquid composition at 120° C. for 10 hours in atmosphere, and drying the liquid composition;
  (b) burning the dried liquid composition resulting from the pretreatment step (a) at 700° C. for three hours after raising the temperature from 120° C. to 700° C. over one hour;
  (c) gradually cooling a burned product resulting from the pretreatment step (b) to room temperature, and powdering the burned product to obtain agglomerates of the fine particles; and ii) vacuum degassing the agglomerates at 120° C. for 8 hours, and measuring physical properties of pores of the agglomerates by a nitrogen adsorption and desorption method.

According to another aspect of the present invention, there is provided a liquid composition used for forming a colored portion on a recording medium together with an ink containing a coloring material, comprising a solvent and fine particles that react with the coloring material in the ink, the fine particles forming agglomerates having pores by the above-defined pretreatment steps (a) to (c), wherein the agglomerates have pores and the volume of the pores whose radius ranges from 3 to 30 nm is not less than 0.4 ml/g, and the volume of the pores whose radius is more than 30 nm is not more than 0.1 ml/g, the volume and radius of the pores being measured according to a process for measuring a liquid composition as defined above.

According to still another aspect of the present invention, there is provided an ink set comprising an ink and a liquid composition independently, the ink containing a coloring material, and the liquid composition containing fine particles that react with the coloring material, wherein the liquid composition is that as defined above.

According to still another aspect of the present invention, there is provided a method for forming a colored portion on a recording medium, comprising the steps of:
(i) applying an ink containing a coloring material to a recording medium; and
(ii) applying a liquid composition as described above to the recording medium.

According to still another aspect of the present invention, there is provided an ink-jet recording apparatus comprising a first recording unit and a second recording unit, wherein the first recording unit is provided with an ink container containing an ink comprising a coloring material, and an ink-jet head for ejecting the ink, and the second recording unit is provided with a liquid composition container containing the liquid composition as defined above, and an ink-jet head for ejecting the liquid composition.

According to still another aspect of the present invention, there is provided an ink-jet recording apparatus comprising an ink container containing an ink comprising a coloring material, and a liquid composition container containing the liquid composition as defined above, and an ink-jet head for ejecting the ink and the liquid composition respectively.

In this specification, "reaction between the coloring material and the fine particles" means interactions between them including covalent bonds, ionic bonds, physical and chemical adsorption, absorption, and adhesion.

BRIEF DESCRIPTION OF THE DRAWINGS

FIG. 4A shows movement of the respective heads to the home position from the printing region and rising of the blade for ink; FIG. 4B shows wiping of printing heads; FIG. 4C shows wiping of liquid composition-ejection head; and FIG. 4D shows lowering of the blades.

FIG. 5A shows rising of the respective blades; FIG. 5B shows movement of the respective heads toward the printing region from the home position and wiping; FIG. 5C shows lowering of the blade for the liquid composition and wiping of the printing heads; and FIG. 5D shows lowering of the blade for ink, respectively;

FIG. 6A shows rising of the blade for ink; FIG. 6B shows movement of the respective heads to the printing region from the home position and wiping of printing heads; FIG. 6C shows movement of the respective heads to the home position from the printing region, waiting of the blade for ink, and rising of the blade for the liquid composition; and FIG. 6D shows movement of the respective heads to the home position and wiping of the liquid composition-ejection head, respectively;

FIG. 9 is a schematic cross-sectional view illustrating the state of a colored portion when ink-jet recording is carried out on coated paper;

FIG. 10 is an outline figure showing one embodiment of an ink cartridge according to the invention;

FIG. 11 is an outline figure of a recording head incorporated with the ink cartridge in FIG. 10;

FIGS. 17A, 17B, 17C, 17D, 17E, and 17F schematically illustrate a wiping operation of the ink-jet printing apparatus in FIG. 16: FIG. 17A shows rising of the blade for an ink; FIG. 17B shows wiping of printing heads; FIG. 17C shows lowering of the blade for ink; FIG. 17D shows rising of both blades after a liquid composition was applied to a proper position; FIG. 17E shows wiping of the head for the liquid composition and the head for the second black ink; and FIG. 17F shows lowering of both blades;

DETAILED DESCRIPTION OF THE PREFERRED EMBODIMENTS

Figure 1:
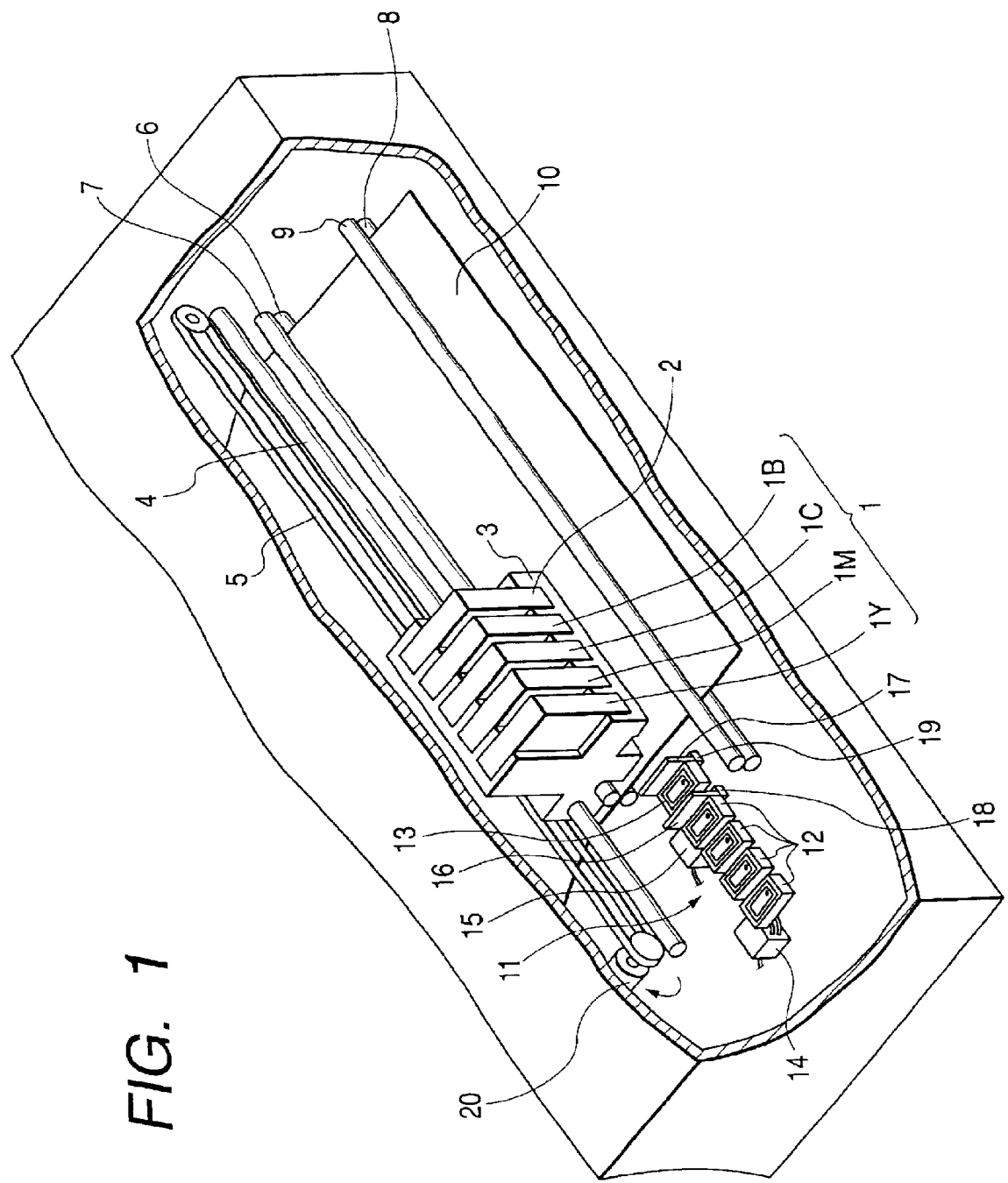
FIG. 1 is a partial opened perspective view schematically showing an ink-jet printing apparatus according to the invention.

The present inventors have investigated about an ink jet recording process comprising a step of contacting a liquid composition containing fine particles that adsorb coloring materials in an ink with the ink in liquid state in an attempt to further improve color properties of an image formed with an ink jet printer.

During the process of the investigation, the inventors recognized that the more the diameters of the fine particles in the liquid composition increase, the more the color properties of the image are improved. As the investigation advanced, however, the present inventors found the fact that there is a case in which an image excellent in color properties is obtained even though the diameter of the fine particles is small, and the fact suggests that the aforementioned recognition is not always true. Then, the inventors further conducted various experiments, and as a result of that, the inventors have concluded that agglomerated fine particles, hereinafter "agglomerates", which are formed from the fine particles dispersed in the liquid composition at the surface of the recording medium, largely contribute to color properties of the image. More concretely, physical properties of the agglomerates, such as diameter of the pores of the agglomerates (pore diameter), and volume of the pores of the agglomerates (pore volume) are believed to be closely related to color properties of the image. The inventors have tried to determine the properties of the agglomerates which provide an image that is excellent in color properties. The inventors have assumed that color properties of the image largely depend on the physical properties of the pores in the agglomerates formed from the liquid composition. Based on that assumption, the inventors have done various experiments, and eventually, found that physical properties of agglomerates obtained by processing the liquid composition in a certain way show strong correlation to the color properties of the image. The present invention has been done based on the aforementioned efforts.

The present invention will be described below with special reference to a preferable embodiment.

The preferable embodiment of the method for forming a colored portion on the recording medium comprises the steps of (i) applying the ink containing the coloring material and (ii) applying the liquid composition according to the present invention to the recording medium where the ink and the liquid composition are applied to contact each other in a liquid condition on the surface of the recording medium. By employing such embodiment, an ink jet-recorded product having a wider color-reproducible range, excellent color evenness, less stripe-like irregularity in a solid part, and good rub-off resistance can be obtained stably.

Another embodiment of the ink set according to the present invention that can achieve the above described object is a combination of an ink containing a coloring material with a liquid composition of the present invention. By using such an ink set, one can obtain stably an ink jet-recorded product having a wider color reproduction range, excellent color evenness, less stripe-like irregularity in a solid part, and good rub-off resistance. In addition, as described above, the ink and the liquid composition themselves have very simple constitutions and therefore, they have good storage stability, which brings about an effect that image formation can be stably carried out to give a high-quality ink jet-recorded product.

It is not known why the present invention can achieve advantageous effects as described above. The inventors consider as follows. The inventors have been studying the mechanisms of aggregate formation of fine particles at the surface of the recording medium, when the ink and the liquid composition are mixed on the recording medium. As a result, it was found that when fine particles aggregate as described above, pores are formed in the aggregate according to the physical properties of the liquid composition, and when these pores have a certain size, the coloring material adsorbs to around the opening of the pores and inside the pores, which brings about greater improvement of coloration.

In order to explain the mechanism more specifically, the recording mechanism of the present invention is described with reference to FIG. 13 and FIGS. 14A to 14D. Here, description is made with respect to a case where a water-based ink containing a water-soluble anionic dye having an anionic group and a water-based liquid composition containing fine particles having cationically charged surface in a dispersion state are used.

First, a recorded image according to the present invention is described with reference to FIG. 13.

Before that, terms must defined. The term "monomolecular state" as used herein means that a coloring material such as a dye or pigment is in a state dissolved or dispersed in an ink. If the coloring material aggregates a little, the state is called "monomolecular" so long as the saturation of the formed image is not lowered. Since the monomolecular state is preferable for dyes, such a state is called "monomolecular state" with coloring materials other than dyes, for convenience.

Figure 13:
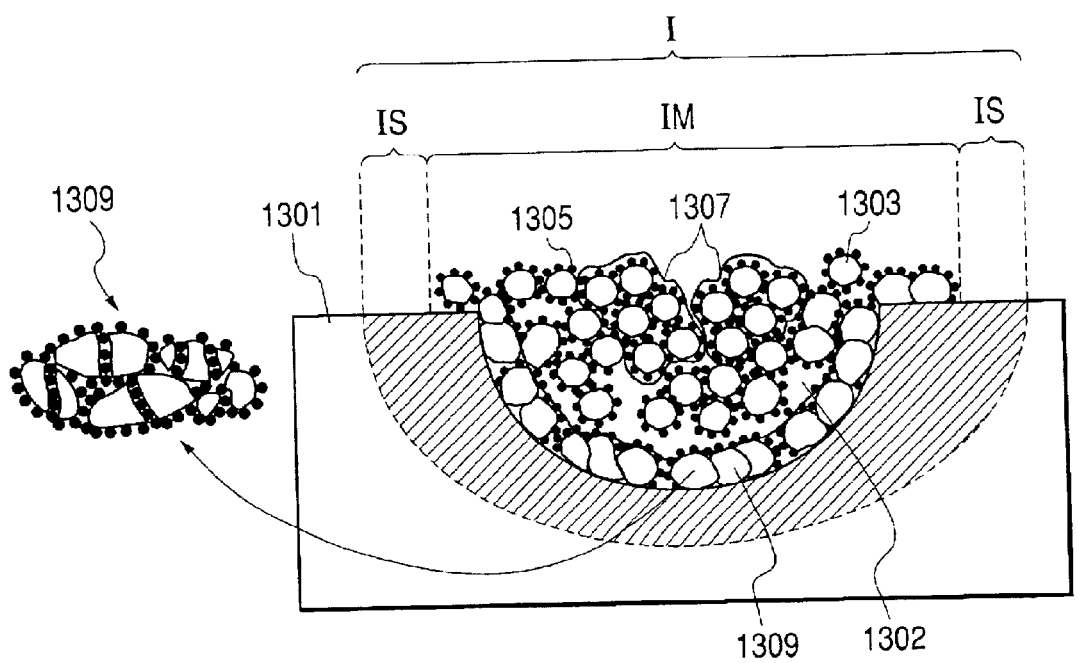
FIG. 13 is a schematic cross-sectional view illustrating the state of the colored portions of an ink-jet image according to the invention.

FIG. 13 is a typical illustration of a colored portion I of a recorded image according to the present invention, which is comprised of a main image portion IM and a peripheral portion IS thereof. In FIG. 13, reference numeral 1301 indicates a recording medium, and 1302 voids among fibers of the recording medium. Reference numeral 1303 designates fine particles typically illustrated, on which a coloring material 1305 is chemically adsorbed. The main image portion IM is formed by the fine particles 1303 on the surfaces of which the coloring material 1305 has been uniformly adsorbed in a monomolecular state, and aggregates 1307 of the fine particles, in which the monomolecular state of the coloring material is kept. Reference numeral 1309 indicates aggregates of the fine particles existing near the fibers of the recording medium within the main image portion IM. The main image portion IM is formed by the step of adsorption of the fine particles 1303 physically or chemically by the fibers of the recording medium, and the step of adsorption of the coloring material 1305 by the fine particles 1303 in a liquid—liquid state. Therefore, the coloring properties of the coloring material are scarcely impaired, and even on an easily penetrable recording medium such as plain paper, images of high image density and saturation with a color reproduction range as wide as on coated paper can be formed.

On the other hand, the free coloring material 1305 not adsorbed to the surface of the fine particles 1303 penetrates into the recording medium 1301 in both transverse and longitudinal directions. Thus, delicate feathering of the ink is formed at the peripheral portion IS. As the coloring material remains in the vicinity of the surface of the recording medium 1301 and the delicate feathering of the ink occurs at the peripheral portion, it is possible to form an image not having haze and color irregularity and excellent in color evenness, even in an image region such as solid portions or shadow portions where a large amount of the ink is applied. According to the present invention, when the recording medium 1301 has a permeability to the ink and liquid composition, the penetration of the ink or the liquid composition into the recording medium is not completely prevented but allowed to some extent, as shown in FIG. 13.

Further, with the liquid composition according to the present invention, when agglomeration 1309 of fine particles is formed in the surface region of the recording medium, pores of a certain size are formed in the agglomeration. When the free coloring material 1305 in the ink penetrates into the recording medium, it penetrates into the pores of the agglomeration 1309 of fine particles and attaches to around the opening and inside of the pores in an ideal monomolecular state, whereby more coloring material is held in the surface region of the recording medium, and a recorded matter of excellent color can be obtained.

Figure 14A:
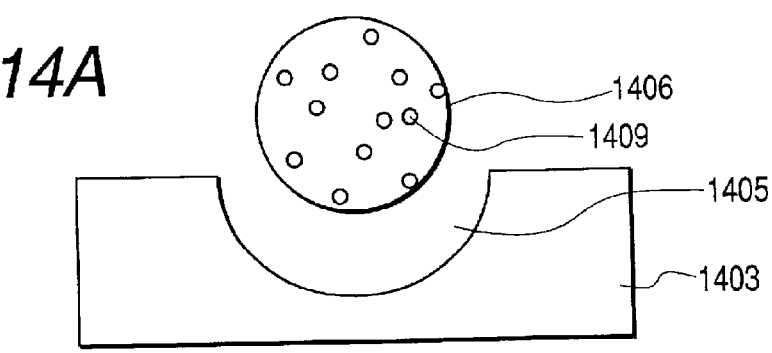
FIGS. 14A, 14B, 14C, and 14D are outline process figures illustrating the process of forming the colored portions of an ink-jet image according to the invention.

FIGS. 14A to 14D illustrate a forming process of a colored portion on the recording medium according to one aspect of the present invention, showing a schematic cross-sectional view of a colored portion 1400. In FIGS. 14A to 14D, reference numeral 1401 indicates a portion mainly containing a reaction product of an ink and a liquid composition, for example, a reaction product between a coloring material and fine particles (hereinafter referred to as "reaction portion"), corresponding to the main image portion 1M in FIG. 13. Reference numeral 1402 designates a portion formed by an ink portion not reacted with the liquid composition and oozed in the periphery of the reaction portion 1401 (hereinafter referred to as "ink ooze portion"), and corresponding to the peripheral portion 1S in FIG. 11. Such a colored portion 1400 is formed, for example, in the following manner. In FIG. 14A, reference numeral 1405 denotes a typical void between fibers of a recording medium 1403.

Figure 14B:
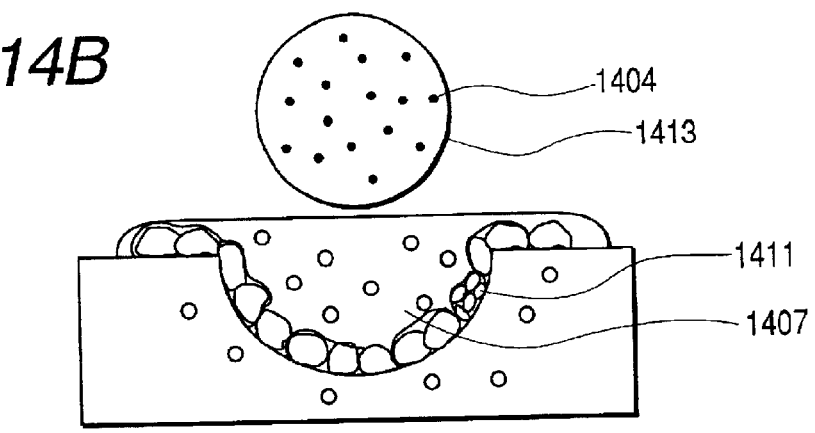

A liquid composition 1406 reactive with the coloring material 1404 is first applied as a droplet to the recording medium 1403. As a result, a pool 1407 of the liquid composition is formed (FIG. 14B). In the pool 1407, fine particles 1409 near the fiber surfaces of the recording medium are physically or chemically adsorbed onto the surfaces of the fibers of the recording medium, and the dispersed state of the fine particles becomes unstable to form aggregates 1411 of the fine particles themselves, while the fine particles 1409 apart from the fibers in the pool 1407 are in the original dispersed state.

Figure 14C:
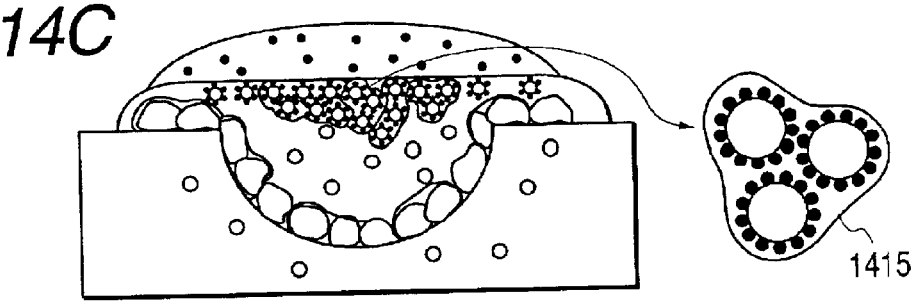

Then an ink 1413 is applied as a droplet to the recording medium 1403 (FIG. 14B). As a result, the coloring material 1404 is chemically adsorbed by the fine particles 1409 at an interface between the ink 1413 and the pool 1407. Since this reaction is a reaction between liquids (liquid—liquid reaction), the coloring material 1404 is considered to be uniformly adsorbed in a monomolecular state on the surfaces of the fine particles 1409 (FIG. 14C). More specifically, it is considered that the coloring material would not aggregate by itself at the vicinity of the surfaces of the fine particles, or that there is very little, if any, agglomeration. As a result, a large number of fine particles adsorbing the coloring material 1404 in the monomolecular state are formed on the surface of the reaction portion 1401, and the coloring material remains in the monomolecular state on the surface area which affects the coloring most. Therefore, a recorded image high in image density and saturation can be formed.

Then, it is considered that the fine particles which adsorbed the coloring material then aggregate by themselves as the dispersed state becomes unstable (FIG. 14C). As a result, the aggregates 1415 formed are holding the coloring material in the monomolecular state inside thereof to form a recorded image of high image density and saturation.

Further, a part of unreacted coloring material 1404 diffuses in the pool 1407 to be adsorbed on the surfaces of unreacted fine particles 1409. As described above, the reaction further proceeds within the pool 1407, so that an image of still higher image density and saturation is formed. The aggregates 1411 of the fine particles formed on the surfaces of fibers of the recording medium are considered to inhibit the penetration of the liquid phase in the pool 1407 into the recording medium. As a result, there are more of coloring material and fine particles in the pool 1407 to enhance the contact probability of the coloring material 1404 with the fine particles 1409, and the reaction proceeds uniformly and sufficiently to form an image of more uniformity with high image density and saturation.

When the liquid composition 1406 is applied to the recording medium 1403 (FIG. 14A), or the ink 1413 is applied to the pool 1407 (FIG. 14B), changes in the dispersion medium may occur and make the dispersion state of the fine particles 1409 unstable so that some fine particles 1409 may aggregate before the coloring material 1404 is adsorbed thereon. The term "changes in dispersion medium" as used herein means changes generally observed when a liquid is mixed with other liquids or substances, changes in physical properties such as pH, solid concentration, solvent composition, and dissolved ion concentration in the liquid phase. It is considered that when the liquid composition contacts the recording medium or the ink, these changes take place rapidly and complexly to break the dispersion stability of the fine particles, and the aggregates are formed.

It is considered that these aggregates serve to fill the voids of the fibers and to hold more fine particles having adsorbed the coloring material in the surface region of the recording medium. Among these aggregates formed in the pool 1407, there are those adsorbed on the recording medium and those suspended in the liquid phase (having mobility). Those having mobility can adsorb the coloring material in a monomolecular state on the surfaces thereof in the same manner as with the fine particles as described above, to form larger aggregates which contribute to the enhancement of coloring. The aggregates are considered to move together with the liquid phase upon the penetration of the liquid phase along the fibers so as to fill the voids to smooth the surface of the recording medium, thereby contributing to the formation of an image more uniform and high in image density.

The reason why high coloring of the image is obtained, as shown later, by the present invention is considered that the coloring material is adsorbed in a monomolecular state on the fine particles or on the aggregates thereof to remain in the vicinity of the surface of the recording medium. Also fastness of the formed image is enhanced, since the fine particles that have adsorbed the coloring material in the monomolecular state remain fixed on the surface of the recording medium.

Incidentally, although in the above explanation the liquid composition and the ink are applied to the recording medium in this order, the application order of them to the recording medium is not limited thereto, so far as the liquid—liquid mixing of them occurs. Therefore, application may be in an order of the ink and then the liquid composition. As illustrated in FIG. 14B, at least a part of the fine particles in the liquid composition applied to the recording medium are considered to penetrate into the interior of the recording medium as the liquid medium penetrates into the recording medium.

Figure 14D:
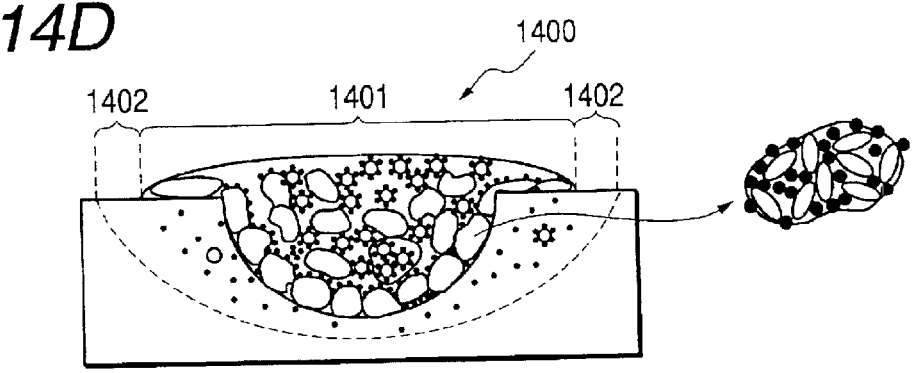

Meanwhile, as illustrated in FIG. 14D, it is also presumable that, in this penetration process, the coloring material is adsorbed by the fine particles that have already penetrated into the recording medium. As described above, the fine particles, on which the coloring material has been adsorbed or bonded in a monomolecular state in the recording medium, are considered to contribute to the improvement of coloring ability. Further, it is considered that the fixing ability is also improved by such penetration of the liquid medium.

In addition, by using the liquid composition of the present invention, when the aggregate 1411 of the fine particles are formed on or in the surface of the recording medium, pores of a certain size are formed inside the aggregate. The coloring material 1404 not adsorbed to the fine particles 1409 in the pool 1407 penetrates into the recording medium, and some of coloring material 1404 passes through the pores together with the solvent component to penetrate into the inside of the aggregate 1411. At this time, the coloring material 1404 adsorbs to the vicinity of the openings and to the inner walls of the pores in the aggregate, and only the solvent penetrates into the inside of the recording medium. Thus, much more coloring material can adsorb to the surface and the inside of the aggregate 1411 of the fine particles, and thus remain in the surface region of the recording medium. In addition, when the coloring material 1404 is a dye, the coloring material 1404 adsorbed to the inside of the pores hardly aggregates, but rather, forms an ideal monomolecular state, since the diameter of the pores of the aggregate 1411 is from one to several times as large as the molecular size of the coloring material 1404 in the ink. This contributes greatly to further improvement of coloration, and recorded products having a wider color reproduction range can be obtained.

As described above, the inventors knew that the size of the pores in the aggregate 1411 which is formed when the fine particles 1409 in the liquid composition aggregate on the recording medium closely relates to further improvement of coloration of the ink. The inventors found that the physical properties of the aggregate 1411 are influenced not only by the fine particles in the liquid composition, but also by the solvent composition. It was also found that when the aggregate is made from fine particles in the liquid composition, the volume of the pores having a radius in a certain range has a very high correlation with an ability to form a high quality image on the recording medium.

In addition, in the present invention, the fine particles and the coloring material are reacted in the liquid phase on the surface of the recording medium. Thus, when the coloring material is anionic, it adsorbs very efficiently to the surface of the cationic fine particles. In order to achieve the adsorption of the coloring material to the same extent as that of the present invention with a coated paper for ink jet recording, a large amount of the cationic porous fine particles is required, that is, the ink-receiving layer as thick as to cover the base paper is indispensable, but spoils the texture of the base paper. On the other hand, the amount of the fine particles constituting the liquid composition according to the present invention can be so small that the texture of the recording medium is not spoiled. As a result, it is possible to form an image where the texture of the printed part is congruous with that of the unprinted part.

Further, according to Prior art (1) described before, the amount of the coloring material remaining on the surface of the recording medium may not be sufficient, and according to Prior art (2) described before, even if the amount of the coloring material remaining on the surface of the recording medium is sufficient, the coloring material agglomerates on the surface of the recording medium. On the contrary, in the present invention, the coloring material adsorbed to the surface of the fine particles remains together with the fine particles on the surface of the recording medium, maintaining the monomolecular state. Thus, an image of high coloration can be obtained.

The present invention seems to be similar to Prior art (3), in the point that the image is formed by applying an ink and a liquid composition containing fine particles to the surface of the recording medium. However, in the present invention, the liquid composition is positively reacted with the coloring material using the fine particles in the liquid composition as means for inhibiting agglutination of the coloring material (lake). On the other hand, in the Prior art (3), application of a solution containing fine particles aims to modify the surface condition of the recording medium and no concept is disclosed of chemical reaction between the fine particles and the coloring material in the ink, those having different polarities from each other. And the difference of the image quality of the recorded products according to the present invention and the prior art is obvious, presumably due to the difference of the mechanism.

The method for measuring the liquid composition, characteristic to the present invention will be described below in detail, as well as the ink and liquid composition.

First, a cationic ink or anionic ink in the present specification is defined. When the ionic characteristics of an ink are mentioned, it is well known in the art that the ink itself is not charged, but neutral. The term "anionic ink" or "cationic ink" as used herein means that a component of the ink, for example, a coloring material, has an anionic or cationic group, or its surface has been treated with a compound having an anionic or cationic group, which groups are adjusted so as to behave as an anionic or cationic group in the ink. The same is said with the anionic or cationic liquid composition.

<Method for Measuring the Liquid Composition>

The method for measuring the liquid composition according to the present invention is characterized by determining the volume of the pores having a radius within a specific range in the agglomerate, where the agglomerate is made up from the fine particles in the liquid composition comprised of at least the fine particles and a solvent. First of all, in measuring physical properties of these pores, the liquid composition is pretreated in the following steps:

(1) the liquid composition as described above is dried in an ambient atmosphere at 120° C. for 10 hr to evaporate almost all solvent;

(2) then the temperature is raised from 120° C. to 700° C. for 1 hr and subsequently, and then to 700° C. for 3 hr for burning;

(3) then the temperature of the baked product as described above is lowered gradually to room temperature, and the product is powdered.

This pretreatment is to form the agglomerate of fine particles from the liquid composition by drying, to completely remove the solvent by burning so as to empty the pores in the agglomerate as pore space.

The size of the pores of the agglomerate to be measured in the present invention is the volume of pores having a radius ranging from 3 nm to 30 nm. It is unclear why high correlation is observed between the volume of the pores in this range and the image quality, but presumably because with the pores having a smaller radius than this range, penetration of the coloring material and the solvent component into the agglomerate decreases remarkably. Thus, the coloring material absorbed by the pores does not substantially contribute to the coloration improvement. On the other hand, with the pores larger than this range, penetration of the coloring material and solvent component may occur easily. However, it may be difficult for the coloring material adsorbed to around the opening and the inner wall of the pore to participate in the light absorption due to the light scattering of the pores themselves, causing a decrease in coloration.

Consequently, measuring both the volume of the pores having a radius ranging from 3 nm to 30 nm, and the volume of pores having a radius larger than 30 nm is effective to determine the coloration ability in the image formation. As the method for measuring the physical properties of these pores in these ranges, the method employing the nitrogen adsorption and desorption method is most preferable. The radius of the pores and the volume of the pores can be known by the method of Barrett et al. (J. Am. Chem. Soc. Vol. 73, 373, 1951). The pretreated sample is degassed under vacuum at 120° C. for 8 hr, and then subjected to the determination. More preferably, the volume of the pores having a radius ranging from 3 nm to 20 nm and the volume of those having a diameter larger than 20 nm are determined. These ranges are preferable when the coloring material is a dye, for seeking further improvement of coloration.

<Liquid Composition>

The liquid composition according to the present invention will be described below.

—Radius and Volume of the Pores of the Agglomerate—

As described above, preferably the radius of the pores of the agglomerate ranges from 3 nm to 30 nm in view of rapid penetration of and adsorption of the coloring material to around the opening and inner wall of the pores and of preventing agglomeration of the coloring material inside the pores. At the same time, in order to take the coloring material into the agglomerate in an amount sufficient for improving coloration, a certain volume is required for the pores. As the increase of the volume of pores also means increase of the number of pores, not only the coloring material adsorbed to the inside of the pores, but also the coloring material adsorbed to around the opening of the pores will increase.

Thus, from these viewpoints, it is preferable that the volume of the pores having a radius ranging from 3 run to 30 nm is 0.4 ml/g or more and the volume of the pores having a radius larger than 30 nm is 0.1 ml/g or less in the liquid composition preferably used for the present invention. In the pores having a radius smaller than 3 run, it is difficult for the coloring material and solvent component to penetrate into the inside of the pores and the pores of the agglomerate do not substantially contribute to improvement of coloration. On the other hand, when the volume of the pores having a radius larger than 30 nm exceeds 0.1 ml/g, pores having large light scattering increase so that the contribution of the coloring material adsorbed to such pores to coloration is lowered. Also, it is not preferable that the volume of pores having a radius within the above range is less than 0.4 ml, because there is less coloring material and solvent component to penetrate into the inside of the agglomerate, the amount of the coloring material adsorbed to around the opening and the inner wall of the pore is reduced, decreasing in contribution to improvement of coloration.

It is preferable that the volume of the pores having a radius ranging from 3 nm to 20 nm is 0.4 ml/g or larger and the volume of the pores having a radius larger than 20 nm is 0.1 ml/g or smaller. This means that there are a large number of pores having a radius ranging 3 nm to 20 nm, whereby coloration is further improved to enable formation of an image having a wider color reproduction range, particularly when a dye is used as the coloring material. The radius of the pores and the volume of the pores of the agglomerate are changed not only by the chemical species, shape, and size of the fine particles but also solvent species, other additives, their composition ratios, and the like. Thus, it is considered that controlling these conditions allows controlling the conditions of formation of the agglomerate of fine particles.

—Fine Particles—

Actions expected of the fine particles used in the present invention are, for example, 1) adsorption of a coloring material without impairing the inherent coloring ability of the coloring material on mixing; and
2) breakdown of the dispersion stability when they are mixed with an ink or applied to a recording medium, so as to remain on the surface of the recording medium. Fine particles showing such actions are preferably used. Incidentally, fine particles of one or more kinds may be used for such actions.

For action 1), they may have an ionicity opposite to the coloring material used to adsorb the coloring material electrostatically. When the coloring material is anionic, cationic fine particles are used, while anionic fine particles are used when the coloring material is cationic. Besides the ionicity, adsorption of the coloring material is affected by the size and weight of the fine particles, and the surface profile thereof. For example, porous fine particles having many pores on the surface thereof exhibit specific adsorption characteristics and can adsorb the coloring material by virtue of a plurality of factors such as size and shape of the pores.

Action 2) is triggered by an interaction with an ink or a recording medium. Therefore, the action may be achieved by respective constitutions thereof. For example, the fine particles may exhibit an ionicity opposite to the components of the ink and the recording material. The dispersion stability is also affected by the presence of electrolytes in the ink or liquid composition. In the present invention, it is desirable that at least one of actions 1) and 2) occurs instantly. It is further preferable that both actions 1) and 2) occur instantly. Liquid compositions containing the respective ionic fine particles will hereinafter be described specifically.

<Cationic Liquid Composition>

Cationic liquid composition is, for example, exemplified by a liquid composition containing fine particles having a cationic group on the surface thereof, and an acid, where the fine particles are stably dispersed. In the present invention, as the cationic liquid composition, for example, those containing an acid and having a pH of 2 to 7, or those having a zeta potential ranging from +5 to +90 mV, can be preferably used.

—pH and Zeta Potential—

The zeta potential of a liquid composition will be described below. Basic principles of the zeta potential will be given below. As a rule, in a system where a solid matter is dispersed in a liquid, when a free electric charge is present on the surface of a solid phase, a layer of opposite charge appears in the liquid phase in the vicinity of the boundary of the solid phase to maintain electric neutrality. This is called an electric double layer and the potential created by this electric double layer is called the zeta potential. When the zeta potential is plus, the surface of the fine particles shows cationic property and when it is minus, it shows anionic property. Generally, it is presumed that the higher the absolute value, electrostatic repulsion working between the fine particles increases, so as to be evaluated as having good dispersibility and also, the ionic property is strong on the surface of the fine particles. In other words, it can be said that the higher the zeta potential of the cationic fine particles, the stronger the cationic property and the stronger the force attracting anionic compounds in the ink is strong.

As a result of intensive study of the inventors, it was found that when a liquid composition of which the zeta potential falls in the range from +5 to +90 mV, the colored portion formed on the recording medium shows particularly excellent coloring properties. The cause is unclear; probably, due to proper cationic properties of the fine particles, rapid cohesion of the anionic compound (anionic coloring material) will not occur and the anionic compound adsorbs thinly and evenly to the surface of the fine particles, not forming large lumps of lake. As a result, it is presumed that the inherent coloring characteristic of the coloring material is expressed in the better state. In addition, in the cationic liquid composition according to the present invention, even after the anionic compound adsorbs to the surface of the fine particles, the fine particles are weakly cationic, and the dispersion state becomes unstable. As a result, the fine particles agglomerate and adsorb easily to the surface of anionic cellulose fibers of the recording medium to remain in the surface region of the recording medium.

It is considered that this results in the following excellent advantageous effects, that is, excellent coloring properties comparable to ink jet printing on coated paper can be obtained; excellent color evenness can be obtained because of less white haze and less color irregularity in an image area such as the shadow part and solid part where a large quantity of ink is applied; since the anionic compound adsorbs and develops color very efficiently to the surface of the fine particles in comparison with the coated paper, the application amount of the cationic fine particles can be reduced and thus, particularly with printing on plain paper, the texture of the paper is not lost and rub-off resistance is excellent in the printed part. The more preferable zeta potential of the liquid composition ranges from +10 to +85 mV and in this range, boundaries between dots in solid printing become inconspicuous and a good image having less stripe-like irregularity due to head scanning is obtained. Further, use of the liquid composition containing the cationic fine particles of which the zeta potential falls in the range from +15 to +65 mV enables an image of very excellent coloration, regardless of the paper type.

It is preferable that the pH of the cationic liquid composition according to the present invention, from the viewpoint of storage stability and adsorption of the anionic compound, should range from 2 to 7 at about 25° C. In this pH range, when the liquid composition is mixed with the anionic ink, stability of the anionic compound is not disturbed much and strong cohesion of the anionic compound does not occur, so that the reduction of color saturation or dull color of the recorded image can be prevented. Incidentally, in the range as described above, the dispersion state of the cationic fine particles is good and thus, storage stability of the liquid composition and ejection stability from a recording head can be maintained in a good condition. In addition, when the liquid composition of this pH is mixed with the ink, anionic material adsorbs sufficiently to the surface of the cationic fine particles and therefore, excessive penetration of the coloring material into the recording medium is suppressed to yield an ink jet-recorded product of excellent coloration. More preferably, the pH range is from 3 to 6. In this range, corrosion of the recording head due to long-term storage can be very effectively prevented and also rub-off resistance of the printed part is further improved.

<Cationic Fine Particle>

Next, the component constituting the cationic liquid composition according to the present invention will be described. In order to achieve the function as described above, the cationic fine particles, the main component of the liquid composition, are required to have cationic properties on the surface thereof when dispersed in the liquid composition. When the liquid composition and an ink are mixed, the cationic surface allows rapid adsorption of the anionic coloring material to the surface of the particles, thus suppressing excess penetration of the coloring material into the recording medium. As a result, the ink jet-recorded product of a sufficient optical density of image can be obtained. On the other hand, if the liquid composition contains fine particles the surface of which is not cationic and a water-soluble cationic compound, the coloring material coagulates mainly with the cationic compound, which deteriorates the coloring properties of the coloring material. As a result, coloration comparable with the ink-jet printing on the coated paper is difficult to obtain. Thus, the fine particles used for the liquid composition according to the present invention should have cationic surfaces. As the fine particles of the liquid composition of the invention, not only inherently cationic particles but also inherently statically anionic or neutral fine particles can be used so long as the surface thereof has been treated to be cationic.

The cationic fine particles preferable for the present invention are not specifically limited so long as they can form pores in the agglomerate when they agglomerate on the recording medium. For example, they are exemplified by cationized silica, alumina, hydrated alumina, titania, zirconia, boria, silica boria, ceria, magnesia, silica magnesia, calcium carbonate, magnesium carbonate, zinc oxide, hydrotalcite, etc., complex fine particles and organic fine particles thereof, and inorganic-organic complex fine particles. In the liquid composition according to the present invention, these fine particles can be used singly or in combination of two or more.

Among these, fine particles of hydrated alumina are particularly preferable, because they have a positively charged surface. In addition, hydrated alumina having a boehmite structure by X-ray diffraction is preferably used to obtain excellent coloration and color evenness, and storage stability. The hydrated alumina is expressed by the following formula:

$$Al_2O_{3-n}(OH)_2 \cdot mH_2O$$

wherein n represents one of integers 1 to 3, m has a value of 0 to 10 and preferably, 0 to 5, where $mH_2O$ represents dissociable water phase mostly not involved in the crystal lattice formation and thus, m can represent a value not an integer, and m and n are not 0 at the same time.

Generally, a crystal of hydrated alumina having a boehmite structure is a laminated compound of which face (020) forms a huge plane and shows a specific diffraction peak in the X-ray diffraction pattern. Other than a perfect boehmite, a pseudo boehmite structure, in which excess water is contained between laminae of the faces (020), can be possible. The X-ray diffraction pattern of the pseudo boehmite shows the diffraction peak broader than the perfect boehmite.

Boehmite and pseudo boehmite can not be clearly distinguished and hence, unless otherwise specified in the present invention, both are included in the hydrated alumina showing the boehmite structure (hereafter referred to as hydrated alumina). To determine the (020) face spacing and crystal thickness, the peak which appears at a diffraction angle 2θ of 14 to 15° is measured, and using the half width value B and the diffraction angle 2θ of the peak, the spacing is calculated by Bragg's formula and the crystal thickness is calculated by Scherrer's formula. The spacing of (020) can be used as an index of hydrophobicity and hydrophilicity of the hydrated alumina. The method for manufacturing hydrated alumina used in the present invention is not limited specifically. Hydrated alumina having a boehmite structure can be produced by known methods such as hydrolysis of aluminum alkoxide, hydrolysis of sodium aluminate, and the like.

As disclosed in Japanese Patent Application Laid-Open No. 56-120508, hydrated alumina of boehmite structure can be produced from hydrated alumina being amorphous by X-ray diffraction by thermal treatment at the temperature of 50° C. or higher in the presence of water. A particularly preferable method is to yield hydrated alumina by hydrolysis and deflocculation of a long-chain aluminum alkoxide with an acid. The long-chain aluminum alkoxide is, for example, an alkoxide having 5 or more carbon numbers, and an alkoxide having carbon numbers of 12 to 22 is preferable because of easy removal of alcohol in a manufacturing step and easy control of the shape of aluminum alkoxide, as described later.

As the acid to be added, one or more of organic and inorganic acids can be used by choice. Nitric acid is most preferable in the point of reaction efficiency of hydrolysis and shape control and dispersibility of hydrated alumina yielded. It is possible to control the particle size by carrying out the hydrothermal synthesis after this. If hydrothermal synthesis is carried out by using a dispersion of hydrated alumina containing nitric acid, nitric acid is taken up by the surface of hydrated alumina as a nitrate radical group resulting in improvement of dispersibility of the hydrate in water.

Hydrated alumina preparation by hydrolysis of aluminum alkoxide has an advantage that contamination of impurities such as various ions would not occur in comparison with the method for manufacturing alumina hydrogel and cationic alumina. In addition, the long-chain aluminum alkoxide has another advantage that alcohol can be completely removed from the hydrated alumina in comparison with a short-chain alkoxide such as aluminum isopropoxide. It is preferable that the pH of the solution at the start of hydrolysis is set lower than 6. A pH of 8 or lower can effectively inhibit the final hydrated alumina from having crystalline properties.

The hydrated alumina used for the present invention can be a hydrated alumina containing a metal oxide such as titanium dioxide so long as it has the boehmite structure by X-ray diffraction. Preferably, the metal dioxide such as titanium dioxide can be contained in hydrated alumina in the range from 0.01 to 1.00% by weight in view of high optical density, and more preferably 0.13 to 1.00% by weight for fast adsorption of the coloring material whereby occurrence of blotting or beading is inhibited. In addition, the titanium dioxide should have a titanium valence of +4. Content of titanium dioxide can be analyzed by the ICP method of melting titanium oxide in boric acid. Distribution of titanium dioxide in hydrated alumina and the valence of titanium are analyzed by employing ESCA (Electron Spectroscopy for Chemical Analysis). ESCA is a surface analysis method capable of analyzing the condition of chemical bonds of the element on the surface of a substance at a nano order level.

Etching of the surface of hydrated alumina with argon ion for 100 sec and 500 sec allows examination of the change of titanium content. When the valence of titanium becomes less than +4, titanium dioxide may act as a catalyst to cause deterioration of weather fastness of the printed matter and yellowing of the printed matter.

Titanium dioxide may be contained only in the surface region of the hydrated alumina or may be contained in the internal part too. Otherwise, its content may change from the surface to the internal part. It is more preferable that titanium dioxide is contained in only the close vicinity of the surface, because the electrical characteristics of the hydrated alumina are easily maintained.

To manufacture hydrated alumina containing titanium dioxide, a method of hydrolyzing a mixture solution of aluminum alkoxide and titanium alkoxide is preferable, as described by Tamaru (ed., Surface Science, p. 327, published by Gakkai Syuppann Center 1985.), Alternatively, it can be manufactured by adding aluminum alkoxide as a nucleus for crystal growth to the mixture solution of aluminum alkoxide and titanium alkoxide when it is hydrolyzed.

In the place of titanium dioxide, oxides of silica, magnesium, calcium, strontium, barium, zinc, boron, germanium, tin, lead, zirconium, indium, phosphorus, vanadium, niobium, tantalum, chromium, molybdenum, tungsten, manganese, iron, cobalt, nickel, ruthenium, and the like can be contained for use. For example, hydrated alumina containing silica can improve rub-off resistance of the printed part.

The (020) face spacing of hydrated alumina used preferably for the present invention ranges from 0.614 nm to 0.626 nm. Within this range, the dispersibility of hydrated alumina particles in the liquid composition is excellent, and thus a liquid composition excellent in storage stability and ejection stability can be obtained. The reason for these advantages is not clear. However, it is considered that when the (020) face spacing falls in the above range, the ratio of hydrophobic and hydrophilic parts of hydrated alumina falls in the proper range. Thus, good ejection stability of the liquid composition can be obtained because of the proper dispersion stability by moderate repulsion of particles in the liquid composition and the proper balance of wettability at the inside of the ejection orifice.

The crystal thickness of (020) face of hydrated alumina ranges preferably from 4.0 to 10.0 nm. This range is preferable because of excellent clearness and adsorption of the coloring material. According to findings by the present inventors, the spacing and crystal thickness of the (020) face have a correlation and therefore, when the spacing of the (020) face falls in the above range, the crystal thickness of the (020) face can be adjusted to the range from 4.0 to 10.0 nm.

In addition, alumina (aluminum oxide) made by thermal treatment such as calcination of hydrated alumina described above, metal aluminum, aluminum salt, etc., is preferably used because it also has a positive charge. There are alumina having crystalline forms such as α type and γ type, and δ, χ, η, ρ, β types and any of them can be used so long as it has a surface kept cationically, and is dispersible stably in water. Among them, the γ type is preferably used, since it is active in the surface, high in an adsorbing ability of the coloring material, is readily formed into a stable dispersion of relatively finely particulated particles and hence, excellent in coloration, storage properties, ejection stability, and the like.

In view of coloring and uniform coloring abilities, storage stability, etc, the cationic fine particles preferably have an average particle diameter within a range of from 0.005 to 1 μm determined by the dynamic light scattering method. When the average particle diameter is not within this range, the fine particles may excessively penetrate into the recording medium to lower the coloring and uniform coloring abilities, or they may precipitate in the liquid composition to lower the storage stability of the liquid composition. The average particle diameter is more preferably within a range of from 0.01 to 0.8 μm. Use of such fine particles can make the rub-off resistance and texture of a printed image on a recording medium particularly preferable. Further preferable is that having average particle size which ranges from 0.03 to 0.3 μm. Such fine particles are preferable because the pores having a radius in the target range are effectively formed in the agglomerates of fine particles formed on the recording medium.

<Physical Properties and Shape of the Cationic Fine Particles>

In order to form pores efficiently in the agglomerates of the fine particles formed on the recording medium and to adsorb efficiently the coloring material on the surface of the fine particles, preferable cationic fine particles to be used in the present invention are those having pores of which the maximum radius ranges from 2 nm to 12 nm and the total volume of which is 0.3 ml/g or larger as determined by the nitrogen adsorption and desorption method described above. More preferably, the maximum radius of the pores ranges from 3 nm to 10 nm and the total volume of the pores is 0.3 ml/g or larger, because the agglomerate made of fine particles formed on the recording medium can have pores having a radius in the target range effectively.

When the BET surface area of the fine particles falls in the range from 70 to 300 $m^2/g$, there are sufficient sites for adsorption of the coloring material on the surface of the fine particles, whereby the coloring material remains effectively on and/or in the surface of the recording medium in the monomolecular state to contribute to coloration improvement.

The shape of the fine particles used in the present invention can be observed by transmission electron microscopy using a sample prepared by dropping the fine particles dispersed in ion exchanged water on a collodion membrane. In the present invention, the pores are formed within the agglomerate when the fine particles agglomerate on the recording medium. Accordingly, fine particles preferably used are rod-like or necklace-like non-globular ones in which primary particles having acicular, plate or globular shape are bound in a specific orientation to form a secondary particle.

According to findings by the present inventors, the plate-like shape is better in dispersibility in water than that of acicular and hairy bundle (cilia-like) and more preferable because when the agglomerate is formed from fine particles, the orientation of the fine particles becomes random resulting in an increase in the volume of the pores. Here, "hairy bundle" means the state in which acicular fine particles agglomerate like a bundle of hairs contacting each side face. It has been publicly known that the pseudo boehmite, one of the hydrated aluminas particularly preferably usable in the present invention, has cilia-like and other shapes (Rocek J. et al. Applied Catalysis vol. 74: p. 29 to 36, 1991).

An aspect ratio of the plate-like particles can be calculated by the method defined in Japanese Patent Publication No. 5-16015. The aspect ratio is expressed by a ratio of the diameter to the thickness of the particle. Here, the diameter is defined as that of a circle having the same area as a projected image of the particle observed by an optical microscope or an electron microscope. A longitudinal-transverse ratio is expressed by the ratio of the diameter showing the maximum value to the diameter showing the minimum value of a plane face by observation similar to that of the aspect ratio. In case of hairy bundle shape, the aspect ratio can be determined by assuming that individual acicular hydrated alumina particles forming the hairy bundle are cylindrical, and measuring diameters of a top and a bottom circles and the length respectively, and calculating the ratio. In the most preferable shape of hydrated alumina, an average aspect ratio ranges preferably from 3 to 10 in the plate-like shape and the average aspect ratio ranges preferably from 3 to 10 in the hairy bundle. If the average aspect ratio falls in the range described above, the agglomerate made of fine particles can easily have a porous structure, because space is easily created between particles.

The content of the cationic fine particles in the liquid composition used in the present invention may be suitably determined within an optimum range according to the kind of substance used. However, it is preferably within a range of from 0.1 to 40% by weight, more preferably from 1 to 30% by weight, most preferably from 3 to 15% by weight from the viewpoint of achieving the objects of the present invention. In such a range, an image excellent in coloring can be stably obtained irrespective of the kind of paper used. In addition, the storage stability and ejection stability of the liquid composition also become excellent.

<Acid>

As described above, the preferable liquid composition according to the present invention contains an acid and is adjusted to 2 to 7 in the pH. The acid as a second component plays a role of ionizing the surfaces of the cationic fine particles to enhance surface potential, thereby enhancing the dispersion stability of the fine particles in a liquid, and moreover enhancing the adsorbing ability of an anionic compound in an ink and adjusting the viscosity of the liquid composition. No particular limitation is imposed on the acid suitably used in the present invention so far as it brings about the desired pH, zeta potential, and physical properties such as dispersibility of the fine particles. It may be freely selected for use from the following inorganic acids and organic acids, for example.

Specific examples of the inorganic acids include hydrochloric acid, sulfuric acid, sulfurous acid, nitric acid, nitrous acid, phosphoric acid, boric acid and carbonic acid. The organic acids may be carboxylic acids, sulfonic acids and amino acids as mentioned below.

Examples of the carboxylic acids are formic acid, acetic acid, chloroacetic acid, dichloroacetic acid, trichloroacetic acid, fluoroacetic acid, trimethylacetic acid, methoxy-acetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, o-aminobenzoic acid, m-aminobenzoic acid and p-amino-benzoic acid.

Examples of the sulfonic acids include benzenesulfonic acid, methylbenzenesulfonic acid, ethylbenzenesulfonic acid, dodecylbenzenesulfonic acid, 2,4,6-trimethylbenzenesulfonic acid, 2,4-dimethyl-benzenesulfonic acid, 5-sulfosalicylic acid, 1-sulfo-naphthalene, 2-sulfonaphthalene, hexanesulfonic acid, octanesulfonic acid and dodecanesulfonic acid.

Examples of the amino acids are glycine, alanine, valine, α-aminobutyric acid, γ-aminobutyric acid, β-alanine, taurine, serine, ε-amino-n-caproic acid, leucine, norleucine and phenylalanine.

These may be used either singly or in any combination thereof in the liquid composition used in the present invention. Among these, in particular, acids having a primary dissociation constant pKa in water of 5 or less may be preferably used to enhance the dispersion stability of cationic fine particles and the ability to adsorb anionic compounds. Specific examples thereof are hydrochloric acid, nitric acid, sulfuric acid, phosphoric acid, acetic acid, formic acid, oxalic acid, lactic acid, maleic acid and malonic acid.

In the liquid composition according to the present invention, the mixing ratio of the cationic fine particles (A) and the acid (B) is preferably in the range from A:B=200:1 to 5:1 and more preferably, from 150:1 to 8:1 by weight to realize excellent dispersion stability of the cationic fine particles and adsorbability of the anionic compound to the surface of the fine particles.

<Other Constitutional Components>

Other components constituting the cationic liquid composition are specifically described below. The cationic liquid composition according to the present invention contains cationic fine particles as the essential component, preferably an acid as described above, and additionally, a liquid medium, which is usually water. However, in addition, it may contain a water-soluble organic solvent and other additives.

Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, 1,2,6-hexanetriol, glycerol, N-methyl-2-pyrrolidone, 1,3-dimethylimidazolidinone, triethanolamine, sulfolane and dimethyl sulfoxide. No particular limitation is imposed on the content of the water-soluble organic solvent. However, it is preferably within a range of from 5 to 60% by weight, more preferably from 5 to 40% by weight based on the total weight of the liquid composition.

Besides the above components, additives such as viscosity modifiers, pH adjustors, antiseptics, various surfactants, antioxidants, evaporation accelerators, water-soluble cationic compounds and binder resins may be suitably incorporated as needed. The selection of the surfactants is particularly important from the viewpoint of controlling the penetrability of the liquid composition into a recording medium. The surfactant is exemplified by cationic surfactants such as compounds of primary, secondary, tertiary amine salt types, specifically, hydrochlorides, acetates, and the like of lauryl amine, palm amine, stearyl amine, rosin amine, and the like; compounds of quaternary ammonium salt type, specifically lauryl trimethyl ammonium chloride, cetyl trimethyl ammonium chloride, lauryl dimethylbenzyl ammonium chloride, benzyl tributyl ammonium chloride, benzalkonium chloride, and the like; pyridinium salt type compounds, specifically, cetyl pyridinium chloride, cetyl pyridinium bromide, and the like; imidazolin type cationic compounds, specifically, 2-heptadecenyl-hydroxyethylimidazolin, and the like; and ethylene oxide-added higher alkylamines, specifically, dihydroxyethyl stearylamine, and the like and amphoteric surfactants showing cationic properties in a specific pH range can be used. Specifically, for example, amino acid type amphoteric surfactants; compounds of R—NH—CH$_2$—COOH type; compounds of betaine type, specifically, carboxylic acid salt type amphoteric surfactants such as stearyl dimethyl betaine, lauryl dihydroxyethyl betaine, and the like; and in addition, amphoteric surfactants such as sulfate ester type, sulfonate ester type, phosphate ester type, and the like are exemplified.

In addition, as nonionic surfactants, the following nonionic surfactants are, for example, exemplified: polyoxyethylene alkylethers, polyoxyethylene alkylesters, polyoxyethylene sorbitan alkylesters, acetylene alcohols, acetylene glycols, and the like. In the present invention, 1 species or 2 or more species of these compounds can be properly selected for use. Among them, particularly, acetylene alcohols and acetylene glycols can be preferably used to express an excellent effect on penetrability into the plain paper and control of foaming of the ink. The amount changes according to the surfactant used and 0.05 to 5% by weight to the total weight of the liquid composition is preferable to realize enough penetrability.

The water-soluble cationic compounds may be freely selected so far as the action and effect of the present invention is not impeded, for example, in order to impart additional cationic nature to the liquid composition.

The binder resins may be used in combination within a limit not impeding the texture of the recording medium used and the storage stability and ejection stability of the liquid composition, for example, to further improve the rub-off resistance of the printed image, and may be freely selected from water-soluble polymers, emulsions, latexes, etc.

—Surface Tension of the Liquid Composition—

The liquid composition used in the present invention is preferably colorless or white, but may be toned according to the color of the recording medium used. Preferable physical properties of the liquid composition as described above are: surface tension in a range of from 10 to 60 mN/m (dyne/cm), preferably 10 to 40 mN/m (dyne/cm), and viscosity in a range of from 1 to 30 cP.

The anionic liquid composition according to the present invention is characterized in that the fine particles having the anionic group on the surface thereof is the essential constitutional component and the fine particles are dispersed stably. Further, it preferably contains a base, and the pH is adjusted to 7 to 12, and the zeta potential ranges −5 to −90 mV.

As a result of intensive study of the inventors, it was found that when the liquid composition has a zeta potential that falls in the range from −5 to −90 mV, the cationic compound (cationic coloring material) in the ink adsorbs to the surface of anionic fine particles effectively, and the colored portion formed on the recording medium shows particularly excellent coloring properties. The cause is unclear; probably, due to proper anionic properties of the fine particles, rapid cohesion of the cationic compound will not occur and the cationic compound adsorbs thinly and evenly to the surface of the fine particles, not forming large lumps of lake. As a result, it is presumed that the inherent coloring characteristic of the coloring material is expressed in the better state. In addition, in the anionic liquid composition according to the present invention, even after the cationic compound is adsorbed to the surface of the fine particles, the fine particles are weakly anionic, and the dispersion state becomes unstable. As a result, due to the concentration change as the solvent penetrates into the recording medium, the fine particles agglomerate and remain in the surface region of the recording medium.

It is considered that this results in the following excellent advantageous effects, that is, excellent coloring properties comparable with the ink jet printing on coated paper can be obtained; excellent color evenness can be obtained because of less white haze and less irregular coloration in an image area such as the shadow part and solid part where a large quantity of ink is applied; since the cationic compound adsorbs and develops color very efficiently to the surface of the fine particles in comparison with the coated paper, the application amount of the anionic fine particles can be reduced and thus, particularly with printing on plain paper, the texture of the paper is not spoiled and rub-off resistance is excellent in the printed part. The more preferable zeta potential of the liquid composition ranges from −10 to −85 mV and in this range, boundaries between dots in solid printing become inconspicuous and a good image having less stripe-like irregularity due to head scanning is obtained. Further, use of the liquid composition containing the cationic fine particles of which zeta potential falls in the range from −15 to −65 mV enables an image of very excellent coloration, regardless of the paper type.

It is preferable that the pH of the anionic liquid composition according to the present invention, in viewpoint of storage stability and adsorption of the cationic compound, ranges from 7 to 12 at about 25° C. In this pH range, when the liquid composition is mixed with the cationic ink, stability of the cationic compound is not much lowered and strong cohesion of the cationic compound does not occur, so that the reduction of color saturation or dull color of the recorded image can be prevented. Incidentally, in the range as described above, the dispersion state of the anionic fine particles is good and thus, storage stability of the liquid composition and ejection stability from a recording head can be maintained in a good condition. In addition, when the liquid composition of this pH is mixed with the ink, cationic material adsorbs sufficiently to the surface of the anionic fine particles and therefore, excessive penetration of the coloring material into the recording medium is suppressed to yield an ink jet-recorded product of excellent coloration. More preferably, the pH range is from 8 to 11. In this range, corrosion of the recording head due to long-term standing can be very effectively prevented and also rub-off resistance of the printed part is further improved.

<Anionic Fine Particle>

Next, the component constituting the anionic liquid composition according to the present invention will be described. In order to achieve the function as described above, the anionic fine particles, the main component of the liquid composition, are required to have anionic properties on the surface thereof when dispersed in the liquid composition. When the liquid composition and an ink are mixed, the anionic surface allows rapid adsorption of the cationic coloring material to the surface of the particles, thus suppressing excess penetration of the coloring material into the recording medium. As a result, the ink jet-recorded product of a sufficient optical density of image can be obtained. On the other hand, if the liquid composition contains the fine particles of which the surface is not anionic and a water-soluble anionic compound, the coloring material coagulates mainly with the anionic compound, which deteriorates the coloring properties of the coloring material. As a result, coloration comparable to ink-jet printing on coated paper is difficult to obtain. Thus, the fine particles used for the liquid composition according to the present invention should have anionic surfaces. As the fine particles of the liquid composition of the invention, not only inherently anionic particles but also inherently statically cationic or neutral fine particles can be used so long as the surface thereof has been treated to be anionic.

The anionic fine particles preferable for the present invention are not specifically limited so long as they can form pores in the agglomerate when they agglomerate on the recording medium. For example, they are exemplified by anionized silica, alumina, hydrated alumina, titania, zirconia, boria, silica boria, ceria, magnesia, silica magnesia, calcium carbonate, magnesium carbonate, zinc oxide, hydrotalcite, etc., complex fine particles and organic fine particles thereof, and inorganic-organic complex fine particles. In the liquid composition according to the present invention, these fine particles can be used singly or in combination of two or more.

As described with the cationic fine particles, in view of coloring and uniform coloring abilities, storage stability, etc, the anionic fine particles preferably have an average particle diameter within a range of from 0.005 to 1 μm determined by the dynamic light scattering method. The average particle diameter is more preferably within a range of from 0.01 to 0.8 μm. Use of such fine particles can make the rub-off resistance and texture of a printed image on a recording medium particularly preferable. Further preferable is that having an average particle size which ranges from 0.03 to 0.3 μm. Such fine particles are preferable because the pores having a radius in the target range are effectively formed in the agglomerates of fine particles formed on the recording medium.

<Physical Properties and Shape of the Anionic Fine Particles>

In order to efficiently form pores in the agglomerates of the fine particles formed on the recording medium and to efficiently adsorb the coloring material on the surface of the fine particles, the preferable anionic fine particles to be used in the present invention are those having pores with a maximum radius in the range from 2 nm to 12 nm and the total volume of which is 0.3 ml/g or larger as determined by the nitrogen adsorption and desorption method described above. More preferably, the maximum radius of the pores is in the range from 3 nm to 10 nm and the total volume of the pores is 0.3 ml/g or larger, because the agglomerate made of fine particles formed on the recording medium can have pores having a radius in the target range effectively.

When the BET surface area of the fine particles falls in the range from 70 to 300 $m^2/g$, there are sufficient sites for adsorption of the coloring material on the surface of the fine particles, whereby the coloring material remains effectively on and/or in the surface of the recording medium in the monomolecular state to contribute to coloration improvement.

The shape of the fine particles used in the present invention can be observed by transmission electron microscopy using a sample prepared by dropping the fine particles dispersed in ion exchanged water on a collodion membrane. In the present invention, the pores are formed within the agglomerate when the fine particles agglomerate on the recording medium. Accordingly, fine particles preferably used are rod-like or necklace-like non-globular ones in which primary particles having acicular, plate or globular shape are bound in a specific orientation to form a secondary particle.

The content of the anionic fine particles in the liquid composition used in the present invention may be suitably determined within an optimum range according to the kind of substance used. However, it is preferably within a range of from 0.1 to 40% by weight, more preferably from 1 to 30% by weight, most preferably from 3 to 15% by weight from the viewpoint of achieving the objects of the present invention. In such a range, an image excellent in coloring can be stably obtained irrespective of the kind of paper used. In addition, the storage stability and ejection stability of the liquid composition also become excellent.

<Base>

As described above, the preferable anionic liquid composition according to the present invention contains a base and is adjusted to pH 7 to 12. The base as the second component plays a role of ionizing the surfaces of the anionic fine particles to enhance surface potential, thereby enhancing the dispersion stability of the fine particles in a liquid, and moreover enhancing the adsorbing ability of a cationic compound in an ink and adjusting the viscosity of the liquid composition. No particular limitation is imposed on the base suitably used in the present invention so far as it brings about the desired pH, zeta potential, and physical properties such as dispersibility of the fine particles. It may be freely selected from following inorganic compounds and organic compounds.

Specifically, there may be used, for example, sodium hydroxide, lithium hydroxide, sodium carbonate, ammonium carbonate, ammonia, sodium acetate, ammonium acetate, morpholine, and alkanolamines such as monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, monoisopropanolamine, diisopropanolamine and triisopropanolamine. Among them, bases having a primary dissociation constant pKa in water of 5 or less may be particularly preferable for use because the dispersion stability of anionic fine particles and the ability to adsorb cationic compounds become excellent.

In the liquid composition according to the present invention, the mixing ratio of the anionic fine particles (A) and the base (B) is preferably in the range from A:B=200:1 to 5:1 and more preferably, from 150:1 to 8:1 by weight to realize excellent dispersion stability of the anionic fine particles and adsorbability of the cationic compound to the surface of the fine particles.

<Other Components>

Other components constituting the anionic liquid composition will now be described specifically. The anionic liquid composition used in the present invention comprises the anionic fine particles as an essential component and preferably contains such a base as described above, and besides generally includes water as a liquid medium. However, the liquid composition may further contain a water-soluble organic solvent and other additives, for example, viscosity modifiers, pH adjustors, antiseptics, various surfactants, antioxidants, evaporation accelerators, water-soluble anionic compounds and binder resins, may be suitably incorporated.

The surfactant is exemplified by anionic surfactants such as aliphatic acid salts, sulfate ester salts of higher alcohols, sulfate ester salts of liquid fatty oils, alkylaryl sulfonate salts, and the like and non ionic surfactants such as polyoxyethylene alkylethers, polyoxyethylene alkylesters, polyoxyethylene sorbitan alkylesters, acetylene alcohols, acetylene glycols, and the like. In the present invention, 1 species or 2 or more species of these compounds can be properly selected for use. Among those as described above, particularly, acetylene alcohols and acetylene glycols can be preferably used to express an excellent effect of penetrability into the plain paper and high-foam property. The amount for use changes according to the surfactant and 0.05 to 5% by weight to the total weight of the liquid composition is preferable to realize enough penetrability.

<Surface Tension of the Liquid Composition>

The liquid composition used in the present invention is preferably colorless or white, but may be toned according to the color of the recording medium used. Preferable physical properties of the liquid composition as described above are: surface tension in the range of from 10 to 60 mN/m (dyne/cm), preferably 10 to 40 mN/m (dyne/cm), and viscosity in the range of from 1 to 30 cP.

—Method for Dispersion of the Liquid Composition—

The liquid composition according to the present invention, containing the fine particles as described above, can be prepared by a conventional method generally employed for dispersion. Mild mixing apparatus such as a homomixer or a rotator as is preferable rather than a grinding type apparatus such as a ball mill and a sand mill. Shear stress changes in accordance with viscosity, amount, and volume of the liquid composition and is preferably in the range from 0.1 to 100 $N/m^2$. Applying strong shear stress over the range described above is not preferable, because there is a possibility of causing such phenomena as gelation of the liquid composition, change of crystal structure, and the like. In addition, the range from 0.1 to 20 $N/m^2$ is more preferable because of preventing the destruction of the pore structure of the fine particle so as not to reduce the volume of the pores.

The dispersion time changes in accordance with the quantity of the dispersion liquid, the size of the container, the temperature of the dispersion liquid, and the like. A time of 30 hr or shorter is preferable for prevention of the change of crystal structure of the fine particles and a time of 10 hr or shorter allows controlling the pore structure of the fine particles within the range described above. During dispersion treatment, the temperature of the dispersion liquid may be kept to a specific range by cooling or warming. A preferable temperature range differs between methods for dispersion treatment, materials, and viscosities, but is 10 to 110° C. When the temperature is lower than the lower limit of the range, insufficient dispersion treatment takes place and agglomeration of the fine particles occurs. When the temperature is higher than the upper limit of the range, gelation of the liquid and the change of crystal structure of the fine particles may occur.

<Water-Based Ink>

Anionic Ink

An aqueous anionic ink constituting an ink set of the present invention in combination with a cationic liquid composition described above will now be described. The anionic ink used in the present invention contains a water-soluble dye having an anionic group as a coloring material. When a water-insoluble dye or a pigment is used as a coloring material, an anionic compound is preferably used in combination with the coloring material. In addition to the coloring material, the anionic ink in the present invention further contains water, a water-soluble organic solvent and other components, for example, a viscosity modifier, a pH adjustor, an antiseptic, a surfactant, an antioxidant, rust preventives, antimold agents, evaporation accelerators, chelating agents and water-soluble polymers in addition to the above-described components, etc., as needed. These individual components for the ink will hereinafter be described.

—Water-Soluble Dye—

No particular limitation is imposed on the water-soluble dyes having an anionic group used in the present invention so far as they are listed in the Color Index, for example, water-soluble acid dyes, direct dyes or reactive dyes. Dyes not listed in the Color Index may also be used without any particular limitation so far as they have an anionic group, for example, a sulfonic group or a carboxylic group. The water-soluble dyes used herein include those having pH dependent solubility.

—Pigment—

Another aspect of the aqueous anionic ink is an ink containing a pigment and an anionic compound in place of a water-soluble dye having an anionic group as described. It further contains water, a water-soluble organic solvent and other optional components such as a viscosity modifier, a pH adjustor, an antiseptic, a surfactant, and an antioxidant. In such an ink, the anionic compound may be contained as a dispersing agent for the pigment. The dispersing agent for the pigment may not be anionic, so long as the ink contains an anionic compound. Of course, when the dispersing agent is anionic, another anionic compound may be added.

No particular limitation is imposed on pigments usable in the present invention. However, for example, pigments described below may be preferably used. A carbon black used in black pigment inks, is preferably one produced by the furnace process or channel process having a primary particle diameter of from 15 to 40 ml, a surface area of from 50 to 300 m$^2$/g as measured by the BET method, an oil absorption of from 40 to 150 m/100 g as determined by using DBP, a volatile matter content of from 0.5 to 10%, and a pH of from 2 to 9.

Examples of commercially-available carbon black having such properties include No. 2300, No. 900, MCF88, No. 40, No. 52, MA7, MA8 and No. 2200B (all, products of Mitsubishi Chemical Corp.), RAVEN 1255 (product of Columbian Carbon Japan Limited), REGAL 400R, REGAL 660R and MOGUL L (all, products of CABOT CO.), and Color Black FW1, Color Black FW18, Color Black S170, Color Black S150, Printex 35 and Printex U (all, products of Degussa AG). It may be newly prepared for the present invention.

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16 and C.I. Pigment Yellow 83.

Examples of pigments used in magenta inks include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122.

Examples of pigments used in cyan inks include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6. Also, they may be those newly prepared for the present invention.

—Dispersing Agent for Pigment—

As a dispersing agent for pigment in the present invention, any water soluble resin may be used so far as it can disperse a pigment stably in water or an aqueous medium by the action of an anionic group. However, those having a weight average molecular weight ranging from 1,000 to 30,000, more preferably from 3,000 to 15,000 are particularly preferred. Specific examples of such water-soluble resins include block copolymers, graft copolymers and random copolymers composed of at least two monomers selected from hydrophobic monomers such as styrene, styrene derivatives, vinylnaphthalene, vinylnaphthalene derivatives and aliphatic alcohol esters of α,β-ethylenically unsaturated carboxylic acids, and hydrophilic monomers such as acrylic acid and derivatives thereof, maleic acid and derivatives thereof, itaconic acid and derivatives thereof, and fumaric acid and derivatives thereof, and salts of these copolymers. These resins are alkali-soluble resins which dissolve in an aqueous solution of a base.

Besides, homopolymers composed of a hydrophilic monomer, or salts thereof may also be used. Further, water-soluble resins such as polyvinyl alcohol, carboxymethyl cellulose and condensates of naphthalenesulfonic acid and formaldehyde may also be used. However, use of an alkali-soluble resin has a merit that the viscosity of the resulting dispersion becomes lower, and the dispersing operation becomes easier. These water-soluble resins are preferably used within a range of from 0.1 to 5% by weight based on the total weight of the ink.

The pigment inks used in the present invention are prepared by dispersing or dissolving such pigment and water-soluble resin as described above in an aqueous medium. The aqueous medium preferably used in the pigment inks is a mixed solvent of water and a water-soluble organic solvent. As the water, it is preferable to use ion-exchanged water (deionized water) instead of tap water containing various ions.

When the dispersing agent is not an anionic polymer, it is preferable to further add an anionic compound to the above-described pigment-containing inks. Examples of such anionic compounds include low-molecular anionic surfactants as well as the high-molecular substances such as the alkali-soluble resins as described above.

Specific examples of the low-molecular anionic surfactants include disodium lauryl sulfosuccinate, disodium polyoxyethylene lauroylethanolamide sulfosuccinate, disodium polyoxyethylene alkyl-sulfosuccinates, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfates, sodium alkylsulfates and triethanolamine alkylsulfates. However, the low-molecular anionic surfactants are not limited to these compounds. The used amount of such an anionic substance as described above is preferably within a range of from 0.05 to 10 % by weight, more preferably from 0.05 to 5% by weight based on the total weight of the ink.

—Self-Dispersing Pigment—

As a pigment usable in the anionic inks, a self-dispersing pigment which can be dispersed in water or an aqueous medium without using any dispersing agent may be used. The self-dispersing pigment is a pigment having at least one kind of anionic hydrophilic group bonded directly or through another atomic group to the surface. The anionic hydrophilic group may be at least one selected from, for example, the following hydrophilic groups,

$$-COOM, -SO_3M, -SO_2NH_2, -PO_3HM \text{ and } -PO_3M_2$$

wherein M is hydrogen, alkali metal, ammonium or organic ammonium; and the other bridging atomic group may be an alkylene group having 1 to 12 carbon atoms, a phenylene group which may be substituted, or a naphthylene group which may be substituted.

Since the above-described pigment, which is anionically charged by introducing the hydrophilic group onto the pigment surface, exhibits excellent dispersibility in water by virtue of repulsion of the ion thereof, it retains a stably dispersed state without the addition of any dispersing agent or the like even when it is contained in an aqueous ink. Carbon black is especially preferable as the pigment.

—Additive Components in Ink—

Besides the above components, a surfactant, an antifoaming agent, an antiseptic and the like may be added to the pigment inks, as needed, to provide them with desired physical properties.

Examples of the surfactant include anionic surfactants such as fatty acid salts, salts of higher alcohol sulfuric esters, salts of liquid fatty oil sulfuric esters and alkylarylsulfonic acid salts; and nonionic surfactants such as polyoxyethylene alkyl ethers, polyoxyethylene alkyl esters, polyoxyethylene sorbitan alkyl esters, acetylene alcohol and acetylene glycol.

One or more of these surfactants may be suitably chosen for use. Among these surfactants, acetylene alcohols and acetylene glycols are suitably used because they have excellent effect on penetrability into plain paper and control of ink foaming. The amount of the surfactant used varies according to the kind of the dispersing agent used, but is desirably within a range of from 0.01 to 5% by weight based on the total weight of the ink. It is preferred that the amount of the surfactant added be determined in such a manner that the surface tension of the resulting ink is at least 30 mN/m (dyne/cm), because the occurrence of deformed printing (inaccurate ink landing) due to wetting of an orifice can be effectively prevented in an ink-jet recording system used in the present invention.

Pigment inks as described above are prepared as follows. First, a pigment is added to an aqueous solution containing at least water and a resin as a dispersing agent. The mixture is stirred and then subjected to a dispersion treatment by dispersing means described later, and if necessary, to a centrifugal treatment to obtain a desired dispersion. Other components as mentioned above are then added to the dispersion and stirred to prepare an ink.

When an alkali-soluble resin is used, a base or amine is preferably added to dissolve the resin in the dispersion. In this case, the amine or base is preferably added at least in an amount calculated from the acid value of the resin according to the following equation.

Amount (g) of amine or base={(acid value of the resin)×(molecular weight of the amine or base)×(amount of the resin)(g)}/5600.

It is effective to conduct premixing of a pigment suspension for at least 30 minutes before the dispersion treatment. This premixing serves to improve the wettability of the surface of the pigment and facilitate adsorption of the dispersing agent on the pigment surface.

Preferable examples of the base to be added to the dispersion containing the alkali-soluble resin as a dispersant include organic bases such as monoethanolamine, diethanolamine, triethanolamine, aminomethylpropanol and ammonia, and inorganic bases such as potassium hydroxide and sodium hydroxide.

Any ordinary dispersing machine may be employed as a dispersing machine to prepare the pigment ink. Examples thereof include ball mills, sand mills, etc. Of these mills, a high-speed sand mill may preferably be used, such as Super Mill, Sand Grinder, Beads Mill, Agitator Mill, Grain Mill, Dyno Mill, Pearl Mill and Coball Mill (all are trade names).

The ink used in the present invention may further contain a water-soluble organic solvent, surfactant, pH adjustor, antirusting agent, antioxidant, evaporation accelerating agent, chelating agent, and water soluble polymer etc., as needed.

The liquid medium used in the present invention to dissolve or disperse the coloring material is preferably a mixture of water and water-soluble organic solvent. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ethers such as tetrahydrofuran and dioxane; polyalkylene glycols such as polyethylene glycol and polypropylene glycol; alkylene glycols of which alkylene moiety has 2 to 6 carbon atoms such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether and diethylene glycol monomethyl (or monoethyl) ether; N-methyl-2-pyrrolidone; 1,3-dimethyl-2-imidazolidinone; sulfolane; dimethyl sulfoxide; cyclic amide compounds such as 2-pyrrolidone and E-caprolactam; and imide compounds such as succinimide.

The content of the water-soluble organic solvent in each ink is generally within a range of from 1 to 40% by weight, preferably from 3 to 30% by weight based on the total weight of the ink, while the content of water in the ink is within a range of from 30 to 95% by weight. If the amount of water is less than 30% by weight, the solubility of the coloring material is deteriorated, and the viscosity of the resulting ink is increased. It is hence not preferable to use water in such a small amount. On the other hand, if the amount of water is greater than 95% by weight, the vaporizing component is too great to sufficiently satisfy the fixation properties.

The anionic inks used in the present invention may also be used for general water-soluble inks for writing utensils, but are particularly suitable for use in an ink-jet recording system of a type that an ink is ejected by the bubbling phenomenon of the ink caused by thermal energy. This recording system has a feature that the ejection of the ink becomes extremely stable, and no satellite dots are generated. In this case, the thermal properties (for example, the specific heat, the coefficient of thermal expansion, the heat conductivity, etc.) of the inks may however be controlled in some cases.

Cationic Ink

An aqueous cationic ink constituting an ink set of the present invention in combination with an anionic liquid composition described above will now be described. The cationic ink used in the present invention contains a water-soluble dye having a cationic group as a coloring material. When a water-insoluble dye or a pigment is used as a coloring material, an cationic compound is preferably used in combination with the coloring material. In addition to the coloring material, the cationic ink in the present invention further contains water, a water-soluble organic solvent and other components, for example, a viscosity modifier, a pH adjustor, an antiseptic, a surfactant, an antioxidant, rust preventives, antimold agents, evaporation accelerators, chelating agents and water-soluble polymers in addition to the above-described components, etc., as needed. These individual components for the ink will hereinafter be described.

—Water-Soluble Dye—

No particular limitation is imposed on the water-soluble dyes having a cationic group used in the present invention so far as they are listed in the Color Index. Dyes not listed in the Color Index may also be used without any particular limitation so far as they have a cationic group. The water-soluble dyes used herein include those having pH dependent solubility.

—Pigment—

Another aspect of the aqueous anionic ink is an ink containing a pigment and a cationic compound in place of a water-soluble dye having a cationic group as described. It further contains water, a water-soluble organic solvent and other optional components such as a viscosity modifier, a pH adjustor, an antiseptic, a surfactant, and an antioxidant. In such an ink, the cationic compound may be contained as a dispersing agent for the pigment. The dispersing agent for the pigment may not be cationic, so long as the ink contains a cationic compound. Of course, when the dispersing agent is cationic, another cationic compound may be added. No particular limitation is imposed on pigments usable in the present invention. Pigments described in the item of Anionic ink may be suitably used.

—Dispersing Agent for Pigment—

As a dispersing agent for pigment in the present invention, any water soluble resin may be used so far as it can disperse a pigment stably in water or an aqueous medium by the action of a cationic group. Specific examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized product thereof.

Namely, there are mentioned N,N-dimethylaminoethyl methacrylate [$CH_2=C(CH_3)-COO-C_2H_4N(CH_3)_2$], N,N-dimethyl-aminoethyl acrylate [$CH_2=CH-COO-C_2H_4N(CH_3)$], N,N-dimethylaminopropyl methacrylate [$CH_2=C(CH_3)-COO-C_3H_6N(CH_3)_2$], N,N-dimethylaminopropyl acrylate [$CH_2=CH-COO-C_3H_6N(CH_3)_2$], N,N-dimethylacrylamide [$CH_2=CH-CON(CH_3)_2$], N,N-dimethylmethacrylamide [$CH_2=C(CH_3)-CON(CH_3)_2$], N,N-dimethylaminoethylacrylamide [$CH_2=CH-CONHC_2H_4N(CH_3)_2$], N,N-dimethylaminoethylmethacrylamide [$CH_2=C(CH_3)-CONHC_2H_4N(CH_3)_2$], N,N-dimethylaminopropylacrylamide [$CH_2=CH-CONH-C_3H_6N(CH_3)_2$] and N,N-dimethylaminopropylmethacrylamide [$CH_2=C(CH_3)-CONH-C_3H_6N(CH_3)_2$].

In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Among these, methyl chloride and dimethylsulfuric acid are preferred for preparing a dispersing agent used in the present invention. Such tertiary amine salts or quaternary ammonium compounds as described above behave as a cation in water, and under neutralized conditions, they are stably soluble in an acidic region. The content of these monomers in the copolymer is preferably within a range of from 20 to 60% by weight.

Examples of other monomers used in the formation of the above-described high-molecular dispersing agent include hydrophobic monomers, for example, acrylic esters having a hydroxyl group, such as 2-hydroxyethyl methacrylate; and acrylic esters having a side chain of long ethylene oxide chain; and styrene monomers, and water-soluble monomers soluble in water at a pH of about 7, such as acrylamides, vinyl ethers, vinylpyrrolidones, vinylpyridines and vinyloxazolidines. As the hydrophobic monomers, styrene, styrene derivatives, vinylnaphthalene, vinylnaphthalene derivatives, (meth)acrylic acid alkyl esters and acrylonitrile can be used. In the high-molecular dispersing agent obtained by the copolymerization, the water-soluble monomer may be used in the range of from 15 to 35% by weight for the stability of the copolymer in an aqueous solution, and the hydrophobic monomer may be used in the range of from 20 to 40% by weight for enhancing the dispersing effect of the copolymer to the pigment.

—Self-Dispersing Pigment—

As a cationically charged carbon black, those having at least one hydrophilic group selected from the following quaternary ammonium groups bonded directly or through another atomic group to the surface thereof can be used. However, in the present invention, the hydrophilic groups are not limited thereto.

—$SO_2N^+H_3$,
—$SO_2N^+H_2COR$,
—$N^+H_3$,
—$N^+R_3$,

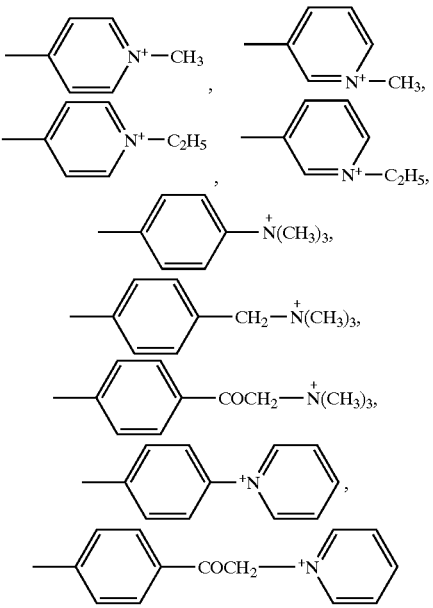

wherein R is a linear or branched alkyl group having 1 to 12 carbon atoms, a substituted or unsubstituted phenyl group, or a substituted or unsubstituted naphthyl group. Incidentally, the above-mentioned cationic groups may have, for example, $NO_3^-$ or $CH_3COO^-$ as a counter ion.

A preparation method of a cationically charged self-dispersing carbon black due to its hydrophilic group is explained with a method to introduce to a pigment an N-ethylpyridyl group:

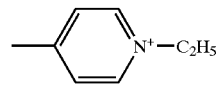

by treating carbon black with 3-amino-N-ethyl pyridinium bromide.

Since the pigment cationically charged by introducing the hydrophilic group into the pigment surface in the above-described manner exhibits excellent dispersibility in water by virtue of repulsion of the ion thereof, it retains a stably dispersed state without adding any dispersing agent or the like even when it is contained in an aqueous ink. Carbon black is especially preferable as the pigment.

<Additives in the Ink>

On the other hand, in addition to the components described above, in order to obtain an ink having desired physical properties, a surfactant, antifoaming agent or antiseptic can be added to the ink. The ink may contain a commercial water-soluble dye.

The surfactant is exemplified by cationic surfactants such as compounds of the primary, the secondary, and the tertiary amine salt types, specifically, hydrochlorides, acetates, and the like of lauryl amine, palm amine, stearyl amine, rosin amine, and the like; compounds of quaternary ammonium salt type, specifically lauryl trimethyl ammonium chloride, cetyl trimethyl ammonium chloride, lauryl dimethylbenzyl ammonium chloride, benzyl tributyl ammonium chloride, benzalkonium chloride, and the like; pyridinium salt type compounds, specifically, cetyl pyridinium chloride, cetyl pyridinium bromide, and the like; imidazolin type cationic compounds, specifically, 2-heptadecenyl-hydroxyethylimidazolin, and the like; and ethylene oxide-added higher alkylamines, specifically, dihydroxyethyl stearylamine, and the like and amphoteric surfactants showing cationic properties in the specific pH range can be used. Specifically, for example, amino acid type amphoteric surfactants; compounds of R—NH—$CH_2$—$CH_2$—COOH type; compounds of betaine type, specifically, carboxylic acid salt type amphoteric surfactants such as stearyl dimethyl betaine, lauryl dihydroxyethyl betaine, and the like; and in addition, amphoteric surfactants such as sulfate ester type, sulfonate ester type, phosphate ester type, and the like are exemplified. In addition, as nonionic surfactants, the nonionic surfactants are, for example, exemplified by polyoxyethylene alkyl ethers, polyoxyethylene alkyl esters, polyoxyethylene sorbitan alkyl esters, acetylene alcohols, acetylene glycols, and the like. In the present invention, 1 species or 2 or more species of these compounds can be properly selected for use. Among those as described above, particularly, acetylene alcohols and acetylene glycols can be preferably used to express an excellent effect of penetrability into the plain paper and high-foam property. The amount thereof to be used changes according to the surfactant used, but 0.05 to 5% by mass to the total mass of the liquid composition is preferable to provide adequate penetrability.

—Surface Tension of Ink—

The cationic inks used in the present invention may desirably be controlled so as to have, as their own physical properties at 25° C., a surface tension of 30 to 68 mN/m (dyn/cm) and a viscosity of 15 mPa·s (cP) or lower, preferably 10 mPa·s (cP) or lower, more preferably 5 mPa·s (cP) or lower from the viewpoints of improving the penetrability of the inks in printed images when printed on plain paper or the like, and at the same time making the matching of the inks with an ink-jet head good.

<Method for Forming the Colored Portion on the Recording Medium>

The method for forming the colored portion on the recording medium according to the present invention will be described below. The method for forming the colored portion on the recording medium according to the present invention has a step (i) to apply an anionic or cationic water-based ink containing the coloring material to the recording medium and the step (ii) to apply to the recording medium a liquid composition containing fine particles of which surface is charged to have the opposite polarity to the ink in a dispersed state, wherein on the surface of the recording medium, the water-based ink and the liquid composition contact each other in the liquid state. The method for applying the water-based ink and the liquid composition constituted as described above to the recording medium will be described below.

The method for forming the colored portion on the recording medium comprises a step (i) of applying such a liquid composition as described above to a recording medium and a step (ii) of applying the anionic or cationic aqueous ink containing a coloring material to the recording medium, wherein the liquid composition is applied to an image forming region or an image forming region and the vicinity thereof to bring about mutual contact between the ink and the liquid composition in a liquid state. Herein, the term "image-forming region" means a region where the ink dots are applied, and the term "the vicinity of the image-forming region" means an outside region about 1 to 5 dots away from the image-forming region.

In the method of forming a colored portion on the recording medium according to the present invention, the liquid composition and the ink may be applied by any method so far as they come into contact with each other in a liquid—liquid state. No problem arises if either of the liquid composition and the ink is first applied to the recording medium. For example, the step (ii) may be conducted after the step (i), or the step (i) may be conducted after the step (ii). It is also preferred that the step (i) be conducted after the step (ii), and then the step (ii) be repeated again. When the liquid composition is first applied to the recording medium, no particular limitation is imposed on the time interval between the composition application and the ink application. However, it is preferable to apply the ink to the recording medium at substantially the same time or within several seconds for the purpose of bringing them into contact with each other in a liquid state.

—Recording Medium—

No particular limitation is imposed on the recording medium used in the ink-jet image forming process described above, and the conventionally used plain paper such as copying paper and bond paper is preferably used. Of course, coated paper specially prepared for ink-jet recording, or transparent films for OHP may also be preferably used. Besides, general-purpose woodfree paper and glossy paper may also be preferably used.

—Method for Applying the Liquid Composition—

Although the liquid composition can be applied to the recording medium by, for example, a sprayer, roller or the like, an ink-jet system is preferably used to apply the liquid composition selectively and evenly only to the image-forming region including or not including the vicinity region. Here, various kinds of ink-jet recording systems may be used, but particularly preferable is a system in which an ink droplet is ejected by a bubble generated by thermal energy.

<Ink Jet Recording Apparatus>

Next, an ink jet recording apparatus according to the present invention will be described. The ink jet recording apparatus according to the present invention is characterized by comprising an ink containing part in which the anionic or cationic water-based ink containing the coloring material is contained, a first recording unit having an ink jet head to discharge the ink, a liquid composition-containing part which contains the liquid composition as described above, according to the present invention, preferably, the liquid composition in which the fine particles electrified on the surface thereof in the polarity opposite to that of the water-based ink as described above is contained in the dispersion state, and a second recording unit having the ink jet head to discharge the liquid composition.

These will be described below. FIG. 1 is a diagrammatic perspective view showing an example of a schematic constitution of the ink jet printing apparatus prepared by applying the present invention. In FIG. 1, a reference numeral 1 is a set of cartridges constituting a print head for carrying out printing by discharging the ink and the reference numeral 2 is the cartridge constituting a liquid composition-discharging head to discharge the liquid composition. In the example illustrated, 4 pieces of cartridges 1 for printing by using inks of different colors and 1 piece of cartridge 2 to discharge the liquid composition are used.

The cartridges 1 for printing have a structure in which an ink tank part and ink discharge part (the printing part) are mounted on a top part and a bottom part, thereof, respectively. The cartridge 2 to discharge the liquid composition has the structure in which a liquid composition tank part and a liquid composition discharge part are mounted on the top part and the bottom part, thereof, respectively. In addition, these cartridges 1 and 2 have connectors to receive actuating and other signals. The reference numeral 3 is a carriage.

On the carriage 3, 4 pieces of the head cartridges (print head) 1 for printing by using inks of different colors and 1 piece of the head cartridge (liquid composition discharge head) 2 to discharge the liquid composition are mounted by positioning. On the other hand, the carriage 3 has a connector holder for transmitting a signal and the like to actuate each of the print head 1 and the liquid composition discharge head 2 and is connected electrically to each of the head cartridges 1 and 2 through the connector holder.

Each print head 1 contains inks of different colors each, for example, inks of yellow (Y), magenta (M), cyan (C), and black (B). In this figures, the head cartridges (print head) 1Y, 1M, 1C, and 1B, in this order from the left side of the illustration, for printing each ink of yellow, magenta, cyan, and black are mounted and, on the right side end, the head cartridge (liquid composition discharge head) 2, in which the liquid composition as described above is contained, to discharge the liquid composition is mounted.

In FIG. 1, the reference numeral 4 is a scanning rail extended to a main scanning direction of the carriage 3 and supporting the carriage slidably and the reference numeral 5 is an actuating belt transmitting an actuating force to reciprocate the carriage 3. On the other hand, the reference numerals 6, 7, and 8, 9 are all pairs of conveying rollers arranged before and after a position of printing by the print head to convey the recording medium 10 by holding it. The recording medium 10 such as paper is guided and supported in a state of pressing to a platen (not illustrated) to regulate a printing face so as to be flat in the part corresponding to the printing position. Here, a discharge port face of each of the head cartridge (head) 1 and 2, which are mounted on the carriage 3, is adapted to be positioned between the rollers 7 and 9 projecting downward from the carriage 3 for conveying the recording medium and faces opposite the recording medium 10 pressed to the guide face of the platen (not illustrated).

Around a home position set in the left side outside the print area of the ink jet printing apparatus of the figure, a recovery unit 11 is installed. In the recovery unit 11, 4 pieces of caps 12 corresponding to the print head (head cartridges) 1Y, 1M, 1C, and 1B and 1 piece of the cap 13 corresponding to 1 piece of the liquid composition discharge head (head cartridge) 2, in which the liquid composition as described above is contained, to discharge the liquid composition are installed vertically movably up and down.

And, when the carriage 3 is in the home position, caps 12 and 13 corresponding to the faces forming the discharge ports of each head 1 and 2 are fitted by pressing and thus, the discharge ports of each head 1 and 2 are sealed (capped). By capping, thickening and adhering of the ink by evaporation of a solvent of the ink in the discharge port is prevented resulting in prevention of occurrence of discharge failure.

On the other hand, the recovery unit 11 has a suction pump 14 communicated with each cap 12 and the suction pump 15 communicated with cap 13. These pumps 14 and 15 are, when discharge failure occurs in the print head 1 and the liquid composition discharge head 2, used for capping those faces forming the discharge ports with caps 12 and 13 to execute sucking and recovering actions. In addition, in the recovery unit 11, two pieces of wiping members (blades) 16 and 17 made of an elastic member such as a rubber are installed. The blade 16 is held by a blade holder 18 and the blade 17 is held by a blade holder 19.

In the schematic diagram of the present invention, both the blade holders 18 and 19 as described above are moved up and down by a blade moving mechanism (not illustrated) actuated by using a motion of the carriage 3 and hence, the blades 16 and 17 as described above move between a protruded position (a wiping position) to wipe a foreign matter and the ink, which have attached to the faces forming the discharge ports of the heads (cartridge) 1 and 2, and a retreated (moved down) position (a stand by position) to cause no contact with the faces forming the discharge ports. In this occasion, the blade 16 to wipe the print head 1 and the blade 17 to wipe the liquid composition discharge head 2 are constituted independently from each other to move up and down individually.

And, in FIG. 1, when the carriage 3 moves from the right side (print area side) to the home position side or moves from the home position side to the print area side, the blade 16 abuts the faces forming the discharge port of each print head 1 and the blade 17 abuts the faces forming the discharge port of the liquid composition discharge head 2 to move relative to them, resulting in a wiping motion of those faces forming the discharge ports.

Figure 2:
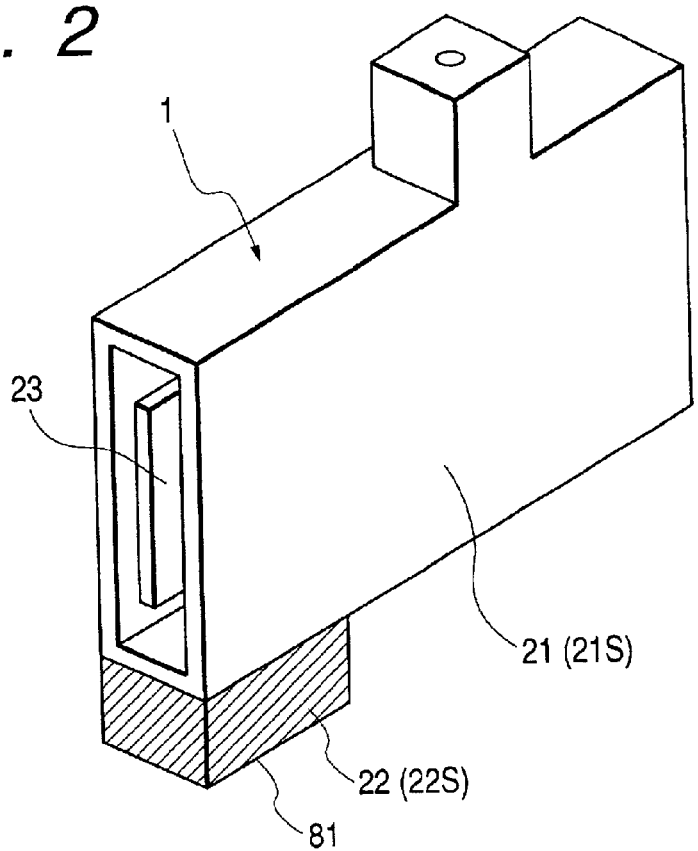
FIG. 2 is a schematic perspective view of a head cartridge in FIG. 1.

FIG. 2 is the diagrammatic perspective view showing the print head (head cartridge) 1 of the structure made by integrating the ink discharge part with the ink tank. Incidentally, the liquid composition discharge head 2, excluding that the liquid stored and used is the liquid composition, has the substantially same constitution as that of the print head 1. In FIG. 2, the print head 1 has the ink tank part 21 and the ink discharge part (print head part) 22, which are mounted on the top part and the bottom part, thereof, respectively, and receives an actuating and other signals to actuate the ink discharge part 22 and also has a head side connector 23 to output an ink residue detection signal. This connector 23 is installed in the position close to the ink tank part 21.

The print head 1 has a face 81 forming the discharge port in a bottom face side (the recording medium 10 side) in FIG. 2 and the print head 1 has the face 81 forming the discharge port face, in which a plurality of discharge ports have been formed. In a liquid path part communicating with each discharge port, a discharge energy generating element is arranged to generate energy necessary for discharge of the ink.

The print head (head cartridges) 1 as described above is an ink jet printing means to print by discharging the ink and is constituted by the ink discharge part 22 and an ink jet cartridge integrated with the ink tank 21 and which is exchangeable. This print head 1 is the ink jet printing means to discharge the ink by using thermal energy and comprises an electrothermal converter to generate thermal energy. Incidentally, the print head 1 as described above uses a change of pressure created by growth and reduction of bubbles generated by film boiling caused by thermal energy, which is applied by the electrothermal converter as described above, to discharge the ink from the discharge part for printing.

Figure 3:
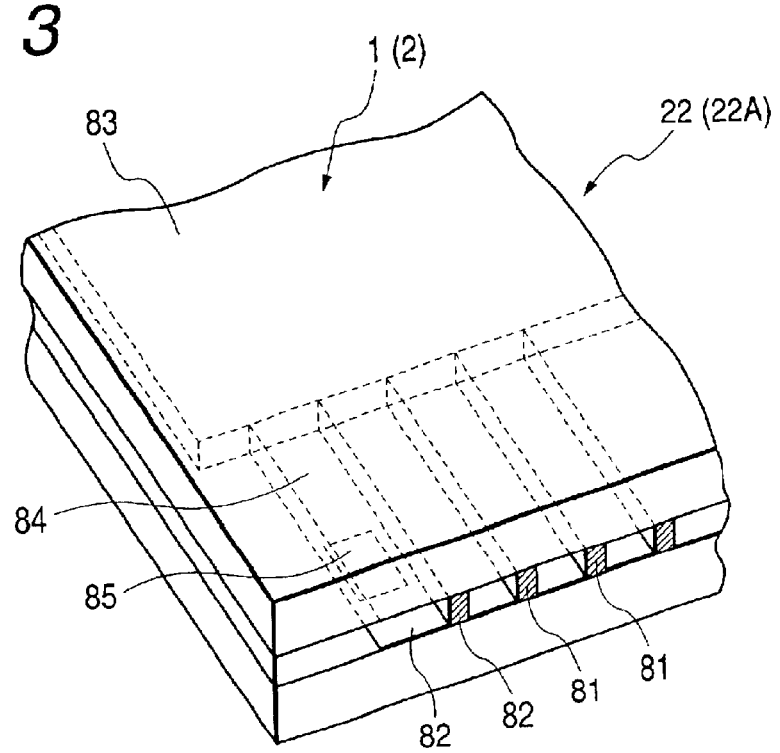
FIG. 3 is a partial perspective view schematically showing the structure of the ink-ejection part of the head cartridge in FIG. 1.

FIG. 3 is a partial perspective view showing diagrammatically the structure of the ink discharge part 22 (the liquid composition discharge part 22A) of the print head 1 (the liquid composition discharge head 2). In FIG. 3, on the face 81 forming the discharge port facing the recording medium (print paper and the like) through a predetermined space (for example, about 0.5 to 2.0 mm), a plurality of the discharge ports 82 is formed in a predetermined pitch and along with a wall face of the liquid path 84 making a communication of a common liquid chamber 83 with each of discharge ports 82, the electrothermal converter (heat-generating resistor) 85 is installed to generate energy for ink discharge.

The plurality of the discharge ports 82 is arranged in a positional relation to align along with a direction crossing the moving direction (the main scanning direction) of the print head 1. As mentioned above, the print head 1 is constituted so that the corresponding electrothermal converter 85 is actuated (run by an electric current) on the basis of an image signal or a discharge signal to cause film boiling of the ink in the liquid path 84 and then, the ink is discharged from the discharge ports 82 by pressure created at that time.

Figure 4A:
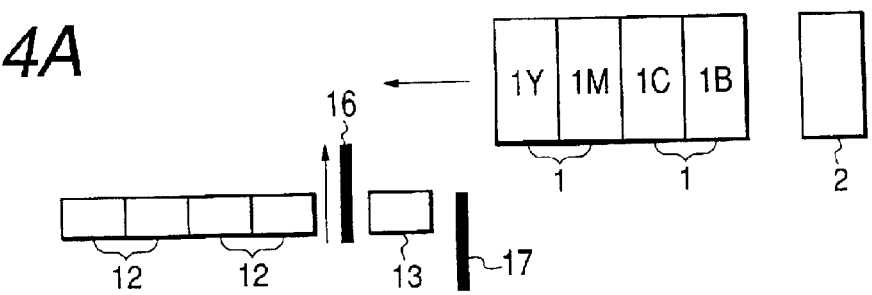
FIGS. 4A, 4B, 4C, and 4D schematically illustrate a wiping operation of the ink-jet printing apparatus in FIG. 1.
Figure 4B:
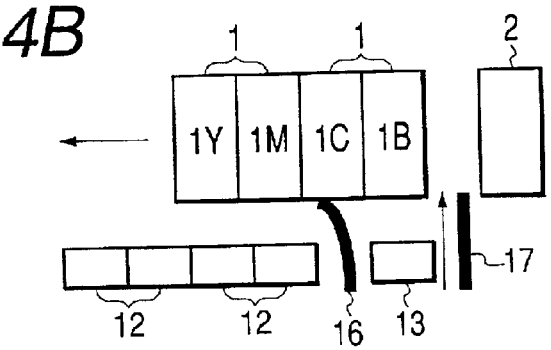

FIGS. 4A, 4B, 4C and 4D to FIGS. 6A, 6B, 6C and 6D are the diagrammatic figures showing the wiping action of the ink jet printing apparatus described above. FIGS. 4A to 4D show an occasion in which the carriage 3 moves from the print area side to the home position side. As shown in FIG. 4A, the print head 1 and the liquid composition discharge head 2 on the carriage 4 moves from the right side (print area side) to the home position. Then, as shown in FIG. 4B, first, the blade 16 for the ink between the cap 12 for the ink and the cap 13 for the liquid composition moves up to wipe each print head 1Y, 1M, 1C, and 1B in this order in accordance with movement of the carriage 3.

Figure 4C:
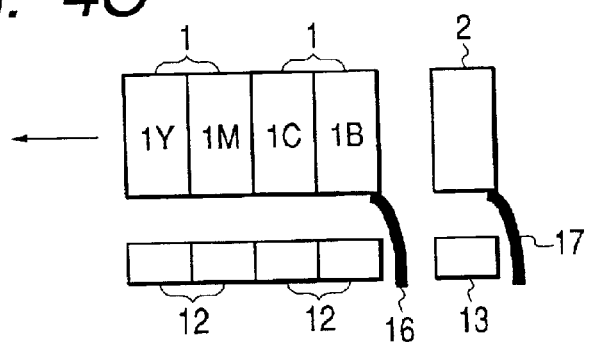
Figure 4D:
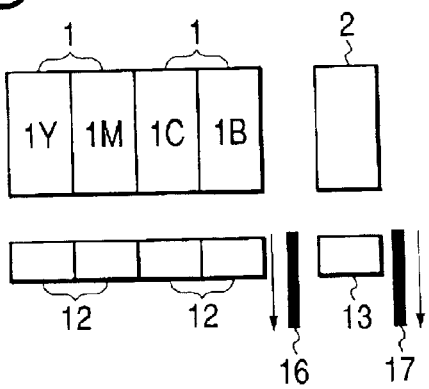

In addition, as shown in FIG. 4C, after each print head 1 passes through the top of the blade 16 for the ink, the blade 17 for the liquid composition moves up to wipe the faces forming the discharge port of the liquid composition discharge head 2 as shown in FIG. 4D. The blade 16 for the ink wipes the fourth print head 1 and after the blade 17 for the liquid composition path completes the wiping of the liquid composition discharge head 2, both the blades 16 and 17 move down to stand by at the stand-by position.

In FIGS. 4A to 4D, a structure is that when the carriage 3 moves from the right side (print area) to the home position having the recovery unit 111 in FIG. 1, wiping by the blades 16 and 17 is carried out. However, a wiping direction is not restricted to this, but as shown in FIGS. 5A to 5D, the structure may be that when the carriage 3 moves from the home position side to the right side (print area side), wiping is carried out.

Figure 5A:
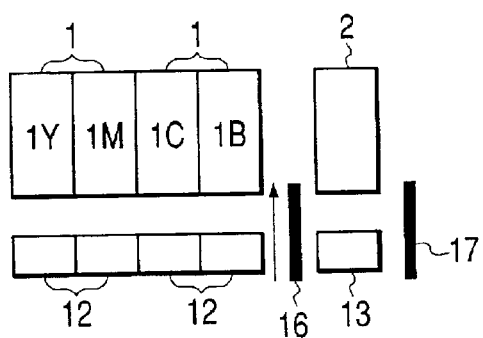
FIGS. 5A, 5B, 5C, and 5D schematically illustrate a wiping operation of the ink-jet printing apparatus in FIG. 1.
Figure 5B:
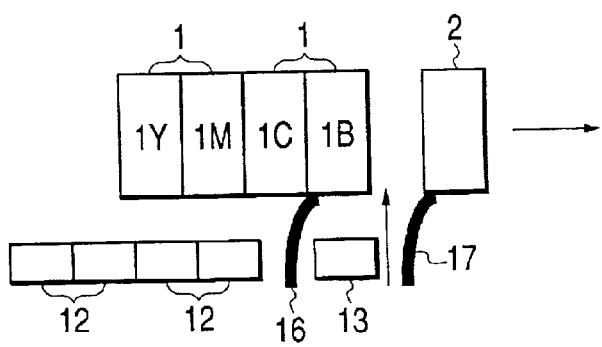
Figure 5C:
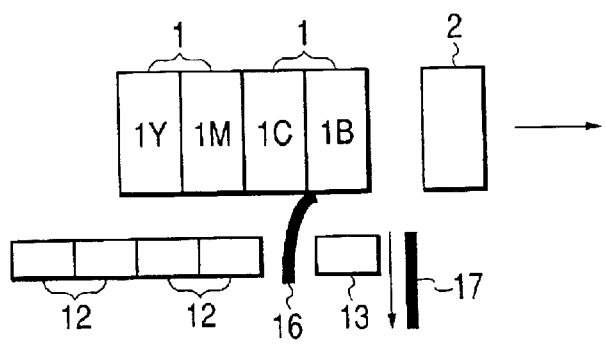
Figure 5D:
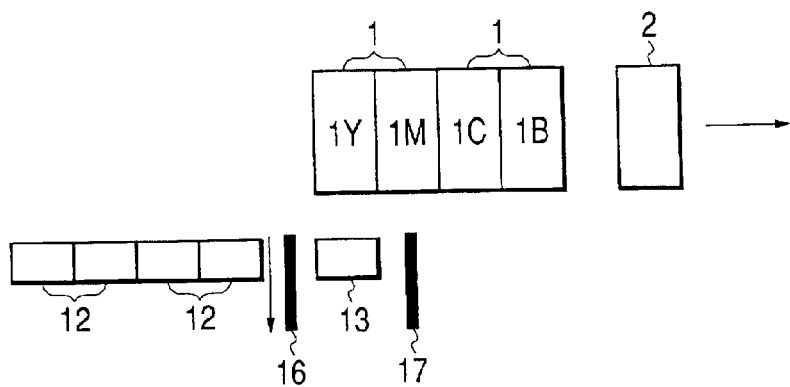

In FIGS. 5A to 5D, as shown in FIG. 5A, the blade 16 for the ink and the blade 17 for the liquid composition are moved up simultaneously and the carriage 3 is moved to the right direction (to print area side) to wipe simultaneously the print head 1 and the liquid composition discharge head 2 (FIG. 5B), immediately after the completion of wiping of the liquid composition discharge head 2, the blade 17 for the liquid composition is moved down to stand by and the blade 16 for the ink carries out wiping of the print head 1 as it is (FIG. 5C). Finally, as shown by FIG. 5D, when wiping of all the print head 1 is completed, the blade 16 for the ink is moved down to complete a series of wiping operations.

By employing the wiping direction as described in FIGS. 5A to 5D, the following risk can be eliminated: the droplet removed by wiping to attach to the blades 16 and 17 splashes toward the carrying part of the recording medium 10 by elasticity of the blade to stain undesirably the recording medium 10.

Figure 6A:
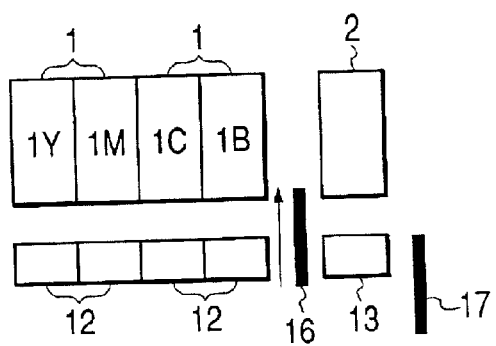
FIGS. 6A, 6B, 6C, and 6D schematically illustrate wiping operation of the ink-jet printing apparatus in FIG. 1.
Figure 6B:
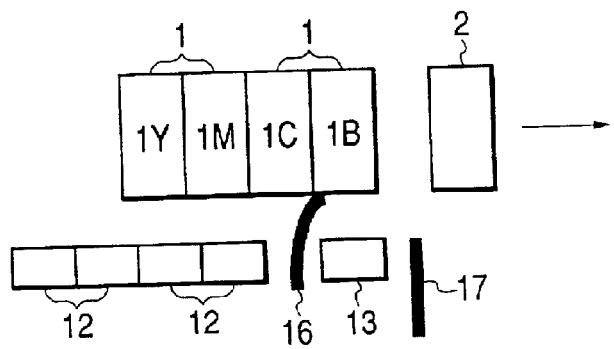
Figure 6C:
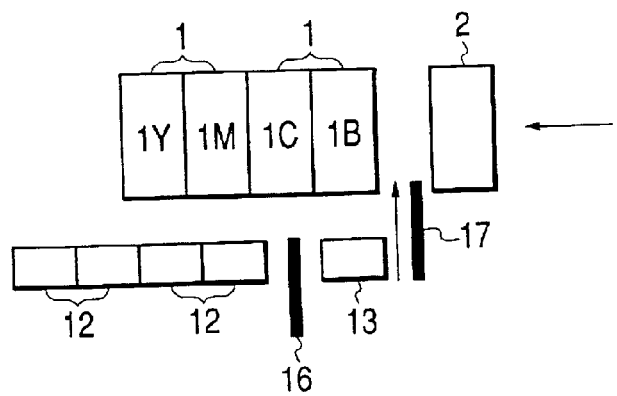
Figure 6D:
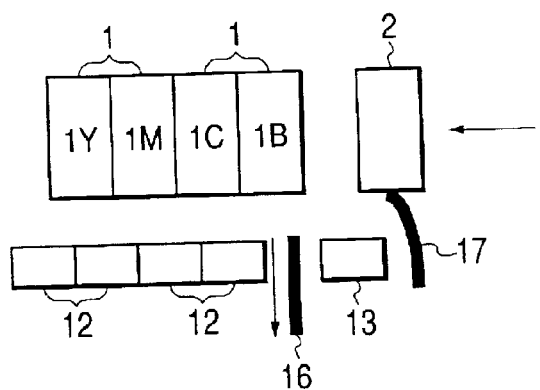

In addition as shown in FIGS. 6A to 6D, the wiping direction of the print head 1 may be made different from the wiping direction of the liquid composition discharge head 2. In FIGS. 6A to 6D, for example, as shown in FIG. 6A and FIG. 6B, it is possible that when the carriage 3 moves from the home position side to the right direction (print area side), the print head 1 is wiped by the blade 16 for the ink and as shown in FIG. 6C and FIG. 6D, when the carriage 3 moves from the print area side to the home position side, only the liquid composition discharge head 2 is wiped by the blade 17 for the liquid composition.

By employing such wiping direction, failures (risk) capable of elimination or of being greatly reduced are that the ink splashed by the elastic force of the blade 16 attaches to the liquid composition discharge head 2 and on the contrary, the liquid composition splashed by the elastic force of the blade 17 attaches to the print head 1.

On the other hand, in FIG. 1, the cap 12 for the print head 1 is separated from the cap 13 for the liquid composition discharge head 2 to make them independent (for exclusive use), and the suction pumps 14 and 15 connected to these caps 12 and 13 are separated from each other to make them independent (for exclusive use) for the print head 1 and the liquid composition discharge head 2, respectively. By this, in these caps 12 and 13 and the pumps 14 and 15, the ink is not contacted with the liquid composition having a reactivity with the ink to allow treating waste solutions derived from these, resulting in the possibility of maintaining a high reliability.

Figure 7:
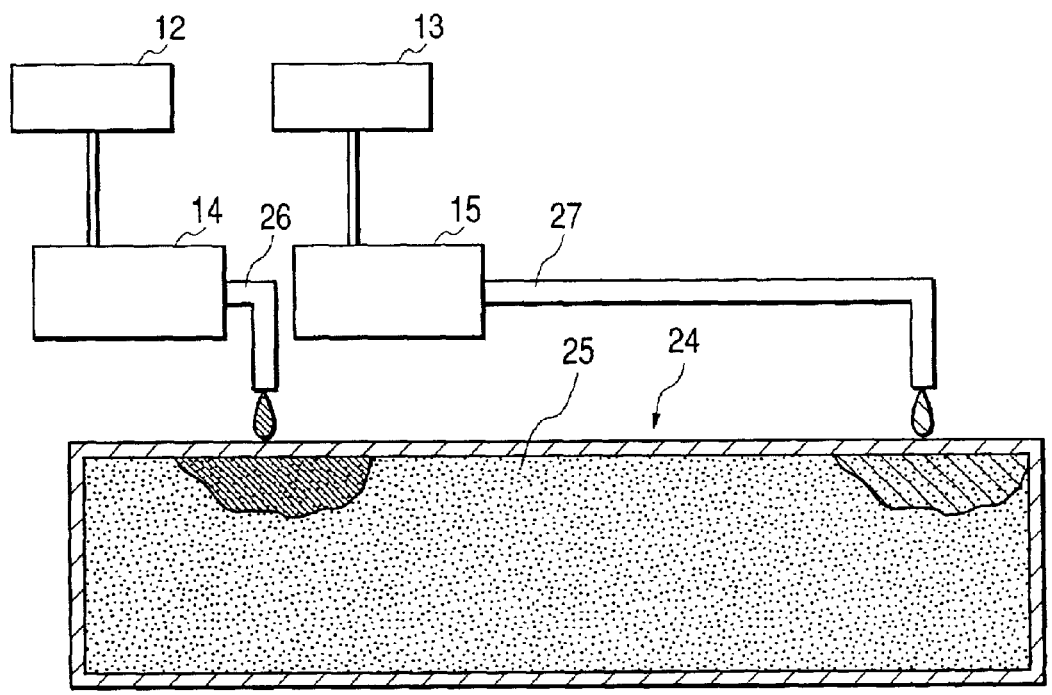
FIG. 7 schematically illustrates the waste liquid recovery system of the ink-jet printing apparatus in FIG. 1.

FIG. 7 is the diagrammatic figure showing a recovery line for collecting the ink and the liquid composition exhausted from the pumps 14 and 15 to a waste ink tank. In FIG. 7, the waste ink sucked from the print head 1 by the suction pump 14 communicated with the cap 12 and the waste solution sucked from the liquid composition discharge head 2 by the suction pump 15 communicated with the cap 13 are collected to be contained in a waste solution tank 24 through each independent path to prevent leakage out of the printing apparatus.

The waste solution tank 24 as described above is constituted as adapted to fill a porous absorber 25 therein to absorb and hold the waste solution in the absorber 25. The waste solution tank 24 is installed in a main body of the printing apparatus. In FIG. 7, a waste ink pipe 26 from the suction pump 14 for the print head 1 and the waste ink pipe 27 from the suction pump 15 for the liquid composition discharge head 2 are connected, as shown in the figure, in the position of both ends of the waste solution tank 24 with a distance from each other. By such design as described above, the liquid composition contacts with the ink in the waste solution tank 24 limiting to the state where the solution is enough absorbed in the absorber 25 and therefore, the quantity of the liquid, which can be held by the porous absorber 25, can be sufficiently kept.

Figure 8:
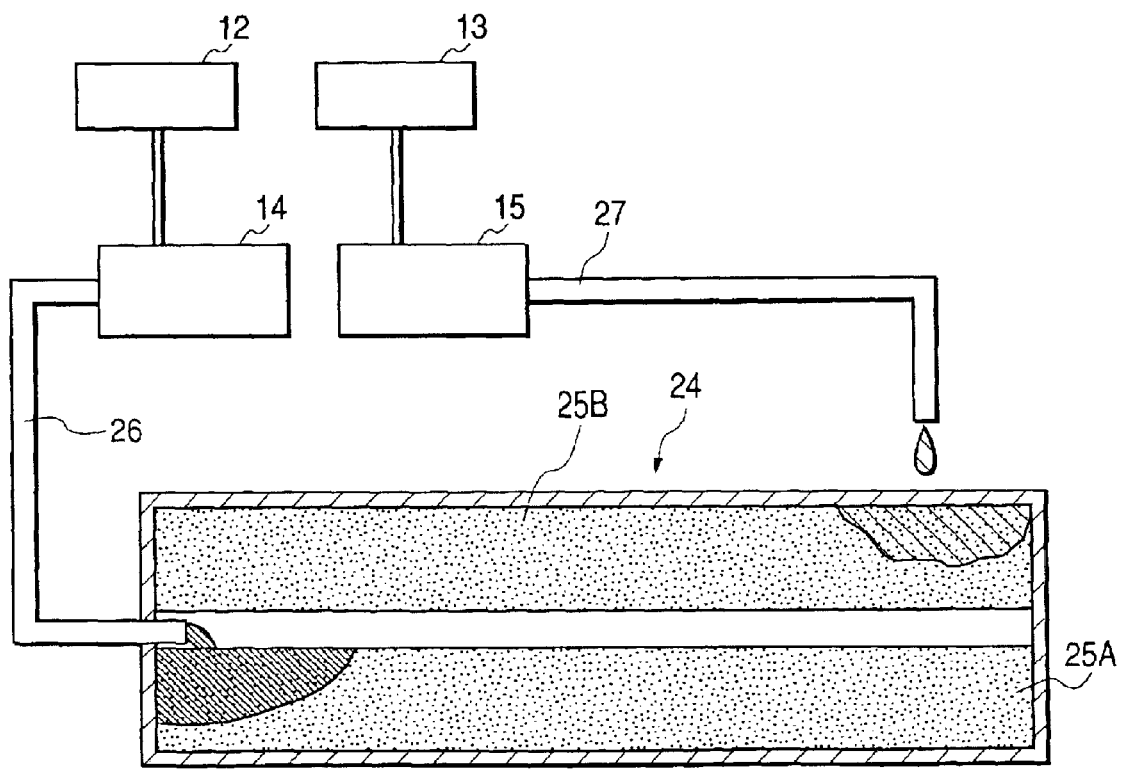
FIG. 8 schematically illustrates a partially modified waste liquid recovery system in FIG. 7.

FIG. 8 is the diagrammatic view showing, in the waste solution-collecting line of FIG. 7, the waste solution-collecting line with the constitution in which the absorber 25 in the waste solution tank 24 is arranged in two stages, the top and the bottom, the ink is absorbed by the absorber 25A of a bottom stage, and the liquid composition is absorbed by the absorber 25B of a top stage. According to the constitution of FIG. 8, in the case where the absorber 25A of the bottom stage overflows, the dye in the ink reacts with the absorber 25B of the top stage to be fixed by the absorber 25B of the top stage and the liquid composition absorbed therein and thus, the ink does not overflow and does not stain the inside and outside of the printing apparatus by overflowing of the ink.

On the other hand, another form of the ink jet recording apparatus is characterized by comprising the ink containing part in which the anionic or the cationic water-based ink containing the coloring material is contained, the liquid composition-containing part which contains the liquid composition as described above, according to the present invention, preferably, the liquid composition in which the fine particles electrified on the surface thereof in the polarity opposite to that of the water-based ink as described above is contained in the dispersion state, and the ink jet head to discharge independently each of the water-based ink contained in the ink containing part as described above and the liquid composition contained in the liquid composition containing part as described above. These will be described below.

FIG. 10 shows the example of such cartridge 1001 and in the figure, the reference numeral 1003 is the ink containing part which contains the ink and the reference numeral 1005 is the liquid composition-containing part which contains the liquid composition. The cartridge is, as shown in FIG. 11, constituted to be detachably mounted on the recording head 1101 to discharge each of the ink and the liquid composition and in the state of the cartridge 1001 mounted on the recording head 1101, constituted to supply the liquid composition and the ink to the recording head 1101.

The ink jet recording apparatus used in the present invention is not restricted to those in which the head and ink cartridge are installed separately as described above and as shown in FIG. 15, that in which those parts have been integrated is preferably used.

Figure 15:
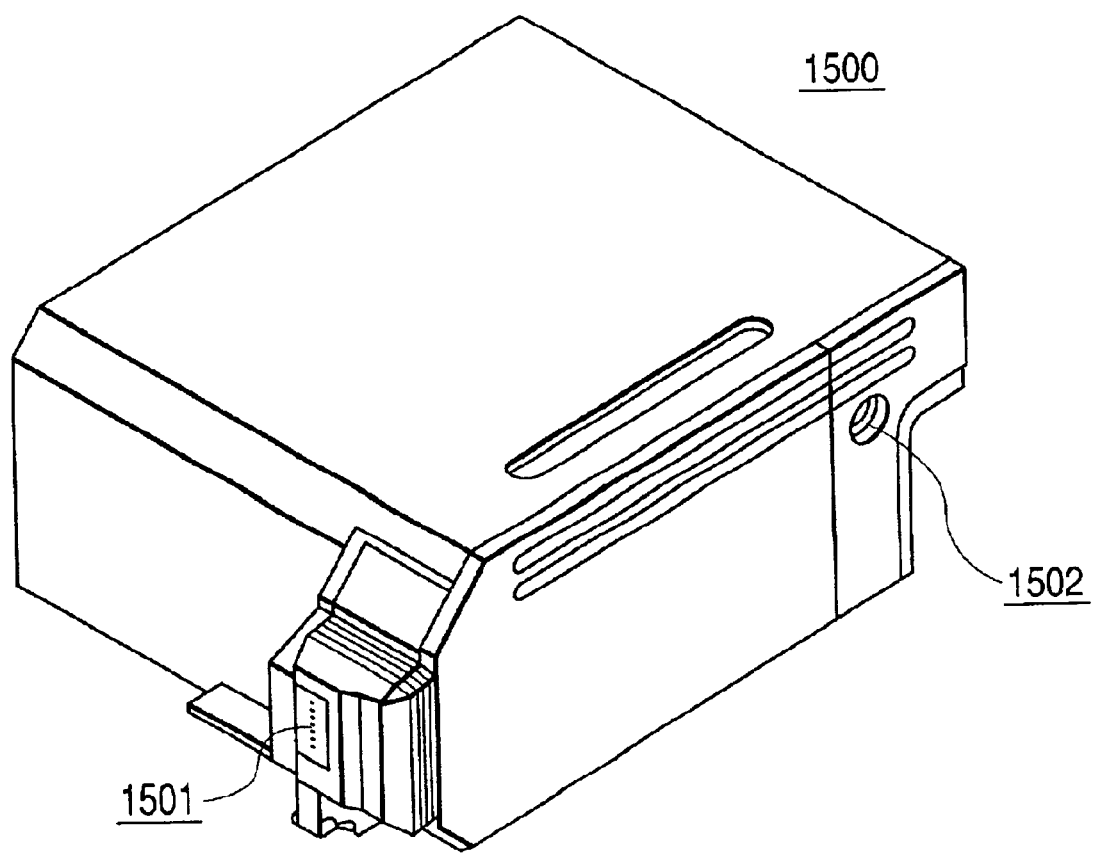
FIG. 15 is a perspective view of a recording unit.

In FIG. 15, the reference numeral 1500 is the recording unit, which comprises the ink containing part such as the ink absorber, which contains the ink, and the ink in such ink absorber is discharged as an ink droplet from the head part 1501, which has a plurality of orifices. As the material of the ink absorber, for example, polypropylene and polyurethane can be used. The reference numeral 1502 is an atmosphere communication port to make communication of the inside of the recording unit with the atmosphere.

Figure 12:
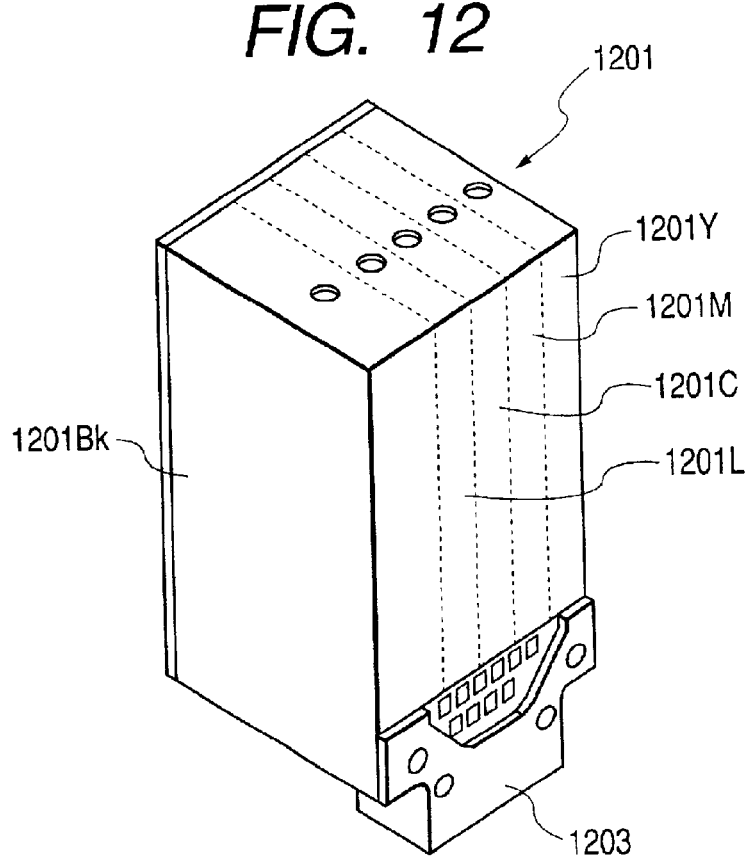
FIG. 12 is an outline figure showing one embodiment of a recording unit according to the invention.

In addition, as another embodiment of the recording unit used in the present invention, there is a recording unit, in which the ink and the liquid composition is contained in each containing part in one piece of the ink tank and the recording head for discharge of each of the ink and the liquid composition is integrally installed. Specifically, for example, as shown in FIG. 12, there is a recording unit 1201, in which the liquid composition is contained in the containing part 1201L, black ink is in the containing part 1201Bk, and color inks of yellow, cyan, and magenta inks are contained in color ink containing parts 1201Y, 1201C, and 1201M, respectively, and the recording head 1203 constituted by separating the ink flow path is installed to be able to discharge each ink individually.

Figure 16:
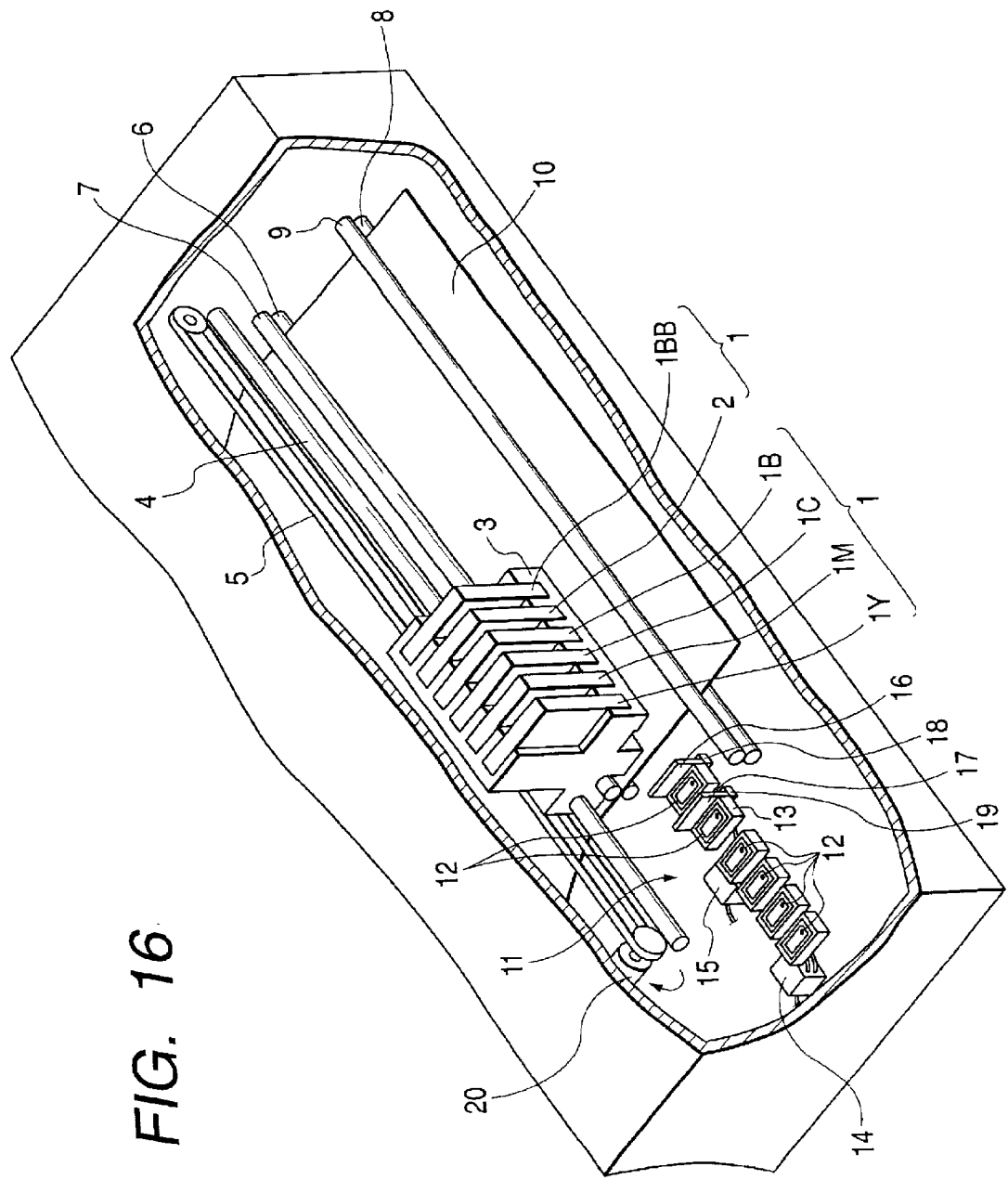
FIG. 16 is a partially opened perspective view schematically showing one embodiment of an ink-jet printing apparatus according to the invention.

FIG. 16 is a diagrammatic perspective view showing the schematic constitution of another embodiment of the ink jet recording apparatus according to the present invention. In FIG. 16, the reference numeral 4 is the scanning rail extended in the main scanning direction of the carriage 3 and supporting the carriage slidably, and the reference numeral 5 is the actuating belt transmitting the actuating force to reciprocate the carriage 3. On the other hand, the reference numerals 6, 7, and 8, 9 are all pairs of conveying rollers arranged before and after the position of printing by the print head to convey the recording medium 10 by holding it.

The recording medium 10 such as paper is guided and supported in the state of pressing to the platen (not illustrated) to regulate the printing face to be flat in the part corresponding to the printing position. Here, the discharge port face of each of the head cartridge (head) 1 and 2, which is mounted on the carriage 3, is adapted to be positioned between the rollers 7 and 9 protruding downward from the carriage 3 for conveying the recording medium 10 and faces opposite the recording medium 10 pressed to the guide face of the platen (not illustrated).

In FIG. 16, six pieces of the head cartridges in total are positioned to mount on the carriage 3. In this example, a print head of yellow 1Y, the print head of magenta 1M, the print head of cyan 1C, and the print head of black 1B, the liquid composition discharge head 2, a second print head of black 1BB, in this order, from the left end side to the right end side of the illustration on the carriage 3. The liquid composition discharge head 2 discharges the liquid composition having reactivity with the coloring material in the ink to the recording medium 10.

Incidentally, the second print head of black 1BB in the right side is the print head using black ink used in subscanning print by reciprocating printing. In other words, the following structure is used: the liquid composition discharge head 2 is arranged in a next position (a right adjacent position) of the print head of black 1B and the print head of black 1BB as described above is arranged in further next position (a right end).

In FIG. 16, the recovery unit 11 is installed in the left side of the print area and in the recovery unit 11, corresponding to the head cartridges 1 and 2, in the order from right to left, the cap 12 is serially arranged to cap the print heads 1Y, 1M, 1C, and 1B, the cap 13 is arranged in the next position (the right adjacent position) to cap the liquid composition discharge head 2, the cap 12 is arranged in the further next position (right end) to cap the second print head of black 1BB.

And, each cap is installed vertically movable up and down. When the carriage 3 is in the home position, caps 12 and 13 corresponding to the faces forming the discharge ports of each head 1 and 2 are fitted by pressing and thus, the discharge ports of each head 1 and 2 are sealed (capped). By this, thickening and adhering of the ink by evaporation of the solvent of the ink in the discharge port is prevented resulting in prevention of occurrence of discharge failure.

The recovery unit 11 comprises the suction pump 14 communicated with each cap 1 and 2 and the suction pump 15 communicated with the cap 3. These pumps 14 and 15 are, when discharge failure occurs in the print head 1 and the liquid composition discharge head 2, used for capping those faces forming the discharge ports with caps 12 and 13 to execute sucking and recovering actions. The blade 17 for the liquid composition discharge head 2 is arranged between the cap 13 for the liquid composition of the fifth from the left side and the cap 12 for the black ink of the sixth (the right side) and the blade 16 for each print head 1 is arranged in the right side (print area side) of the cap 12 of the right end.

In addition, the blade 16 is held by the blade holder 18 and the blade 17 is held by the blade holder 19. In this aspect, the blade holders 18 and 19 are moved up and down by a blade moving mechanism (not illustrated) actuated by using the motion of the carriage 3 and hence, the blades 16 and 17 move up and down between the protruded position (the wiping position) to wipe the foreign matter and the ink, which have attached to the faces forming the discharge ports of the heads 1 and 2, and the retreated position (stand by position) to cause no contact with the faces forming the discharge ports. In this occasion, the blade 16 to wipe the print head 1 and the blade 17 to wipe the liquid composition discharge head 2 are constituted independently from each other to move up and down individually.

FIGS. 17A to 17F are the diagrammatic figure showing the wiping action of the ink jet recording apparatus of FIG. 16. In FIGS. 17A to 17F, as shown in FIG. 17A, after the blade 16 for the printing head protrudes (moves up), each head mounted on the carriage 3 moves from the right side (print area side) to the home position. The blade 16 for the printing head moves up, as shown in FIG. 17B, wipes sequentially the printing head 1 according to the motion of the carriage 3 to the left hand direction. And, as shown in FIG. 17C, in the point where the liquid composition discharge head 2 arrives at a position (adjacent right position) in front of the blade 16 for the printing head, the blade 16 retreats (moves down) to the stand by position to prevent contact of the blade 16 with the liquid composition discharge head 2.

In the point where the carriage 3 moves leftward and the liquid composition discharge head 2 passes through the blade 6 for the printing head, as shown in FIG. 17D, both the blade 16 for the printing head and the blade 17 for the liquid composition discharge head are protruded (moved up). And, according to the leftward motion of the carriage 3, as shown in FIG. 17E, wiping the liquid composition discharge head 2 by the blade 17 and wiping the right end print head 1BB by the blade 16 are simultaneously carried out. Wiping of all the heads 1 and 2 has been finished, as shown in FIG. 17F, both the blade 16 and the blade 17 are retreated to stand by at the stand by position.

The examples of FIG. 16 and FIGS. 17A to 17F are adapted to be that when the carriage 3 moves from print area side (the right side) to the home position where the recovery unit 11 is located, wiping is carried out by the blades 16 and 17. However, the wiping direction is not restricted to this, but wiping may be carried out during motion from the home position to the right side (print area side).

The ink jet recording apparatus of FIG. 16 is constituted by discharging the liquid composition, according to the present invention, having reactivity with the coloring material in the ink from the liquid composition discharge head 2 to the recording medium 10 to contact with the ink discharged from each print head 1 on the recording medium 10 resulting in forming the recorded matter. On the recording medium 10, by reaction of the coloring material in the ink to the liquid composition, the coloring material in the ink adsorbs to the fine particles in the monomolecular state and image formation is carried out by the fine particles and therefore, the image excellent in coloration and color evenness can be yielded.

Figure 18:
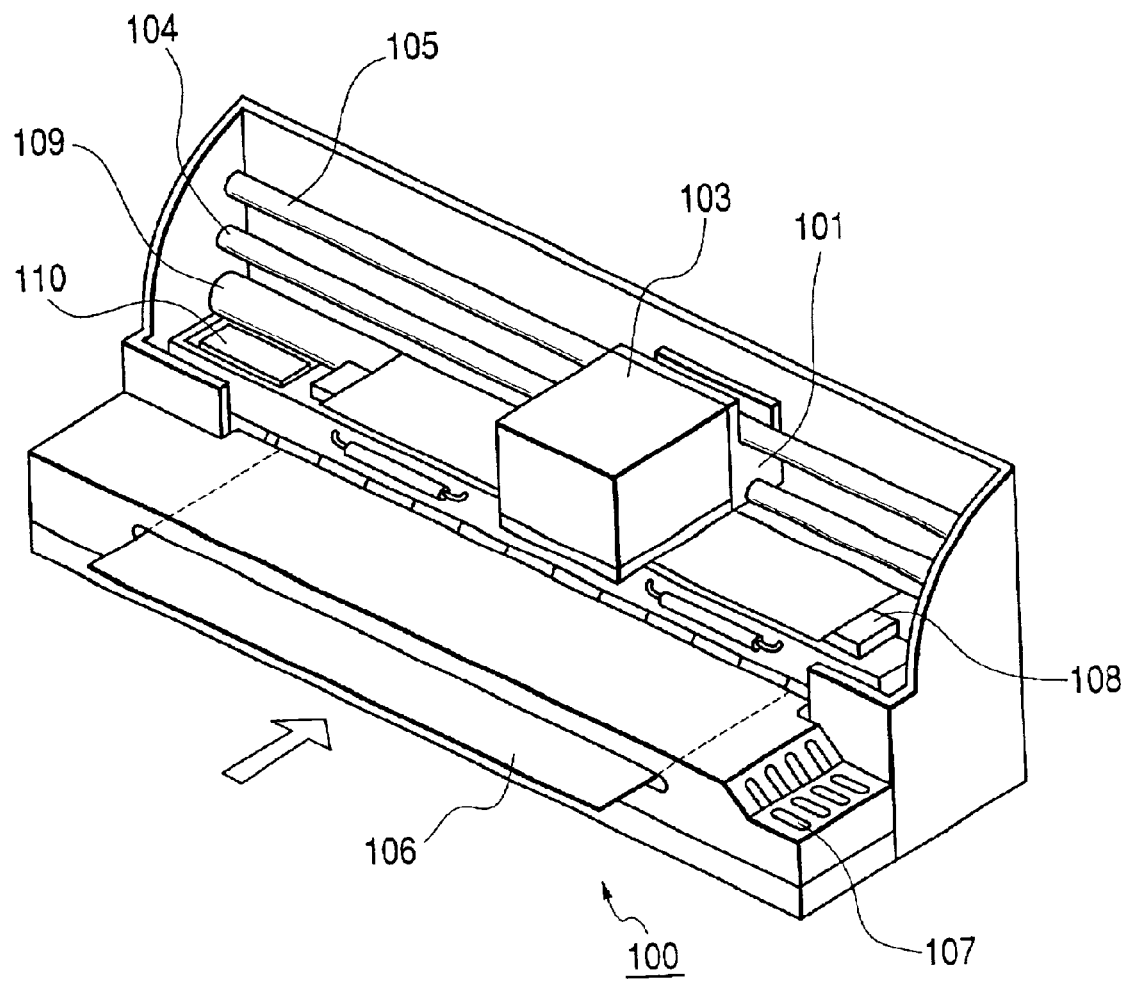
FIG. 18 is a schematic perspective view showing an ink-jet printing apparatus according to one embodiment of the invention.

FIG. 18 is the diagrammatic perspective view showing the schematic constitution of another embodiment.

In FIG. 18, the recording medium 106 inserted into a feeding position of the apparatus 100 is sent to an area, which can be printed by the ink jet unit 103, by a sending roller 109. In a back face part of a printing medium in this printable area, the platen 108 is installed.

The carriage 101 is constituted to be adapted to be able to move in a specific direction with two guiding shafts 104 and 105 and by this, the head unit 103 can scan reciprocating the print area. On the carriage 101 can be mounted each of units described later. In other words, the ink jet head to discharge the ink and the liquid composition for each of a plurality of colors and the ink jet unit 103 containing the ink tank to supply the ink or the liquid composition to each ink jet head are mounted. As the ink of the plurality of colors for example, four colors of black (Bk), yellow (Y), magenta (M), and cyan (C) can be used.

In the left side end of the area in which the carriage 101 moves, a recovery system unit 101 having a wiping mechanism as described later is installed in the bottom part thereof and thus, capping the discharge port of the ink jet head in the time of no printing becomes possible. This left side end is named the home position of the ink jet head.

The reference numeral 107 represents a switch part and a display element part. The switch part is used for turning on and off of a power supply of the ink jet printing apparatus and setting of various modes for printing. The display element part is for displaying various statuses of the printing apparatus.

Figure 19:
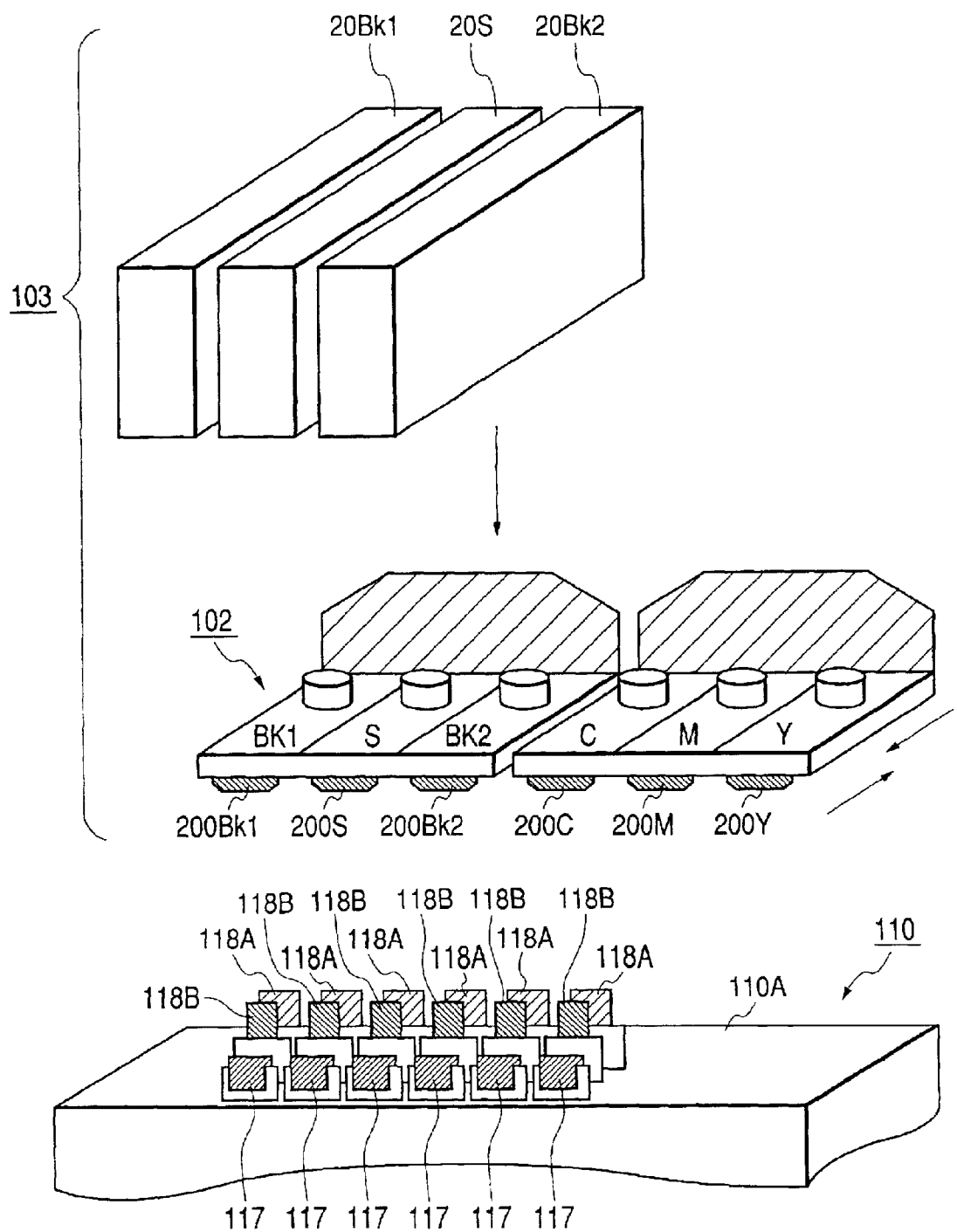
FIG. 19 schematically illustrates the mechanism for wiping and wiping operation of the ink-jet printing apparatus in FIG. 18.

FIG. 19 is the diagrammatic figure illustrating mechanisms for wiping and wipe operations of other aspect of the recovery unit 110 in the ink jet printing apparatus as described.

The ink jet cartridge 103 shown in FIG. 19 comprises the head unit 102 and each ink tank 20Bk1, 20S, 20BK2 (illustration of tanks for Y, M, C inks are omitted), the head unit 102 comprises ink jet head for each color, namely, the head 200BK1 and 200BK2 for the black ink, the head 200S for the liquid composition, the head 200C for cyan ink, the head 200M for magenta ink, and the head 200Y for yellow ink.

As shown in FIG. 19, each of the blades 118A and 118B and a wipe member 117 to operate wiping and wipe operations for the discharge port face of the ink jet head are installed in each ink jet head. The blades 118A, 118B, and a wipe member 117, which correspond respectively to all these heads, can work simultaneously in operation of the wiping or wipe. In other words, in timing in which the ink jet unit 103 is located in the home position and operates wiping or wipe, these move up to the position capable of abutting the discharge port face and a cover plate and then, move in a wiping direction shown by an arrow in the figure, and wiping of the discharge port face can be carried out by the two blades 118A and 118B through this operation. On the other hand, in the wiping direction shown by the arrow in the figure, the wiping operation for the discharge port face is carried out by the wipe member 117 to remove a matter made by mixing of the liquid composition and the ink, which have attached to the discharge port face.

Figure 20:
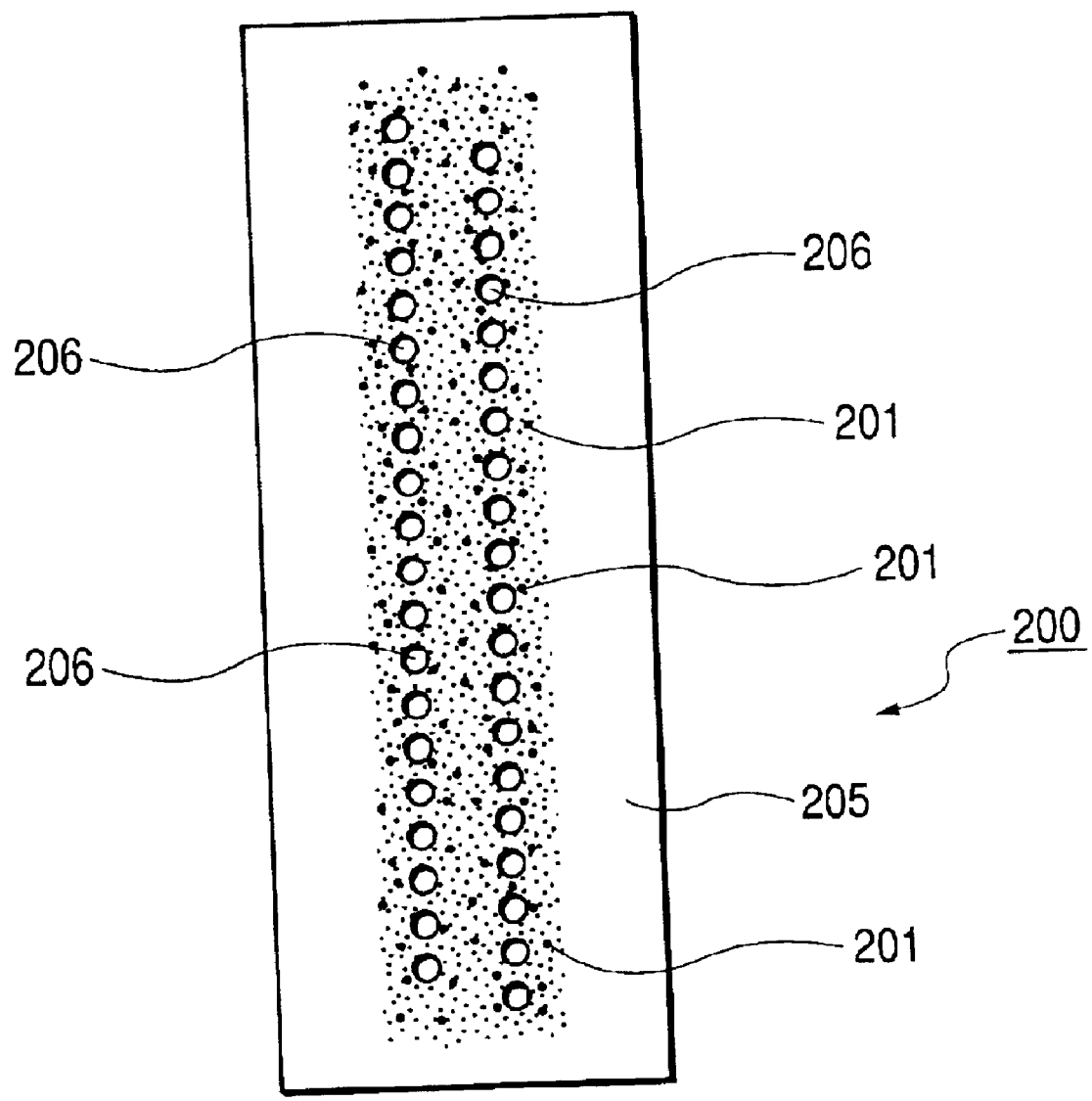
FIG. 20 shows the face of the ejection orifice of the ink-jet head in the embodiment of FIG. 18 where a mixture of a liquid composition and inks is adhering.

FIG. 20 shows the discharge port face 205 of the ink jet head 200 according to the present embodiment and around the discharge port 206, wherein the mixture 201 of the liquid composition and the ink has attached.

As shown in the figure, each ink jet head in this embodiment is adapted to that in which the discharge ports 206 are arranged in two rows and there is the difference between positions of each row of the discharge ports in ½ of a pitch of the discharge port. By this, in the case where the arrangement of the discharge ports is made of a single row, printing can be carried out in a resolution twice the resolution realizable.

Figure 21A:
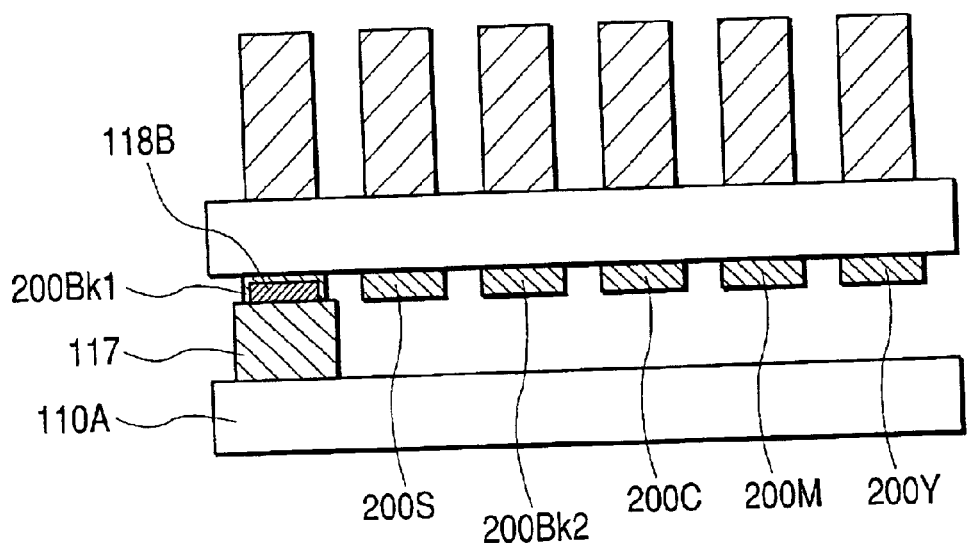
FIGS. 21A and 21B are respectively the front view and the side view of the mechanism shown in FIG. 19.
Figure 21B:
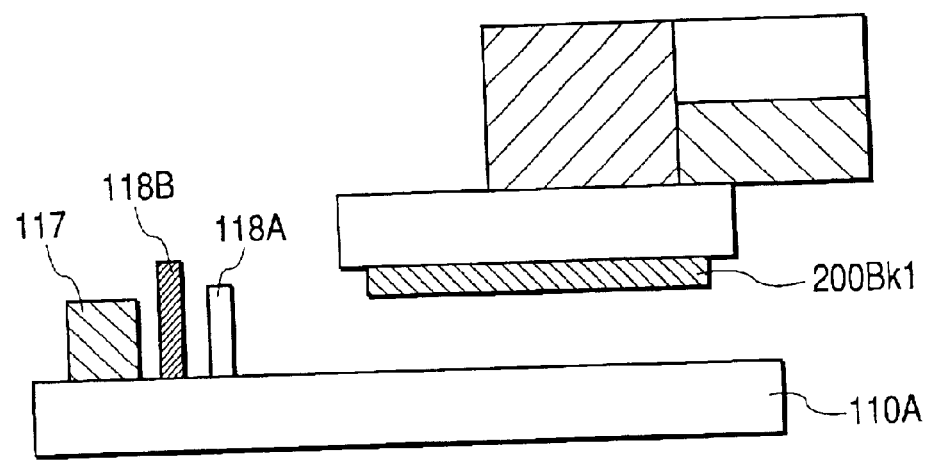

FIGS. 21A and 21B are a frontal view and a side view, respectively, showing mechanisms for the wiping and wipe operations shown in FIG. 19. Incidentally, in FIG. 21B, the ink jet head 200Y and the like have been omitted for illustration and only the head 200BK1 opposite to the blades 118A, 118B, and the like has been presented.

Particularly, as evident from FIG. 21B, in the blade for wiping, two blades 118A and 118B are installed to make the difference in a height thereof.

In this embodiment, as the example, the wipe member 117 is formed by using Rubycellclean (Toyo Polymer Corp.), being a porous sintered polyurethane and obtained by winding this around an arm made of ABS resin to attach to a base of the recovery unit 110 through a spring not illustrated. Abutting pressure of the discharge port face 205 to the wipe member 117 is set to 100 g to a 4 mm length of contact. If this abutting pressure is excessively high, the discharge port face 205 may be injured and on the contrary, if it is excessively low, a wipe effect is not sufficiently yielded. Therefore, it is preferably set to 1 to 100 g/mm and more preferably, set to 5 to 30 g/mm.

A rubber member used for the blades 118A and 118B is urethane rubber made by using a polyol having an ether bond as the material. However, the blade may be an elastic member, such as chlorinated butyl rubber, HNBR, natural rubber, isoprene rubber, butyl rubber, styrene rubber, nitrite rubber, silicon rubber, and the like, which are good in water resistance, solvent resistance, and abrasion resistance, can be used. As shown in the figure, the blade is in two pieces and the shape thereof is that a first blade 118A has a thickness of 0.6 mm, a degree of freedom is 5.0 mm, and invasion is 1.4 mm and a second blade 118B has the thickness of 1.0 mm, the degree of freedom is 10.0 mm, and invasion is 0.8 mm.

Incidentally, these members and set values are specially restricted, but can be freely set according to the liquid composition, the ink, and the constitution of the recording apparatus.

FIGS. 22A to 22D are figures illustrating the wiping action of the present embodiment.

Figure 22A:
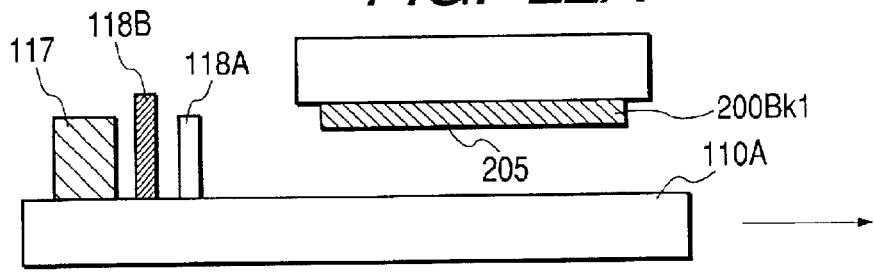
FIGS. 22A, 22B, 22C, and 22D illustrate the wiping operation of the embodiment of FIG. 19.
Figure 22B:
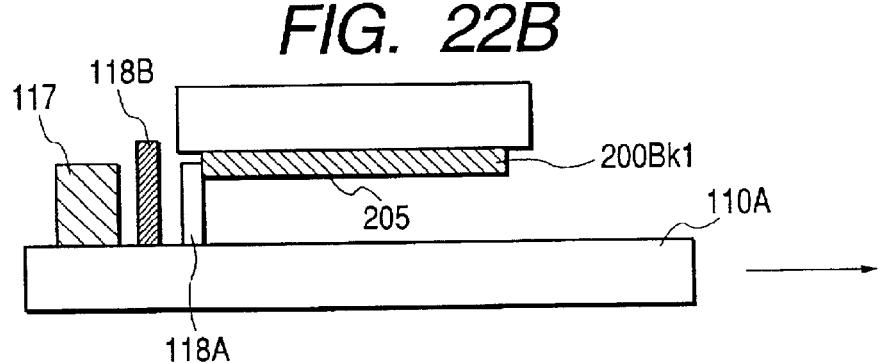
Figure 22C:
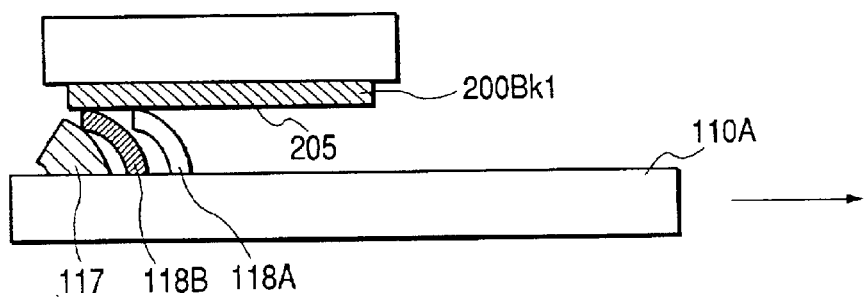
Figure 22D:
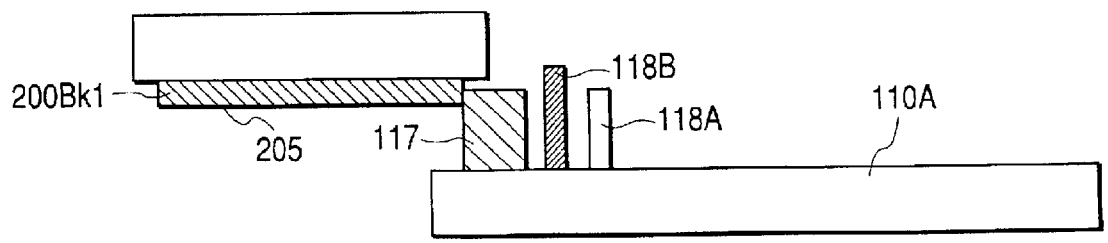

In wiping, the blades 118A and 111B and a holder holding the wipe member 117 move in the direction of the arrow in the figure (FIG. 22A), and then, the first blade 118A soon abuts the discharge port face 205 (FIG. 22B), and the holder 110A moves and thus, the second blade 118B abuts the discharge port face 205 (FIG. 22C). By abutting of these two blades and sliding relative to the discharge port face in the state thereof, as described above, the foreign matter, such as the mixed matter made from the liquid composition and the ink, attached to the discharge port face 205 can be removed. And, the holder 110A further moves in the same direction and thus, abutting of the blade is released (FIG. 22D) to finish wiping.

Incidentally, as shown in FIG. 22C, by deformation of the second blade 111B caused by abutting of the blade 118B having a longer free length to the discharge port face 205, the wipe member 117 deforms similarly. By this, the wipe member 117 does not abut the discharge port face 205 and wiping is exclusively carried out.

Figure 23A:
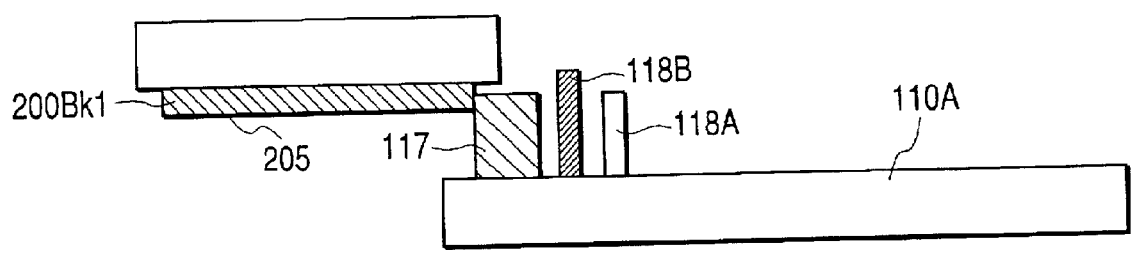
FIGS. 23A, 23B, and 23C illustrate the wiping operation of the embodiment of FIG. 19.
Figure 23B:
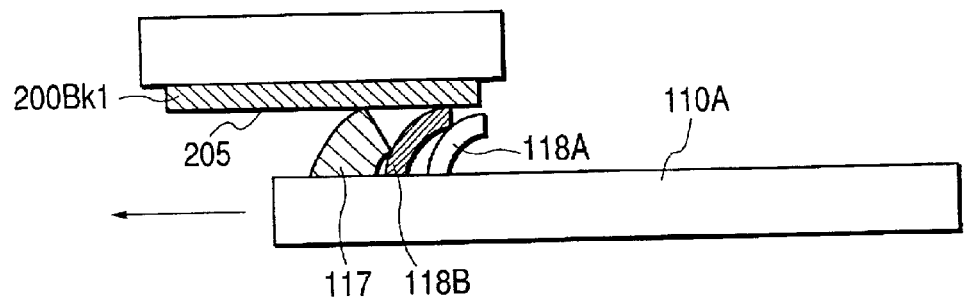
Figure 23C:
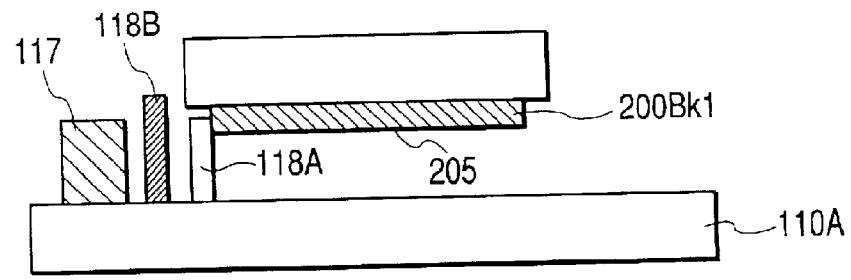

FIGS. 23A to 23C are figures illustrating the wipe action of the present embodiment.

The wipe action is carried out by motion in the direction reverse to the direction of the motion of the holder 110A shown in FIGS. 22A to 22D. In other words, in accordance with motion of the holder 110A from an initial state shown in FIG. 23A to the arrow direction shown in FIG. 23B, the wipe member 117 abuts the discharge port face 205 and hence, carries out the wiping action to remove the mixed matter made from the liquid composition and the ink as described above. And, the holder 110A further moves in the same direction and thus, abutting is released (FIG. 23C) to finish the wipe action.

Incidentally, as is clear in FIG. 23B, in the wipe action, both the blades 118A and 118B abut the discharge port face 205 and wiping is simultaneously carried out.

Incidentally, as described above, for the recording apparatus used in the present invention, the ink jet recording apparatus discharging the ink droplet by applying thermal energy to the liquid composition and the ink has been exemplified. Additionally, the ink jet recording apparatus of the piezoelectric system using a piezoelectric element can be similarly employed.

Hereinafter, the present invention is described with Examples. However the invention is not at all restricted to these practical examples.

EXAMPLES

The present invention will be described more specifically with Examples and Comparative Examples. In the description, parts and % are based on weight unless any specific remark is given. The zeta-potential in the description was measured by a zeta-potential measurement apparatus (BI-ZETA plus, manufactured by Brookhaven Co., liquid temperature: 20° C., acrylic cell) using a sample prepared by dispersing a liquid composition in ion-exchanged water so as to make the concentration of the solid matter 0.1%. The pH of the liquid compositions was determined by using a pH meter (manufactured by Horiba Seisakusho Co., Ltd.; Castemee pH meter D-14) at a liquid temperature of 25° C. The average particle diameter of the fine particles was measured using a dynamic light scattering type particle size distribution meter (manufactured by Brookhaven Co.; BI-90, liquid temperature: 20° C., acrylic cell) using a sample prepared by dispersing a liquid composition in ion-exchanged water so as to make the concentration of the solid matter 0.1%.

First, the production of a liquid composition of the invention is described.

Liquid compositions A, B, C, and D of the present invention were prepared by mixing and dissolving the components shown below, and filtering the resulting solution under pressure through a membrane filter with the pore size of 1 $\mu$m (trade name, Fluoropore filter: manufactured by Sumitomo Electric Industries Ltd.). The pore radius distribution and the pore volume of each liquid composition were measured by a nitrogen adsorption and desorption method using an Omni-sorb 1 manufactured by Kanta Chrome Co. Samples were pretreated as described later and then set in a cell and vacuum-degassed at 120° C. for 8 hours.

The pore radius distribution and the pore volume were computed according to the method of Barrett, et. al. (J. Am. Chem. Soc., Vol. 73, 373, 1951).

Sample preparation:
(1) the liquid composition is dried at 120° C. for 10 hours in an ambient atmosphere to evaporate most of the solvent;
(2) the dried sample is baked at a temperature rising from 120° C. to 700° C. over one hour and then at 700° C. for three hours;
(3) after burning, the sample is gradually cooled to normal temperature and powdered by grinding in an agate mortar.

Synthesis Example of Hydrated Alumina

Aluminum dodeoxide was produced by a method disclosed in U.S. Pat. No. 4,242,271. Then, the aluminum dodeoxide was hydrolyzed by a method disclosed in U.S. Pat. No. 4,202,870 to produce an alumina slurry. Water was added to the alumina slurry so as to adjust the solid content of the hydrated alumina to 8.2%. The pH of the resulting alumina slurry was 9.7. The pH was adjusted with an aqueous solution of 3.9% nitric acid to obtain colloidal sol under the maturation conditions as shown in Table 1. The colloidal sol was spray-dried at 83° C. to produce alumina hydrates A to D. The hydrated aluminas were all positively charged on the surface in water and showed cationic properties. These hydrates were dispersed in ion exchanged water and put on a collodion membrane dropwise to produce samples for measurement. Observation of the samples by transmission electron microscopy clearly showed that all samples were fine particles of a flat shape.

TABLE 1

| Hydrated alumina | A | B | C | D |
|---|---|---|---|---|
| pH before maturation | 5.7 | 5.9 | 5.8 | 5.7 |
| Maturation temperature (° C.) | 120 | 100 | 120 | 120 |
| Maturation period | 8 hours | 5 hours | 12 hours | 3 days |
| Maturation apparatus | autoclave | autoclave | autoclave | autoclave |

| Composition of the liquid composition A | |
|---|---|
| glycerol | 7.5% |
| diethylene glycol | 7.5% |
| hydrated alumina A (average particle diameter 130 nm) | 10.0% |
| nitric acid | 0.3% |
| water | 74.7% |

The liquid composition A prepared as above had a pH of 3.8 and a zeta-potential of +38 mV. When the liquid composition A was filled in an ink tank of an ink-jet recording apparatus and kept at 60° C. in dry state for 1 month for storage test, no precipitate was observed in the ink tank and the ejection stability out of the recording head was excellent. Further, with the agglomerates of the fine particles obtained from the liquid composition A, the volume of the pores having a radius ranging from 3 nm to 30 nm was 0.96 ml/g, and the volume of the pores having a radius larger than 30 nm was 0.005 ml/g. Further, the volume of the pores having a radius ranging from 3 nm to 20 nm was 0.94 ml/g, and the volume of the pores having a radius larger than 20 nm was 0.02 ml/g.

| Composition of the liquid composition B | |
|---|---|
| 1.5-pentanediol | 10.0% |
| ethylene glycol | 7.5% |
| hydrated alumina B (average particle diameter 80 nm) | 10.0% |
| nitric acid | 0.6% |
| water | 71.9% |

The liquid composition B prepared as above had a pH of 3.7 and a zeta-potential of +41 mV. When the liquid composition B was filled in an ink tank of an ink-jet recording apparatus and kept at 60° C. in dry state for 1 month for storage test, no precipitate was observed in the ink tank and the ejection stability out of the recording head was excellent. Further, with the agglomerates of the fine particles obtained from the liquid composition B, the volume of the pores having a radius ranging from 3 run to 30 nm was 0.45 ml/g, and the volume of the pores having a radius larger than 30 nm was 0.001 ml/g. Further, the volume of the pores having a radius ranging from 3 nm to 20 nm was 0.44 ml/g, and the volume of the pores having a radius larger than 20 nm was 0.01 ml/g.

| Composition of the liquid composition C | |
|---|---|
| glycerin | 7.5% |
| propylene glycol | 7.5% |
| hydrated alumina C (average particle diameter 180 nm) | 10.0% |
| nitric acid | 0.5% |
| water | 74.5% |

The liquid composition C prepared as above had a pH of 3.7 and a zeta-potential of +39 mV. When the liquid composition C was filled in an ink tank of an ink-jet recording apparatus and kept at 60° C. in dry state for 1 month for storage test, no precipitate was observed in the ink tank and the ejection stability out of the recording head was excellent. Further, with the agglomerates of the fine particles obtained from the liquid composition C, the volume of the pores having a radius ranging from 3 nm to 30 nm was 0.90 ml/g, and the volume of the pores having a radius larger than 30 nm was 0.01 ml/g. Further, the volume of the pores having a radius ranging from 3 nm to 20 nm was 0.83 ml/g, and the volume of the pores having a radius larger than 20 nm was 0.08 ml/g.

| Composition of the liquid composition D | |
|---|---|
| 2-pyrrolidone | 7.5% |
| ethylene urea | 7.5% |
| hydrated alumina D (average particle diameter 210 nm) | 10.0% |
| nitric acid | 0.5% |
| water | 74.5% |

The liquid composition D prepared as above had a pH of 4.2, and a zeta-potential of +36 mV. When the liquid composition D was filled in an ink tank of an ink-jet recording apparatus and kept at 60° C. in dry state for 1 month for storage test, no precipitate was observed in the ink tank and the ejection stability out of the recording head was excellent. Further, with the agglomerates of the fine particles obtained from the liquid composition D, the volume of the pores having a radius ranging from 3 nm to 30 nm was 0.79 ml/g, and the volume of the pores having a radius larger than 30 nm was 0.05 ml/g. Further, the volume of the pores having a radius ranging from 3 nm to 20 nm was 0.70 ml/g, and the volume of the pores having a radius larger than 20 nm was 0.14 ml/g.

The following is the description of ink sub-sets 1 and 2 used in Examples and Comparative Examples of the invention.

—Production of Ink Subset 1—

To prepare Black dye ink Bk1, yellow dye ink Y1, magenta dye ink M1, and cyan dye ink C1, respective components shown below were mixed and sufficiently stirred to dissolve them, and each solution was filtered under pressure through Fluoropore filter with the pore size of 0.45 μm (trade name; manufactured by Sumitomo Electric Industries Ltd.). The combination of these dye inks was called ink subset 1.

| Black ink Bk1 | |
|---|---|
| C.I. Direct Black 195 | 2.5 parts |
| 2-pyrrolidone | 10 parts |
| glycerin | 5 parts |
| isopropyl alcohol | 4 parts |
| sodium hydroxide | 0.4 parts |
| water | 78.1 parts |

| Yellow ink Y1 | |
|---|---|
| Project Fast Yellow 2 (produced by Zeneca Co.) | 2.0 parts |
| C.I. Direct Yellow 86 | 1.0 parts |
| thiodiglycol | 8 parts |
| ethylene glycol | 8 parts |
| acetylenol EH (produced by Kawaken Chemicals Co.) | 0.2 parts |
| isopropyl alcohol | 4 parts |
| water | 76.8 parts |

| Magenta ink M1 | |
| --- | --- |
| Project Fast Magenta 2 (produced by Zeneca Co.) | 3 parts |
| glycerin | 7 parts |
| urea | 7 parts |
| acetylenol EH (produced by Kawaken Chemicals Co.) | 0.2 parts |
| isopropyl alcohol | 4 parts |
| water | 78.8 parts |

| Cyan ink C1 | |
| --- | --- |
| C.I. Direct Blue 199 | 3 parts |
| ethylene glycol | 7 parts |
| diethylene glycol | 10 parts |
| acetylenol EH (produced by Kawaken Chemicals Co.) | 0.3 parts |
| water | 79.7 parts |

—Production of Ink Subset 2—

As shown below, a pigment dispersion was prepared, and using the pigment dispersion, black pigment ink Bk2 was prepared. Similarly, yellow pigment ink Y2, magenta pigment ink M2, and cyan pigment ink C2 were prepared. Combination of these pigment inks was called Ink subset 2.

| Black ink Bk2 Production of a pigment dispersion | |
| --- | --- |
| styrene-acrylic acid-ethyl acrylate copolymer (acid value 140, the weight average molecular weight 5,000) | 1.5 parts |
| monoethanolamine | 1.0 parts |
| diethylene glycol | 5.0 parts |
| ion-exchanged water | 81.5 parts |

The above components were mixed and heated in a water bath at 70° C. to completely dissolve the resin component. The obtained solution was further mixed with 10 parts of carbon black (a new experimental product) (MCF 88, produced by Mitsubishi Kasei Corporation) and 1 part of isopropyl alcohol and pre-mixed for 30 minutes and then subjected to dispersion treatment under the following conditions:

- a dispersing apparatus: a sand grinder (manufactured by Igarashi Kikai K.K.)
- a pulverization medium: zirconium beads, 1 mm diameter
- the filling ratio of the pulverization medium: 50% (by volume ratio)
- pulverization duration: 3 hours Then the resulting solution was subjected to centrifugal separation treatment (12,000 rpm., for 20 minutes) to remove coarse particles, thereby a dispersion was prepared.

| Production of black ink Bk2 Using thus-obtained pigment dispersion, the following components were mixed to produce an ink containing the pigment and named as the black ink Bk2: | |
| --- | --- |
| the foregoing pigment dispersion | 30.0 parts |
| glycerin | 10.0 parts |
| ethylene glycol | 5.0 parts |
| N-methylpyrrolidone | 5.0 parts |
| ethyl alcohol | 2.0 parts |
| ion-exchanged water | 48.0 parts |

Yellow ink Y2

The pigment-containing yellow ink Y2 was produced in the same manner as with the black ink Bk2 production, except that Pigment Yellow 74 was used in place of the carbon black MCF 88.

Magenta ink M2

The pigment-containing magenta ink M2 was produced in the same manner as with the black ink Bk2 production, except that Pigment Red 7 was used in place of the carbon black MCF 88.

Cyan ink C2

The pigment-containing cyan ink C2 was produced in the same manner as with the black ink Bk2 production, except that Pigment Blue 15 was used in place of carbon black MCF 88.

Example 1 to Example 8

Printing was carried out using the liquid compositions A, B, C and D, and color inks of ink subset 1 (Bk1, Y1, M1, and C1), and ink subset 2 (Bk2, Y2, M2, and C2) in the combinations as shown in Table 2.

TABLE 2

| Example | Ink subset | Liquid composition |
| --- | --- | --- |
| 1 | 1 | A |
| 2 | 1 | B |
| 3 | 1 | C |
| 4 | 1 | D |
| 5 | 2 | A |
| 6 | 2 | B |
| 7 | 2 | C |
| 8 | 2 | D |

In Examples 1 to 8, color images were formed on PPC paper (produced by Canon Inc.) using one of combinations of liquid compositions A to D and ink sets 1 and 2. For printing, an ink-jet recording apparatus as shown in FIG. 1 provided with five recording heads as shown in FIG. 3 was used. At that time, the liquid composition was applied to the recording paper before the ink was applied.

Practically, printing was carried out by 3-pass fine printing in which the printing region was scanned three times. At that time, each liquid composition was applied to the position corresponding to a pixel to which any one of yellow, magenta, cyan and black inks is to be applied. That is, the logical sum of the printing data for yellow, magenta, cyan and black in each pass was employed as the datum for application of the liquid compositions. The type of the fine mask employed for the fine printing is not specifically limited and any known technique can be applicable. Thus, detailed description is omitted.

The recording heads used here operate at a recording density of 600 dpi, and the operation condition was 9.6 kHz of operation frequency. For yellow, magenta, and cyan inks and the liquid composition, heads that eject 15 ng per dot were used, and for black ink a head that ejects 30 ng per dot. The same recording conditions were used for Examples and Comparative Examples.

Comparative Example 1 and
Comparative Example 2

Printing was carried out using only the ink subsets 1 and 2, as shown the following Table 3.

TABLE 3

| Comparative Example | Ink subset | Liquid composition |
|---|---|---|
| 1 | 1 | none |
| 2 | 2 | none |

Recording was carried out in the same recording conditions as in Examples 1 to 8.

<Evaluation Methods and Evaluation Standards>

Recorded images formed in Examples 1 to 8 and Comparative Examples 1 and 2 were evaluated according to the following evaluation methods and evaluation standards. The results are shown in Table 4.

Evaluation Method for a Recorded Image (1) Coloring Properties

A RGB color chart of a highly fine XYZ, CIELAB RGB standardized image (SHIPP) (ed. Highly Fine Standardized Image Formation Committee; published by Image Electronic Soc.) was printed using a printer and the liquid composition and ink subsets using the same image processing conditions, and the printed color charts were subjected to colorimetry. Colorimetry was carried out 24 hours after printing, using GRETAG Spectrolino (trade name) under conditions of light source: D50 and visual field: 2°. The evaluation of the coloring properties was carried out by computing the three-dimensional extension of the color distribution (hereinafter, referred to as color gamut volume) according to the method described in the technical manual of the above reference and comparing the results. The color gamut volume of the formed image was compared to that of the printed image formed using only the ink subsets (Comparative Examples 1 or 2), and the ratio was classified according to the following evaluation standards.

AAA: the ratio of color gamut volume is not less than 1.7
AA: the ratio of color gamut volume is 1.5 or more and less than 1.7
A: the ratio of color gamut volume is 1.4 or more and less than 1.5
BB: the ratio of color gamut volume is 1.2 or more and less than 1.4
B: the ratio of color gamut volume is 1.0 or more and less than 1.2
C: the ratio of color gamut volume is less than 1.0

At the same time, an image was formed with the ink subset 1 on coated paper using an ink-jet printer (trade name: Color BJ paper LC-101, produced by Canon Inc.) and the color gamut volume was compared with that of the printed matter of Comparative Example 1. The ratio was 1.3.

(2) Evenness

After solid images of yellow, magenta, cyan, and black colors with or without the liquid composition were printed using the above described printer, color evenness was evaluated by visual observation of white haze and color irregularity. The colors with especially inferior evenness were picked up as the evaluation objects. The evaluation standards were as follows:

A: white haze and color irregularity were scarcely observed;
B: although white haze and color irregularity were slightly observed along the fibers of the paper, the degree was within the practically acceptable level; and
C: white haze and color irregularity were noticeably observed along the fibers of the paper.

(3) Stripe-Like Irregularity

After solid images of yellow, magenta, cyan, and black colors were printed with or without the liquid composition using the foregoing printer, the stripe-like irregularity was evaluated by visual observation. The color images having especially inferior stripe-like irregularity were picked up as the evaluation objects. The evaluation standards were as follows:

A: stripe-like irregularity was scarcely observed;
B: although stripe-like irregularity was slightly observed for every head scanning, the degree was within the practically acceptable level; and
C: stripe-like irregularity were noticeably observed for every head scanning.

(4) Rub-Off Resistance

Solid images of yellow, magenta, cyan, and black colors were printed with or without the liquid composition and inks of respective colors using the foregoing printer. After 16 hours from the printing, silbon paper was overlaid on the printed parts and further a weight of 3.5 cm×3.5 cm was put on the paper and applying a pressure of 40 g/cm$^2$, the silbon paper was pulled at 15 cm/sec. to evaluate the rub-off resistance of the printed parts. The colors with especially inferior rub-off resistance were picked up as the evaluation objects. The evaluation standards were as follows:

A: ink removal was scarcely observed;
B: although ink slightly adhered to the silbon paper, the decoloration of the printed parts was within the unnoticeable level; and
C: a significant amount of ink adhered to the silbon paper and clear decoloration was observed in the printed parts.

(5) Texture

Solid images of yellow, magenta, cyan, and black colors were printed with or without the liquid composition and inks of respective colors using the foregoing printer. The texture of the recording medium was evaluated by visual observation. The evaluation standards were as follows:

A: no disharmony was observed in both of the printed parts and non-printed parts and the texture of plain paper was conserved as it was;
B: the printed parts and the non-printed parts had different texture from each other or the recorded medium entirely had different texture from that of the plain paper.

TABLE 4

| | Coloring property | Evenness | Stripe-like irregularity | Rub-off resistance | Texture |
|---|---|---|---|---|---|
| Example 1 | AAA | A | A | A | A |
| Example 2 | AAA | A | A | A | A |
| Example 3 | AAA | A | A | A | A |
| Example 4 | AA | A | A | A | A |
| Example 5 | AAA | A | A | A | A |
| Example 6 | AAA | A | A | A | A |
| Example 7 | AAA | A | A | A | A |
| Example 8 | AAA | A | A | A | A |
| Comparative Example 1 | B | C | A | A | A |
| Comparative Example 2 | B | C | A | C | A |

Examples 9 to 15

In order to examine the influence of the type of the recording medium on the image quality, images were formed using the liquid composition A and four color inks of Ink subset 1 on seven types of plain paper in the same manner as in the above examples. These plain papers are widely sold under the trade names listed below. The images were evaluated according to the above described evaluation standards. The obtained results are shown in Table 5.

Recording Media
1) produced by Canon Inc.: PB paper
2) produced by Canon Inc.: Brilliant White Paper
3) produced by Union Camp Co.: Great White Ink Jet
4) produced by Hammermill Co.: Jet Print
5) produced by Xerox Co.: Xerox 4024
6) produced by Hewlett Packard Co.: Bright White InkJet Paper
7) produced by Aussdat Ray Co.: Ray Jet

TABLE 5

| Example | Recording medium | Coloring property | Evenness | Stripe-like irregularity | Rub-off resistance | Texture |
|---------|------------------|-------------------|----------|--------------------------|--------------------|---------|
| 9 | 1) | AAA | A | A | A | A |
| 10 | 2) | AAA | A | A | A | A |
| 11 | 3) | AAA | A | A | A | A |
| 12 | 4) | AAA | A | A | A | A |
| 13 | 5) | AAA | A | A | A | A |
| 14 | 6) | AAA | A | A | A | A |
| 15 | 7) | AAA | A | A | A | A |

According to the results of Examples 9 to 15 shown in Table 5, it was confirmed that the obtained images were satisfactory in all of coloring properties, evenness, stripe-like irregularity, rub-off resistance, and texture, regardless of the types of the recording medium.

As described above, according to the invention, in the case of color ink-jet recording on, especially, plain paper, provided is a liquid composition measurement method capable of obtaining excellent coloring property and color evenness; and also provided are liquid compositions, ink sets, a method for forming colored portions on object recording media, and an ink-jet recording apparatus which are all capable of obtaining ink-jet recording images with the coloring property and the color evenness as excellent as those of images on coated paper for ink-jet printing while leaving the texture of the plain paper, with little stripe-like unevenness for mat image parts, and with high abrasion resistance in the printed parts. Moreover, according the invention, provided are liquid compositions excellent in storage stability and stability to be jetted out of recording heads and also excellent in ink-jet recording properties.

What is claimed is:

1. A liquid composition which forms a colored portion on a recording medium together with an ink containing a coloring material, comprising a solvent and fine particles that react with the coloring material in the ink, the fine particles forming agglomerates having pores by the following pretreatment steps (a) to (c), wherein the agglomerates have pores and the volume of the pores whose radius ranges from 3 to 30 nm is not less than 0.4 ml/g, and the volume of the pores whose radius is more than 30 nm is not more than 0.1 ml/g, the volume and radius of the pores being measured according to a process for measuring a liquid composition comprising the steps of:

i) subjecting a liquid composition containing fine particles and a solvent to the following pretreatment steps (a) to (c):

(a) evaporating the solvent of the liquid composition at 120° C. for 10 hours in atmosphere, and drying the liquid composition;

(b) burning the dried liquid composition resulting from the pretreatment step (a) at 700° C. for three hours after raising the temperature from 120° C. to 700° C. over one hour;

(c) gradually cooling a burned product resulting from the pretreatment step (b) to room temperature, and powdering the burned product to obtain agglomerates of the fine particles; and ii) vacuum degassing the agglomerates at 120° C. for 8 hours, and measuring physical properties of pores of the agglomerates by a nitrogen adsorption and desorption method.

2. The liquid composition according to claim 1, wherein the volume of the pores whose radius ranges from 3 to 20 nm is not less than 0.4 ml/g, and the volume of the pores whose radius is larger than 20 nm is not more than 0.1 ml/g.

3. The liquid composition according to claim 1, wherein the ink is either an anionic or cationic aqueous ink and the aqueous liquid composition contains fine particles in a dispersed state, the fine particles having a surface charge of opposite polarity to that of the aqueous ink.

4. The liquid composition according to claim 1, wherein when a colored portion is formed, the fine particles adsorb the coloring material in the ink on the surface of the fine particles, preventing agglomeration of the coloring material.

5. The liquid composition according to claim 1, wherein the liquid composition has a zeta-potential of +5 to +90 mV.

6. The liquid composition according to claim 1, wherein the composition further contains an acid, and has a pH adjusted to 2 to 7.

7. The liquid composition according to claim 6, wherein the acid has a primary dissociation constant pKa of 5 or lower in water.

8. The liquid composition according to claim 1 or 2, wherein the liquid composition has a zeta-potential of −5 to −90 mV.

9. The liquid composition according to claim 1, wherein the composition further contains a base, and has a pH adjusted 7 to 12.

10. The liquid composition according to claim 9, wherein the base has a primary dissociation constant pKb of 5 or lower in water.

11. The liquid composition according to claim 1 or 2, wherein the fine particles have an average particle diameter in a range of 0.005 to 1 μm.

12. The liquid composition according to claim 1, wherein the ink is cationic or anionic and the colored portion is formed by bringing the liquid composition and the ink into contact with each other in a liquid state to adsorb or bond the coloring material in the ink onto the surfaces of the fine particles of the liquid composition while keeping the coloring material in practically the same molecular state as that in the ink.

13. The liquid composition according to claim 2, wherein the ink is cationic or anionic, and the colored portion is formed by bringing the liquid composition and the ink into contact with each other in a liquid state to adsorb or bond the coloring material in the ink onto the surfaces of the fine particles of the liquid composition while keeping the coloring material in practically the same molecular state as that in the ink.

14. The liquid composition according to claim 3, wherein the ink is an anionic aqueous ink and the fine particles have a cationic surface charge.

15. The liquid composition according to claim 1, wherein the fine particles react with the coloring material in a liquid state.

16. An ink set comprising an ink and a liquid composition independently, the ink containing a coloring material, and the liquid composition containing fine particles that react with the coloring material, wherein the liquid composition is that as defined in claim 1.

17. The ink set according to claim 16, wherein the volume of the pores whose radius ranges from 3 to 20 nm is not less than 0.4 ml/g, and the volume of the pores whose radius is larger than 20 nm is not more than 0.1 ml/g.

18. The ink set according to claim 16, wherein the ink is either an anionic or cationic aqueous ink and the liquid composition is an aqueous composition containing fine particles in a dispersed state, the fine particles being charged on surface thereof in opposite polarity to that of the aqueous ink.

19. The ink set according to claim 16, wherein the ink is at least one selected from an yellow ink, a magenta ink, a cyan ink, a black ink, a red ink, a blue ink, and a green ink.

20. The ink set according to claim 16, wherein the ink comprises separately an yellow ink, a magenta ink, and a cyan ink.

21. The ink set according to claim 16, wherein the ink comprises separately an yellow ink, a magenta ink, a cyan ink, and a black ink.

22. The ink set according to any one of claims 16 to 21, wherein the ink is anionic and the liquid composition has a zeta-potential of +5 to +90 mV.

23. The ink set according to claim 16, wherein the ink is anionic and the liquid composition contains an acid and has a pH adjusted to 2 to 7.

24. The ink set according to claim 23, wherein the acid in the liquid composition has a primary dissociation constant pKa of 5 or lower in water.

25. The ink set according to any one of claims 16 to 21, wherein the ink is cationic and the liquid composition has a zeta-potential of −5 to −90 mV.

26. The ink set according to claim 16, wherein the ink is cationic and the liquid composition contains a base and pH of the liquid composition is adjusted to 7 to 12.

27. The ink set according to claim 26, wherein the base in the liquid composition has a primary dissociation constant pKb of 5 or lower in water.

28. The ink set according to any one of claims 16 to 21, wherein the fine particles dispersed in the liquid composition have an average particle diameter of 0.005 to 1 $\mu$m.

29. The ink set according to claim 16, wherein the ink has an anionic property and contains an anionic compound.

30. The ink set according to claim 29, wherein the ink contains a water-soluble dye having an anionic group as the anionic compound.

31. The ink set according to claim 29, wherein the ink contains a pigment having an anionic group on the surface of the pigment as the anionic compound.

32. The ink set according to claim 29, wherein the ink contains a pigment and an anionic compound that is a dispersant for the pigment.

33. The ink set according to claim 16, wherein the ink has a cationic property and contains a cationic compound.

34. A method for forming a colored portion on a recording medium, comprising the steps of:
   (i) applying an ink containing a coloring material to a recording medium; and
   (ii) applying a liquid composition of claim 1 to the recording medium.

35. A method for forming a colored portion on a recording medium comprising the steps of:
   (i) applying an ink containing a coloring material to a recording medium; and
   (ii) applying the liquid composition of claim 2 to the recording medium.

36. The method according to claim 34 or 35, wherein the ink is either an anionic or cationic aqueous ink and the aqueous liquid composition contains fine particles in a dispersion state, the fine particles being charged on surface thereof in opposite polarity to that of the aqueous ink.

37. The method for forming colored portions on a recording medium according to claim 34 or 35, wherein the step (i) is carried out after the step (ii).

38. The method according to claim 34 or 35, wherein the step (ii) is carried out after the step (i).

39. The method according to claim 34 or 35, wherein the step (ii) is carried out after the step (i) is carried out and after that, the step (i) is carried out again.

40. The method according to claim 34 or 35, wherein in the step (i) the ink is applied to the recording medium by an ink-jet recording method in which the ink is ejected from an orifice according to a recorded signal.

41. The method according to claim 40, wherein the ink-jet recording method is a method for ejecting the ink by applying heat energy to the ink.

42. The method according to claim 34 or 35, wherein in the step (ii) the liquid composition is applied to the recording medium by an ink-jet recording method in which the liquid composition is ejected from an orifice according to a recorded signal.

43. The method according to claim 42, wherein the ink-jet recording method is a method for ejecting the liquid composition by applying heat energy to the liquid composition.

44. An ink-jet recording apparatus comprising a first recording unit and a second recording unit, wherein the first recording unit is provided with an ink container containing an ink comprising a coloring material, and an ink-jet head for ejecting the ink, and the second recording unit is provided with a liquid composition container containing a liquid composition according to claim 1, and an ink-jet head for ejecting the liquid composition.

45. An ink-jet recording apparatus comprising an ink container containing an ink comprising a coloring material, and a liquid composition container containing the liquid composition of claim 1, and an ink-jet head for ejecting the ink and the liquid composition respectively.

46. The ink-jet recording apparatus according to claim 44 or 45, wherein the ink-jet head is a thermal ink-jet head for ejecting a liquid by applying heat energy to the liquid.

* * * * *

UNITED STATES PATENT AND TRADEMARK OFFICE
CERTIFICATE OF CORRECTION

PATENT NO. : 6,830,709 B2
DATED : December 14, 2004
INVENTOR(S) : Tomioka et al.

It is certified that error appears in the above-identified patent and that said Letters Patent is hereby corrected as shown below:

Title page,
Item [56], References Cited, OTHER PUBLICATIONS,
"Goyne et al," reference, "Al2O3(s) and siO2(s)" should read -- $Al_2O_3(s)$ and $SiO_2(s)$ --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,830,709 B2
DATED : December 14, 2004
INVENTOR(S) : Tomioka et al.

It is certified that error appears in the above-identified patent and that said Letters Patent is hereby corrected as shown below:

<u>Column 13,</u>
Line 33, "3 run" should read -- 3nm --.
Line 37, "3 run" should read -- 3nm. --.

Signed and Sealed this

Sixteenth Day of May, 2006

JON W. DUDAS
*Director of the United States Patent and Trademark Office*